(12) United States Patent
Mallon et al.

(10) Patent No.: US 8,170,929 B1
(45) Date of Patent: May 1, 2012

(54) TRANSACTION SUPPORT SYSTEM

(75) Inventors: Paul Michael Mallon, Putney (GB); Lloyd Ashley Clark, London (GB)

(73) Assignee: Bolero International Limited, London (GB)

( * ) Notice: Subject to any disclaimer, the term of this patent is extended or adjusted under 35 U.S.C. 154(b) by 0 days.

(21) Appl. No.: 09/404,911

(22) Filed: Sep. 24, 1999

(30) Foreign Application Priority Data

Mar. 18, 1999 (GB) .................................. 9906305.9
Sep. 8, 1999 (GB) .................................. 9921236.7

(51) Int. Cl.
*G06Q 10/00* (2012.01)

(52) U.S. Cl. .......................................... 705/29; 705/1.1

(58) Field of Classification Search ................ 705/1, 14, 705/26, 27, 35–37, 39, 29, 1.1; 707/1, 10
See application file for complete search history.

(56) References Cited

U.S. PATENT DOCUMENTS

| | | | |
|---|---|---|---|
| 5,241,466 A | | 8/1993 | Perry et al. |
| 5,826,269 A | | 10/1998 | Hussey |
| 6,014,641 A | * | 1/2000 | Loeb et al. ........................ 705/1 |
| 6,041,308 A | * | 3/2000 | Walker et al. .................... 705/14 |
| 6,202,051 B1 | * | 3/2001 | Woolston ......................... 705/27 |
| 6,401,078 B1 | * | 6/2002 | Roberts et al. .................. 705/28 |
| 2001/0016838 A1 | * | 8/2001 | Landrock ......................... 705/80 |
| 2002/0103728 A1 | * | 8/2002 | Naghshineh et al. ........... 705/29 |

FOREIGN PATENT DOCUMENTS

| | | |
|---|---|---|
| WO | 96/34356 | 10/1996 |
| WO | 99/06934 | 2/1999 |

OTHER PUBLICATIONS

Jones, David, "End of the paper chase", Oct. 1994, Project and Trade Finance n138 pp. 36-37., File 15.*
Talmor, Sharona, "Bolero trade steps", Feb. 1995, Banker, 145, 828, 72(3), File 148.*
Georgios/Zekos, The contractual role of bills of lading under international conventions and reports, Managerial Law, Patrington, 1997.*
Talmor, Sharona, Bolero Trade Steps, The Banker, London, Feb. 1995, vol. 145, issue 828, p. 72.*
Black, Henry Campbell, Black's Law Dictionary, West Publishing, 1978.*

(Continued)

*Primary Examiner* — Heidi Riviere
(74) *Attorney, Agent, or Firm* — Meyertons, Hood, Kivlin, Kowert & Goetzel, P.C.; Eric B. Meyertons

(57) ABSTRACT

A centralized database system for supporting transactions in property. The central database is accessed by system users over a public network such as the Internet. The central database forms a title registry recording the entitlements of the users, who are a defined group, to perform prescribed actions in relation to electronically created records. The electronically created records represent a strictly defined series of rights and obligations in relation to underlying property with one record being created for support of one transaction. The users become entitled by virtue of their designation to prescribed roles by a previously entitled user. Designation of a user to a prescribed role in a record takes place by means of a system user sending an electronic instruction to the database, these electronic instructions being referred to as registry instructions or title registry instructions.

74 Claims, 24 Drawing Sheets

OTHER PUBLICATIONS

Chandler III, George F. Maritime Electronic Commerce for the Twenty-First Century, 22 Mar. Law. 463, Julane Maritime Law Journal Summer, 1998.*

Cruellas, Juan Carlos, Kesterson II, Hoyt L, Medina, Manuel, and Rubia, Montse, EDI and Digital Signatures for Business to Business Eclectronic Commerce, 38 Jurimetrics J. 497, American Bar Assoication Jurimetrics, Spring, 1998.*

Review of Maritime Transport 1998, United Nations.*

CMI Rules for Electronic Bills of Lading, 1990 retrieved from Google.*

Nilson, Ake, European Trusted Services (ETS) Results of 1995 TTPS Projects, Marinade Limited, Apr. 1997.*

Bolero Final Report prepared by Deloitte and Touche released on Oct. 6, 1995.*

Muthow, Erik, The Impact of EDI on Bills of Lading published 1997 retrieved from Google.*

Kelly, Richard Brett, Comment: The CMI Charts a Couse on the Sear of Electronic Data, Tulane Maritime Law Journal, Spring, 1992, 16 Tul. Mar. LJ 349.*

United Nations Commission on International Trade Law, Working Group onf Electronic Data Interchange published Jan. 31, 1996.*

The Bolero Service—Business Requirements Specification, Jan. 1998.

Bolero—International Feasibility Report, Nov. 1997.

Merges et al. "Toward a Computerized System for Negotiating Ocean Bills of Lading" (1986) vol. 6:23 pp. 23-45.

* cited by examiner

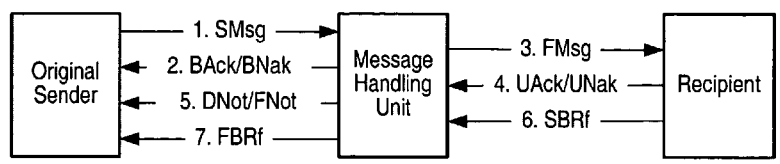
Fig. 7
UserID — XYZcompany  
Division Identifiers — CanadaDivision.Purchasing  
Extension — SJones
Fig. 8
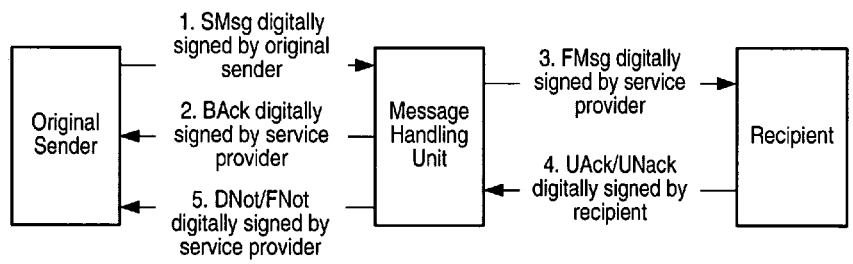
Fig. 9

| Message Type | Transmitted From | Transmitted To | Indicates |
|---|---|---|---|
| 1. SMsg (Sent Message) | Original sender of the Message | Message Handling Unit | Whatever its contents provide. |
| 2. BAck (Central System Acknowledgement) or BNak (Central System no acknowledgement) | Message Handling Unit | Original sender of the Message | The SMsg was received by the Central System and satisfies the prescribed Message Validity Requirements. |
| | Message Handling Unit | Original sender of the Message | The message was received by the Central System, but failed to satisfy the prescribed Message Validity Requirements. |
| 3. FMsg (Forwarded Message) | Message Handling Unit | Intended recipient of the SMsg | All that the original SMsg contained, but bearing the Service Provider's Digital Signature (rather than the original sender's) and having a Type Header in a somewhat different form. The FMsg Type Header indicates who the original sender was. |
| 4. UAck (User acknowledgement) or UNak (User non-acknowledgement) | Recipient of the SMsg | Message Handling Unit | The SMsg (as forwarded by the Central System in the FMsg) was received by the recipient and satisfied the prescribed Message Validity Requirements. |
| | Recipient of the SMsg | Message Handling Unit | The SMsg (as forwarded) was received by the recipient but failed to satisfy the prescribed Message Validity Requirements. |
| 5. DNot (Delivery notification) or FNot (fatal notification) | Message Handling Unit | Original sender of the SMsg | The SMsg (as forwarded in the form of a FMsg) was properly received, as indicated in a UAck from recipient. |
| | Message Handling Unit | Original sender of the SMsg | The SMsg (as forwarded in the form of a FMsg) was not properly received, as indicated in a UNak from recipient. |
| 6. SBRf (Sent business refusal) | Recipient of the FMsg | Message Handling Unit | The recipient intends to ignore the received and acknowledged FMsg. |
| 7. FBRf (Forwarded business refusal) | Message Handling Unit | Original sender of the SMsg | The recipient intends to ignore the received and acknowledged FMsg as per an SBRf sent to the Message Handling Unit. |

Fig. 7A

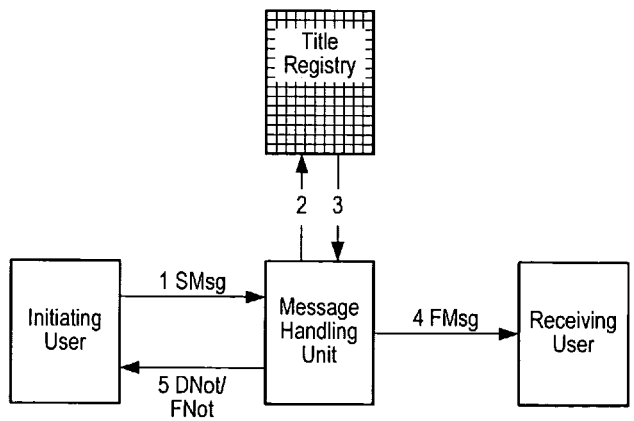

| Title Registry Record | | |
|---|---|---|
| BBL Text UID | shipsRus.genlegal.Enoffice | ⎫ Document ID of BBL Text |
| BBL Text GenID | 2593872 | ⎭ |
| Originator/Carrier | shipsRus.SEdiv.mstr0923 | ⎫ |
| Shipper | ExportsUnlimited.LogistSouth.ShipDesk | |
| Holder | TradeBank.LCcentral.Ops45.F932 | Role fields in Title Registry Record containing User IDs |
| Consignee | | |
| To Order Party | XYWholesale.purchasing.US | |
| Pledgee | TradeBank.purchasing.US | |
| Surrender Party | | ⎭ |
| Blank-endorsed | ☐ | ⎫ |
| Negotiable | ☑ | On/off fields |
| Amendment pending | ☐ | ⎭ |

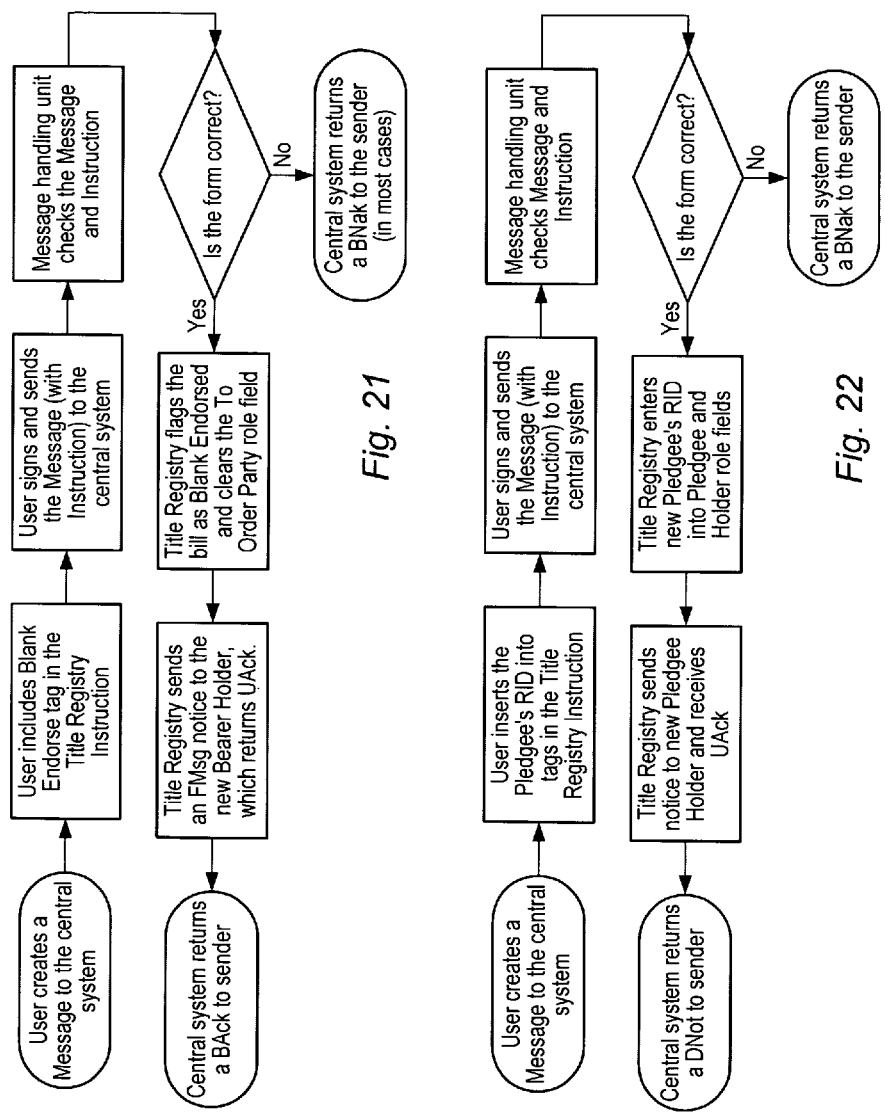

| Parties/states | 1 | 2 | 3 | 4 | 5 | 6 | 7 |
|---|---|---|---|---|---|---|---|
| Originator | O | O | O | O | O | O | O |
| Surrender Party[1] | SP | SP | SP | SP | SP | SP | SP |
| Shipper | S | S | S | S | S | S | S |
| Holder | H | | | H=TO | H | H=C | H |
| Pledge Holder | | PH | PH | | | | |
| To Order | | | TO | TO=H | TO | | |
| Consignee | | | | | | C=H | C |
| Functions/states | 1 | 2 | 3 | 4 | 5 | 6 | 7 |
| Create BBL | O | | | | O | | O |
| Name Holder | H | PH | PH | H | H | H | H |
| Name Pledgee Holder | H[2] | PH | PH | H/TO | H | | |
| Name To Order | H | PH[3] | | H/TO | | | |
| Name Consignee | H | PH[4] | | H/TO | | | |
| Blank Endorse | | | | H/TO | | | |
| Enforce Pledge | | PH | PH | | | | |
| Request Amendment | H | PH | PH | H/TO | H | H | H |
| Grant Amendment[5] | O | O | O | O | O | O | O |
| Deny Amendment | O | O | O | O | O | O | O |
| Switch to Paper | H | PH | PH | H | H | H | H |
| Surrender BBL | | | | H/TO | | C | |

Fig. 32

| Function | Issuer[1] | Required Info | Optional Parties[1] | Enclose eBL | Business Refusal | Auto Notify | Attornmt. Notice | E. Chain Record | E. Chain Return |
|---|---|---|---|---|---|---|---|---|---|
| Create | O | ID, T, O, S, and TO, C or B | SP | Yes | No | S, H, SP[2] | See text | No | No |
| Name Holder | H or PH | ID, H | TO, C or B | Yes | When H=TO or H=C[3] | H | See text | See text | Yes |
| Name Pledgee Holder | H or PH | ID, PH | TO or B | Yes | No | PH | Yes | No | Yes |
| Name To Order | H or PH | ID, TO | None | No | No | None | No | When H=TO | See text |
| Name Consignee | H or PH | ID, C | None | No | No | None | No | When H=C | See text |
| Blank Endorse | H | ID | None | No | No | None | No | No | No |
| Enforce Pledge | PH | ID | None | No | No | None | No | When H=TO | Yes[5] |
| Request Amendment | H or PH | ID, Free text | None | No | No | O | No | No | Yes[6] |
| Grant Amendment[4] | O | ID, T, S, and TO, C or B, RAID | SP | Yes | No | H or PH | See text | See text | See text |
| Deny Amendment | O | RAID | None | No | No | H or PH | No | No | No |
| Switch to Paper | H or PH | ID | None | No | No | O,SP[2] | No | No | Yes |
| Surrender | H | ID | None | No | No | O,SP[2] | No | No | Yes |

Fig. 33

| From \ To | BH | PH | PH?TO | H=T | H?TO | H=C | H?C |
|---|---|---|---|---|---|---|---|
| Create | A | | | | Null | | Null |

Fig. 34

| From \ To | BH | PH | PH?TO | H=T | H?TO | H=C | H?C |
|---|---|---|---|---|---|---|---|
| BH | 0: D<br>1: A,D | 1: A,D | | | | | |
| PH | 0: D<br>1: A,D | 0: D<br>1: A,D | | | | | |
| PH?TO | | | 0: D<br>1: A,D | 1: A,B,R,D | 0: D<br>1: D | | |
| H=T | | | 1: A,D | 0: D | 1: D | | |
| H?TO | | | 1: A,D | 1: A,B,R,D | 0: D<br>1: D | | |
| H=C | | | | | | 0: D | 1: D |
| H?C | | | | | | 1: A,B,R,D | 0: D<br>1: D |

Fig. 35

| From \ To | BH | PH | PH?TO | H=T | H?TO | H=C | H?C |
|---|---|---|---|---|---|---|---|
| BH | | | | R,D[1] | Null | R,D[1] | Null |
| PH | | | Null | | | | |
| PH?TO | | | | | | | |
| H=T | D | | | Null | Null | Null | Null |
| H?TO | | | | | | | |
| H=C | | | | | | | |
| H?C | | | | | | | |

Fig. 36

| From \ To | BH | PH | PH?TO | H=T | H?TO | H=C | H?C |
|---|---|---|---|---|---|---|---|
| BH | | | 1: A,D | 0: R, D<br>1: A,B,R,D | 0: D<br>1: D | 0: R, D<br>1: A,B,R,D | 0: D<br>1: D |
| PH | | | 0: D<br>1: A,D | 0: R, D<br>1: A,B,R,D | 0: D<br>1: D | 0: R, D<br>1: A,B,R,D | 0: D<br>1: D |
| PH?TO | | | | | | | |
| H=T | 0: D<br>1: A,D | 1: A,D | 1: A,D | 0: D<br>1: A,B,R,D | 0: D<br>1: D | 0: R, D<br>1: A,B,R,D | 0: D<br>1: D |
| H?TO | | | | | | | |
| H=C | | | | | | | |
| H?C | | | | | | | |

*Fig. 37*

| From \ To | BH | PH | PH?TO | H=T | H?TO | H=C | H?C |
|---|---|---|---|---|---|---|---|
| BH | | | | | | | |
| PH | Null | | | | | | |
| PH?TO | | | | R,D¹ | | | |
| H=T | | | | | | | |
| H?TO | | | | | | | |
| H=C | | | | | | | |
| H?C | | | | | | | |

*Fig. 38*

| From \ To | BH | PH | PH?TO | H=T | H?TO | H=C | H?C |
|---|---|---|---|---|---|---|---|
| BH | D | | | | D | | D |
| PH | | D | D | | | | |
| PH?TO | | D | D | | | | |
| H=T | D | | | D | D | R,D | |
| H?TO | A,D | | | | D | | |
| H=C | D | | | R,D | | D | D |
| H?C | A,D | | | | | | D |

*Fig. 39*

| From \ To | BH | PH | PH?TO | H=T | H?TO | H=C | H?C |
|---|---|---|---|---|---|---|---|
| BH | A | | | | Null | | Null |
| PH | | A | A | | | | |
| PH?TO | | A | A | | | | |
| H=T | A | | | A,R,D¹ | Null | A,R,D¹ | |
| H?TO | A | | | | Null | | |
| H=C | A | | | A,R,D¹ | | A,R,D¹ | Null |
| H?C | A | | | | | | Null |

Fig. 40

| ReasonCode | ReasonDescription | Explanation |
|---|---|---|
| -2002 | Document does not exist | The eBL document does not exist in the Title Registry. |
| -2015 | Function not allowed | The function is not allowed in the present state of the BBL or the user has no right to execute the function. |
| -2023 | Originators on documents are not the same | It is not allowed to request an amendment (a request for a combine) if the Originators are not the same on all documents. |
| -2031 | BBL type is not correct | The BBL Type does correspond to the type of the contract party (ToOrder BlankEndorse, Consignee). |
| -2034 | Request ID error | Invalid RequestID used. |
| -2041 | Business refusal not allowed | It is not allowed to issue a business refusal in this state. |
| -2042 | No of documents supplied not correct | The number of documents specified in a grant amendment is not correct. |
| -2044 | Documents not current or active | The document is no longer active. |
| -2045 | Document(s) not enclosed | The document referenced must be enclosed (attached) to the mail. |
| -2047 | Amendment request ID not positive | The request ID must be positive. |
| -2050 | Document version mismatch | The version of the active document do not correspond the version used in the instruction. |
| -2053 | User not found in parent list | The Registered User ID used in the TR instruction is not found in a ParentList in the VLDT. |
| -2054 | Empty user ID in Role: <<Role>> | Invalid (empty) user ID. |
| -3001 | XML parsing failed: <<Error description>> | The XML document received in a PDU contains a syntax error, and the TR instruction is not executed. |

Fig. 41

TRANSACTION SUPPORT SYSTEM

BACKGROUND OF THE INVENTION

The invention relates to a computer system for supporting commercial transactions, more especially but not exclusively a computer system for supporting trade of goods by shipping, wherein shipping will be understood to include transit of goods in ocean going vessels, air-freight, rail-freight and road haulage, for example.

For several centuries there have been established procedures for international trade in goods based around the use of a Bill of Lading. A Bill of Lading is a document used in connection with shipment of goods from a seller (or other party causing a shipment) to a buyer (or other receiving party) via a carrier. The Bill of Lading is generated by the carrier when the seller gives over the goods to the carrier for shipment from a dispatch port to a destination port.

The Bill of Lading includes an inventory of the goods received by the carrier and a verification by the carrier of the good condition of the goods. The Bill of Lading also includes a contract between the carrier and the seller that includes an undertaking by the carrier only to hand over the goods at the destination port to someone who produces the Bill of Lading.

After generation by the carrier, the Bill of Lading is initially in the possession of the seller. While the goods are in transit with the carrier, the Bill of Lading passes from the seller to the buyer, often via various intermediaries such as the seller's bank and the buyer's bank. Ultimately, the Bill of Lading becomes exhausted when presented to the carrier at the destination port in exchange for the goods.

Some details of a common transaction between buyer and seller via their respective banks is now described. The goods are handed over to the carrier at the dispatch port. The carrier generates a Bill of Lading and certifies the goods to be complete and in good order. The seller takes the Bill of Lading and gives it to his bank. The seller's bank may then credit the seller's account with the sales amount associated with the goods, if a letter of credit and bill of exchange are also present for the transaction. The seller's bank then sends the Bill of Lading to the buyer's bank. The buyer's bank now in receipt of the Bill of Lading credits the seller's bank by the sales amount and debits the buyer's account by the sales amount. The buyer's bank then sends the Bill of Lading to the buyer, who is then in possession of the Bill of Lading and thus able to pick up the goods from the carrier at the destination port. In practice, the handling of the Bill of Lading by the various parties is often affected by the existence and terms of other documents involved in the transaction, but these collateral documents are not described here for the sake of brevity. Moreover, the Bill of Lading is not itself a payment instrument, the corresponding payment instrument often takes the form of a Bill of Exchange or Draft. Again, the nature and role of these documents are not described here.

The Bill of Lading may be a non-negotiable (i.e. non-transferable) instrument, in which the designated buyer cannot be changed. In this case, the carrier is bound only to hand over the goods at the destination port to the buyer stated in the Bill of Lading at the time of its generation by the carrier at the dispatch port. The designated buyer of a non-negotiable Bill of Lading is referred to as a consignee. The non-negotiable Bill of Lading is referred to as a Straight Bill of Lading.

However, it is also widespread practice for the Bill of Lading to be a negotiable instrument, in which case the designated buyer can be changed during transit of the goods. In such cases, the designated buyer may in fact not be the ultimate recipient of the goods, but is merely an intermediate endorsee of the Bill of Lading. The endorsee of a negotiable Bill of Lading is referred to as the To Order Party. When the Bill of Lading is generated by the carrier, it already specifies whether the Bill of Lading is negotiable or not. If the Bill of Lading is negotiable when generated, the carrier will know that the To Order Party, i.e. the designated buyer, may change in transit. Clearly, if the Bill of Lading is generated as a negotiable Bill of Lading and the buyer is changed in transit, then the carrier will give up the goods at the destination port to whoever produces the Bill of Lading.

It is physically possible for the To Order Party stated on the negotiable Bill of Lading to be changed by any party in possession of the Bill of Lading. However, it is usual practice that parties do not endorse Bills of Lading to banks, for example, and thus, banks do not become To Order Parties even though they receive, hold and pass on the Bill of Lading. Banks generally rely only on physical possession of the Bill of Lading to secure their position in relation to other parties involved in the transaction.

A negotiable Bill of Lading may also be negotiated the person who physically possesses it (its bearer), if it is endorsed in blank. Such a Bill of Lading has no To Order Party while blank endorsed. The To Order Party may later be added at some stage prior to the goods being picked up from the carrier at the destination port. Again, generally banks do not wish to appear in the visible chain of endorsement and so will receive, hold and pass on a blank endorsed Bill of Lading without entering themselves as a To Order Party, although the utilize possession of the Bill of Lading as a sort of collateral for credit they have extended. However, commercial intermediaries may wish to enter themselves as a To Order Party to indicate their interest.

Thus, either with a blank endorsed Bill of Lading or an endorsed Bill of Lading with a specified To Order Party, the Bill of Lading may pass through a party who makes no change to the Bill of Lading and thus relies solely on physical possession of the Bill of Lading to establish or secure his interests. This has the advantage that confidentiality is retained since a party such as an intermediary bank will remain unknown in the transactional history of the Bill of Lading, since there is no evidence on the Bill of Lading to trace back previous holders of the Bill of Lading unless they were entered at some stage as the To Order Party.

It will thus be understood that, especially in the case of negotiable Bills of Lading, the conventional Bill of Lading transaction system relies extensively on undocumented physical possession of the Bill of Lading. Moreover, it is common for there to be divergence between the apparent legal chain of endorsement on the goods in transit, as evidenced by the Bill of Lading, and the real chain of constructive possession of the goods through possession of the Bill of Lading. The conventional Bill of Lading system is thus reliant on the uniqueness of a Bill of Lading. There must only be one Bill of Lading, since the whole system is based on the passing of rights with the Bill of Lading, i.e. with a unique document specific to one transit of the goods that are specified in the inventory part of the Bill of Lading.

However, various practices have developed which undermine the effectiveness of the conventional Bill of Lading system.

One malpractice is the issuance of multiple Bills of Lading for the same goods by the carrier. The carrier provides the multiple originals to the seller. Taking the example that two originals are generated, the seller can pass one to his bank to obtain prompt payment for the goods in transit. The seller can then pass the other to the buyer, so that the buyer will be able to pick up the goods from the carrier, even if there are delays with the processing of the Bill of Lading by the seller and buyer banks. Carrier, buyer and seller all have an interest in colluding in this way. However, once multiple Bills of Lading are in existence for the same goods, the whole system is liable to fraud, even if the original motive for issuing the multiple Bills of Lading was not itself fraudulent. The scope for fraudulent activity is especially high for negotiable Bills of Lading, most especially for blank endorsed Bills of Lading. For example, Bills of Lading may be accepted as security for loans or mortgages which could thus be fraudulently obtained. It is thus possible for multiple loans, for example, to be obtained using a single consignment of goods as security.

Another malpractice is forgery of the Bill of Lading. If a Bill of Lading is forged, then the carrier may hand over the goods at the destination port to a person who produces the forged Bill of Lading together with bogus identity impersonating a representative of the consignee or To Order Party. Scope for forgery arises when information on the nature of a shipment can be obtained by the forger, for example by obtaining a photocopy of the Bill of Lading. In the case of ocean transit by ships, the minimum transit time may be several weeks, in which case a forger has considerable time to complete the forgery.

Although the conventional Bill of Lading procedures are imperfect, their continued existence as the main transaction system underpinning international trade is a testament to the fact that to date no viable and superior alternative has been established. Electronic transaction systems are well established in other areas of banking and commerce, in some cases almost to the exclusion of conventional paper transaction instruments. Notable examples are the computer systems operated to underpin electronic payment transactions.

An e-mail approach to making a Bill of Lading work electronically has been previously proposed, but fails because it does not take sufficient account of the fact that the conventional Bill of Lading system relies on there being only one original Bill of Lading. If a computer record is generated to represent a Bill of Lading and it is transmitted from a transmitting party to a receiving party, the Bill of Lading record loses its functionality as a Bill of Lading, if the system cannot distinguish between the copy of the Bill of Lading record at the receiving party and the copy of the Bill of Lading record at the transmitting party. Moreover, such an electronic system is still more prone to the types of fraud based around multiple Bills of Lading described above, since the Bill of Lading is merely a computer record that passes through several computer systems and is thus prone to replication by any party in the transaction chain.

SUMMARY OF THE INVENTION

Particular and preferred aspects of the invention are set out in the accompanying independent and dependent claims. Features of the dependent claims may be combined with those of the independent claims as appropriate and in combinations other than those explicitly set out in the claims.

According to the invention there is provided a centralized database system, accessed by system users over a network through a message handling unit. The database forms a registry recording the entitlements of the users, who are a defined group, to perform prescribed actions in relation to electronically created records. The electronically created records represent a strictly defined series of rights and obligations in relation to underlying property. The users become entitled by virtue of their designation to prescribed roles by a previously entitled user. Designation of a user to a prescribed role in a record takes place by means of a system user sending an electronic instruction to the database, these electronic instructions being referred to as registry instructions or title registry instructions.

The database performs according to a common contractual arrangement entered in to by all users. To become a user, the intending user is required to enter into a service contract with the system service provider in which the intending user undertakes to agree to and abide by a defined set of rules. That is, each User agrees, as a condition of becoming a User of the System, to be bound by the provisions of the rules. The rules, codified in a rule book, together with the service contract provide the legal framework underpinning and enabling the functioning of the database system as a support system for transactions in property.

As a result, each transaction record in the central database goes through a complete life cycle of creation, change and exhaustion, entirely under the control of the users. The integrity of the central database can be maintained wholly automatically by the system approving or rejecting user instructions received with e-mail or other messages solely on the basis of their conformity to the closed set of logical rules defined in the rulebook. Since every user has agreed to be contractually bound by the rulebook, user actions in the form of electronic instructions to create, change and exhaust electronic records are contractually binding on all affected users, provided only that the instructions themselves conform to the rulebook. Moreover, the legal significance of the transaction record contents and changes thereto also follows automatically from the common contractual arrangement. The central database can thus be maintained in a wholly automated manner by the service provider through checking instruction conformity against the agreed rules and notifying affected parties, also as defined in the common contractual arrangement. Further, the changing functions and significances of a bill of lading take effect automatically, through the changes to the transaction record, solely under user initiation. No subjective assessment is required of the contents of any individual record held in the central database, i.e. there exists no human system supervisor or administrator roles for the day-to-day processing of the transaction records.

Each individual electronic record is created in the database by a user who belongs to a defined group of users. A record is created by means of a registry instruction sent by an instructing user concerning specific property rights, such property rights being vested in the instructing user. Each record may be created, in accordance with the instructing user's instructions, to be capable of complete transferability to other users or limited transferability to other specified users.

Each record has one holder who is a user of the system. Holdership is defined by the presence of a user identifier of the holder/user in a field of the record. The holder has exclusive dominion over the record and exclusive entitlement to pass the status of holder to another user. Passing the holder status is achieved by the current holder/user sending a registry instruction instructing that another specified user be substituted in the holder field of the record concerned.

Each electronic record can be converted into a physical documentary record (hard copy) by means of a registry instruction of the holder of the electronic record.

The entitlement of a holder to certain rights and obligations in the underlying property is reliant on the attainment either prior to or simultaneously with another role designated by an entitled user. Other designated roles include contingent or discretionary roles where the user so designated (and simultaneously being the holder of the record) is entitled to designate itself to a different role by means of a registry instruction. Such different roles providing different rights and/or obligations.

The right to dispose or direct the disposition of the underlying property is conditional on a single user being designated to prescribed coincident roles and the user so designated communicating a registry instruction to the user which had created the record. Thereafter, transactions relating to that record are complete and no further designations are permitted and the record is terminated.

Each electronic record has associated therewith, in addition to specific audit trail kept in the database, an endorsement chain recording the legally significant passage of rights and obligations. The endorsement chain is distributed together with a message from the database to the new designee, according to its role as designated user.

Each electronic record is capable of being modified by the user which created the record in accordance with a registry instruction previously sent by the holder of the record. The user that created the record is entitled to modify, decline to modify or create a new electronic record or records based on prescribed rules.

Each electronic record is capable of being temporarily suspended as a result of prescribed registry instructions sent by the holder of the record.

The ability to handle transaction support in this way allows a number of further advantages to be attained, in particular in comparison with the long-established traditional paper based system and other previously contemplated electronic systems.

(1) A system of moving of moving originals in paper form inevitably takes time as the documents move from Holder to Holder in different countries and often different continents. In some instances, particularly where a shipment is traded many times (e.g., oil and dry bulk cargoes) it is rare that the original document is available at the port of discharge. A complex system of letters of indemnity, which bring a new set of problems, has grown up to try and circumvent this problem. In addition to risk mitigation, improving the speed enables those involved in international trade to be more certain of being able to get the goods and to reduce inventory.

(2) Much of the information contained in a bill of lading is repeated in collateral documents. The potential for error in completing collateral documents and the bill of lading is high and a high proportion of documents have to be returned for amendment. Electronic documents reduce the risk of mis-keying as the same information is re-used in completing the documents.

(3) The use of a central database enables electronic records to be made 'tamper proof'. Authenticity is thus ensured while at the same time allowing flexibility for users through access over a public network, for example the Internet. Unlike its paper document counterpart, any attempt to modify the content of a properly constructed electronic record held in the central database immediately scrambles the record completely rendering it unusable. Paper documents are prone to minor alterations that can have serious implications. Moreover, a chain-based electronic mail system with the bill of lading attached as an electronic record would suffer from the same problems as paper documents, but to a much greater extent.

(4) The use of digital signature technology and electronic certificates means that the recipient of a message can be sure that the message came from a particular party. In this way the possibilities for repudiation are limited and, moreover, carefully defined. This allows specific user-repudiation actions to be incorporated, these being referred to as business refusals in the following.

(5) Confidentiality is achieved, since the electronic documents can be encrypted to prevent unauthorised access to commercially secret information.

(6) All of the above factors improve accuracy and allow for machine verification of electronic records. Considerable expense is saved in re-keying and human verification. A more secure and accurate system permits users to be more sure that the process will work without the necessity for re-processing which is costly and delays the process.

Accordingly, in a further aspect of the invention there is provided, an electronic transaction support system for supporting transactions of property between ones of a defined group of users, each with a user identifier. The system includes a registry comprising a database of records in which each record supports one transaction and comprises a plurality of fields in which users can be named. Each record reflects the rights and obligations of the named users in relation to the property underlying the transaction. Each record includes at least one field in which one of the users is named to signify that user's dominion over the record and exclusive entitlement to pass that dominion to another of the users. One field or a combination of two or more fields may be used to signify this kind of holdership. The system also includes a message handling unit arranged to receive messages transmitted from the users, the messages including the user identifier of the transmitting user and a registry instruction, wherein creation, maintenance and de-activation of the database records are performed responsive to registry instructions contained in user messages. The system still further includes a registry maintenance unit connected to the message handling unit so as to receive registry instructions and the associated user identifiers. The registry maintenance unit is responsive to registry instructions according to a closed group of instruction types, each registry instruction being actioned by the registry maintenance unit conditional on a test performed to establish conformity of the registry instruction with a set of rules specific to the instruction type concerned. The sets of rules reflect a book of rules, or Rulebook, to which all users of the system are bound to adhere by a common contractual arrangement. The Rulebook strictly defines the users' rights and obligations in relation to the property underlying the transaction.

The set of rules of at least one instruction type may specify that the user identifier of the transmitting user shall correspond to a user named in said at least one field and one further field of the record. In this way, some of said rights and obligations in relation to the property underlying the transaction can be derived from a single user having coincident roles defined by being named in two fields of the record.

The at least one field may consist of the holder field and a pledgee holder field, wherein the sets of rules for the respective registry instruction types collectively ensure that a user shall be named in one, and only one, of the holder field and the pledgee holder field.

Each record may further include a to-order party field in which one of the users may be named, but which may have no named user, and a consignee field in which one of the users may be named, but which may have no named user. In this case, the sets of rules for all the respective registry instruction types have in common that they allow no more than one of the to-order party field and the consignee field simultaneously to have a named user.

Each record may further include an originator field in which one of the users is named in each active record, and a shipper field in which one of the users is named in each active record. Among the instruction types, there can then be an instruction type for creating a new record. The set of rules for the create record instruction type can then stipulate that a user shall be named in each of the originator field, the shipper field and the holder field, and that the user named in the originator field shall correspond with the user identifier of the transmitting user. The set of rules for the create record instruction type also preferably stipulates that a new record shall have no named user in the pledgee holder field. The sets of rules for all the respective registry instruction types preferably also have in common that they do not allow the user named in the originator field to be changed.

The set of rules for the create record instruction type may stipulate that a create record instruction shall contain one and only one of (i) a user identifier for naming in the consignee field, (ii) a user identifier for naming in the to-order party field, and (iii) an indication that no user is to be named in both the consignee field and the to-order party field.

The set of rules for the create record instruction type may also stipulate that the user specified for naming in the holder field shall not correspond to a user specified for naming in either the consignee field or the to-order party field.

The system may also be such that the registry maintenance unit is further configured so that, when a create record instruction is actioned by the registry maintenance unit, the message handling unit is caused to send a message to the user named in the holder field of the created record signifying that user's dominion over the record, and to send a further message to the user named in the shipper field.

Among the instruction types, there may be provided at least one instruction type for changing the user named in the holder field, thereby to change dominion over the record. The set of rules for the name holder instruction type can stipulate that the user identifier of the transmitting user shall correspond to a user currently named in said at least one field.

The set of rules for the name holder instruction type preferably stipulate that the user identifier of the transmitting user shall correspond to the user currently named in one of the holder field and the pledgee holder field.

Among the instruction types, there can also be provided at least one instruction type for changing the user named in the pledgee holder field, thereby to change dominion over the record. The set of rules for the name pledgee holder instruction type preferably stipulates that the user identifier of the transmitting user shall correspond to the user currently named in one of the holder field and the pledgee holder field.

The set of rules for the name pledgee holder instruction type may further stipulate that: (a) the consignee field shall have no existing named user; (b) the user identifier of the transmitting user shall not correspond to the user specified to become the pledgee holder in the instruction; and/or (c) actioning of the instruction shall not result in correspondence between the user named in the pledgee holder field and the user named in the to-order party field.

The registry maintenance unit may be configured to cause a message to be sent from the message handling unit to the user named in the holder field or pledgee holder field after actioning of a name holder instruction or name pledgee holder instruction respectively, notifying the user that dominion over the record have passed to him.

Each record may further include an associated history file, the registry maintenance unit being configured to action at least some types of registry instruction by writing data relating to registry instruction requests to the history file of the record concerned, thereby to maintain an audit trail of actions requested on that record. Preferably, there are no registry instruction types that allow history files to be accessed by users of the system.

The sets of rules for all the respective registry instruction types may advantageously additionally have in common that they: (a) allow no more than one of the pledgee holder field and the consignee field simultaneously to have a named user; and/or (b) prevent a record adopting a state in which a user named in the pledgee holder field corresponds to a user named in the to-order party field.

Each record may further include an associated endorsement chain file in which is stored a time ordered list of users who have been contracting parties to the record, the endorsement chain file being maintained by the registry maintenance unit. In this respect, a contracting party can be defined as including a user who is named simultaneously in (a) the holder field and the consignee field of a record, and (b) the holder field and the to-order party field of a record.

Each time the record changes state so as to create a new contracting party, the registry maintenance unit can be configured to cause the message handling unit to send a copy of the endorsement chain to the user who is the new contracting party.

The registry instructions may include a business refusal instruction type for revoking an immediately previous registry instruction that resulted in a change of the user designated as holder, i.e. the user named in said at least one field. The registry maintenance unit is then configured to action a business refusal instruction by changing the record back to its immediately previous state. The set of rules for the business refusal instruction type stipulate that: the user identifier of the transmitting user shall correspond to the user named in said at least one field. Moreover, some provision for a time-out is preferable to provide for third party certainty. For example, the relevant rule may specify that the business refusal instruction shall be received within a defined period of time from the immediately previous registry instruction. A time out of one day is used in the best mode embodiment. Any other period of time, preferably a fixed period of time can be used.

The set of rules for the business refusal instruction type may further stipulate that: the user identifier of the transmitting user shall correspond to the user named in the holder field; and/or the user identifier of the transmitting user shall correspond to the user named in one of the to-order party field and the consignee field.

The registry maintenance unit may be configured so that, following actioning of a business refusal instruction by the registry maintenance unit, a message is caused to be sent from the message handling unit to the user named in said at least one field after actioning of the business refusal instruction, notifying that dominion over the record has reverted to him following refusal of the user named in the holder field by the immediately previous instruction to accept dominion over the record.

The registry maintenance unit may also be configured to action a business refusal instruction by reversing any change in the endorsement chain file that resulted from the immediately previous registry instruction.

The registry instructions may also include an instruction type for naming a user in the to-order party field. The set of rules for such a name to-order party instruction type may stipulate that: (a) the consignee field shall have no existing named user; (b) the user identifier of the transmitting user shall correspond to the user named in the holder field or the pledgee holder field; and/or (c) actioning of the instruction shall not result in correspondence between the user named in the pledgee holder field and the user named in the to-order party field.

The registry instructions may further include an instruction type for naming a user in the consignee field to signify non-transferability of the record. The set of rules for the name consignee instruction type may stipulate that: (a) the consignee field shall having no existing named user; (b) the user identifier of the transmitting user shall correspond to the user named in the holder field or in the pledgee holder field; and/or (c) the to-order party field shall either have no named user or the named user specified in the holder field.

The registry instructions may still further include an instruction type for blank endorsing a record by removing the user specified in the to-order party field thereof. The set of rules for the blank endorse instruction type may stipulate that: (a) the user identifier of the transmitting user shall correspond to the user named in the holder field; and/or (b) the user identifier of the transmitting user shall correspond to the user named in the to-order party field.

The registry instructions may also include an instruction type for enforcing a pledge over a record. This can be implemented by (i) naming the user specified in the pledgee holder field as the user specified in the to-order party, and (ii) deleting the user specified in the pledgee holder field and naming that user instead in the holder field. The set of rules for such an enforce pledge instruction type may stipulate that the user identifier of the transmitting user shall correspond to the user named in the pledgee holder field.

The registry instructions may also include an instruction type for switching from electronic support of a transaction by the system to conventional paper-based supporting of the transaction outside the system. The set of rules for a switch-to-paper instruction may stipulate that the user identifier of the transmitting user shall correspond to the user named in said at least one field. The registry management unit can be configured to action a switch-to-paper instruction by de-activating the record concerned, and to cause a message to be sent from the message handling unit to the user named in the originator field requiring creation of a paper document based on the contents of the de-activated record which are included as part of the message.

Each record may further include a surrender party field in which one of the users may be named, but which may have no named user. The registry instructions may include in this case an instruction type for surrendering the record to signify disposition of the property underlying the transaction. The registry maintenance unit can then be configured to action a surrender record instruction by de-activating the record. The set of rules for the surrender record instruction type may stipulate that the user identifier of the transmitting user shall correspond to (a) the user named in the holder field and also (b) the user named in one of the to-order party field and the consignee field. The registry maintenance unit is preferably configured so that, when a message is actioned that includes a registry instruction of the surrender type, the registry maintenance unit causes the message handling unit to send a message to the user named in the originator field, and to any user named in the surrender party field, indicating that the record has been de-activated.

Moreover, the registry management unit being configured to action a switch-to-paper instruction by causing a message to be sent from the message handling unit to the user named in the originator field, and to any user named in the surrender party field.

The registry instructions may also include further instruction types for requesting amendment, granting amendment, and denying amendment of a record.

The set of rules for the request amendment instruction type may stipulate that the user identifier of the transmitting user shall correspond to the user named in said at least one field.

The registry maintenance unit may be configured to action a request amendment instruction by allocating an amendment identifier to the request amendment instruction and storing that amendment identifier, and by causing the message handling unit to send a message to the user named in the originator field of the record, the message including the request amendment instruction together with the amendment identifier allocated thereto; and The set of rules for grant and deny amendment instruction types may each stipulate that the user identifier of the transmitting user shall correspond to the user named in the originator field, and that the message containing the instruction shall include an amendment identifier corresponding to the amendment identifier stored for the record concerned.

Each record may further include an amendment pending field for indicating whether or not a request amendment instruction is pending, the registry maintenance unit being configured to set the amendment pending field responsive to a request amendment instruction and to un-set the amendment pending field responsive to a grant or deny amendment instruction, wherein the registry maintenance unit is configured to prevent changes to the record while the amendment pending field is set.

The registry maintenance unit may be configured to action a deny amendment instruction by sending a message to the user who issued the request amendment instruction indicating that the user named in the originator field has issued a deny amendment instruction responsive to the request amendment instruction.

A grant amendment instruction may be actioned by the registry maintenance unit, depending on content of the grant amendment instruction, to result in one of the following: (a) multiple existing records being merged by their de-activation and creation of a single new record; (b) a single existing record being split into multiple records by de-activation of the single existing record and creation of multiple new records; (c) maintenance of a single existing record; and (d) deactivation of a single existing record and creation of another single record.

According to another aspect of the invention there is provided a recording medium on which is stored a title registry database for supporting transactions of property between ones of a defined group of users, each with a user identifier. The title registry database comprises a plurality of records, each for supporting one transaction, each record comprising a plurality of fields in which users can be named, each record reflecting the rights and obligations of the named users in relation to the property underlying the transaction, wherein each record includes at least one field in which one of the users is named to signify that user's dominion over the record and exclusive entitlement to pass that dominion to another of the users, said at least one field including a holder field.

According to a still further aspect of the invention there is provided a server for supporting transactions between a plurality of registered users each having a user identifier. The server comprising a database comprising a plurality of records each signifying a bill of lading and including a record identifier, wherein the database records have a structure including a field for specifying the user identifier of a holder having possession rights over the database record, including sole rights among the registered users for naming another registered user in the holder field and/or any registered user in at least one further field of the database record.

The server may be configured so that, when one registered user, who is the user entered in the holder field of a record, names another registered user in a database field of that record, the server initiates notification of the newly named registered user to that effect. Moreover, when the newly named registered user is entered into a field signifying being a party to the transaction, the server is preferably responsive to a business refusal instruction in respect of the naming of the newly named registered user for an amount of time known to the registered users and/or until such time as the server receives another command from the newly named registered user in respect of the record concerned.

BRIEF DESCRIPTION OF THE DRAWINGS

For a better understanding of the invention and to show how the same may be carried into effect reference is now made by way of example to the accompanying drawings in which:

FIG. 7 illustrates all type header flows;

FIG. 7A is a table summarizing message flow and type headers;

FIG. 8 illustrates identifier structure showing the identifier parts of a user identifier, a user division identifier, and an extension;

FIG. 9 is a block diagram illustrating signed message flow using the message handling unit;

FIG. 14 is a simplified illustration of a title registry record as presented in terms of its fields to a user;

FIG. 15 is a block diagram showing message flow for title registry operations;

FIG. 21 is a flow diagram showing the process of blank-endorsing an electronic bill of lading;

FIG. 22 is a flow diagram showing the process of designating a Pledgee;

FIG. 32 is a table summarizing the title registry functions and which party can execute which function;

FIG. 33 is a table summarizing the title registry functions and the conditions that apply to them;

FIG. 34 is a table showing for a Create instruction the functional elements of delivery of attornment notice, allowance of business refusal, creation of endorsement chain record and delivery of an endorsement chain record;

FIG. 35 is a table showing for Name Holder and Name Pledgee Holder instructions the functional elements of delivery of attornment notice, allowance of business refusal, creation of endorsement chain record and delivery of an endorsement chain record;

FIG. 36 is a table showing for Name to Order, Name Consignee and Blank Endorse instructions the functional elements of delivery of attornment notice, allowance of business refusal, creation of endorsement chain record and delivery of an endorsement chain record;

FIG. 37 is a table showing for allowed simultaneous instructions the functional elements of delivery of attornment notice, allowance of business refusal, creation of endorsement chain record and delivery of an endorsement chain record;

FIG. 38 is a table showing for an Enforce Pledge instruction the functional elements of delivery of attornment notice, allowance of business refusal, creation of endorsement chain record and delivery of an endorsement chain record;

FIG. 39 is a table showing for a Grant Amendment instruction (with a new eBL version) the functional elements of delivery of attornment notice, allowance of business refusal, creation of endorsement chain record and delivery of an endorsement chain record;

FIG. 40 is a table showing for a Grant Amendment instruction (with a new eBL identifier) the functional elements of delivery of attornment notice, allowance of business refusal, creation of endorsement chain record and delivery of an endorsement chain record; and FIG. 41 is a description of the errors a sender may receive as a result of validation errors or other errors in an incoming message.

DETAILED DESCRIPTION

Figure 1:
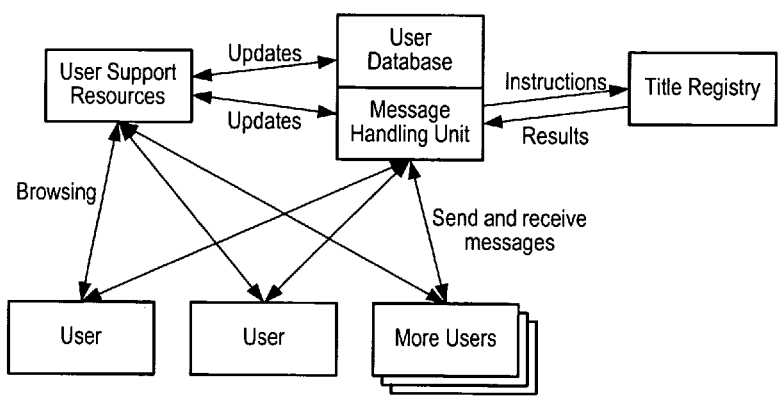
FIG. 1 is a block diagram showing information flow between system components, including the users, the message handling unit and the title registry.

The best mode embodiment of the invention is now described with reference to the accompanying drawings.

1. System Overview

The present system is a technological and legal infrastructure to facilitate trade transactions through electronic means. It uses information technology to transfer messages and store certain information, and a legal system of rules and contracts to determine the effects of certain messages and updates to the stored information, as defined in a Rulebook which is reproduced further below. The following text describes the operating procedures of that technology and its operation. The business effect of the functionality of the operating procedures depends heavily on the appended Rulebook. The operational rules of the Rulebook are also recited alongside the relevant operating procedures. The operational rules are mandatory and binding on system users by contract law in accordance with the Rulebook, and are also reflected in many design aspects of the computer system used for implementing the automated transaction support system.

Terms given special meanings in this document are defined in the Rulebook.

1.1. Basic Operational Structure and Processes

The structure of the present system comprises the message handling unit, the title registry, the user database, the user support resources and the user systems.

The message handling unit is a system for passing special electronic messages between system users among themselves and the system service provider, and for keeping track of those messages once sent. The message handling unit, as used in the present system, is a special mail server for transporting messages coupled with a database for logging and storing the messages once sent. It works closely with the user database to check user identifiers. The message handling unit also sends information into the title registry and the user support resources via special interfaces. Messages may, at the sender's option, include "attachments", which are documents or other units of digital information included in the message.

The title registry is a database of information created from and maintained by messages concerning rights and obligations in relation to specific transactions. The title registry records information used in conjunction with the legal rules and contracts of the present system to show the changing rights of system users in relation to an electronic bill of lading.

The user database is a database of information about system users and is used to identify proper and authorized users, limit access to the present system, and determine the authenticity of messages received from users by the message handling unit.

The user support resources comprise a collection of online information about system users, help on use of the present system, bulletins and alerts, your account status, and similar information; and a help desk for live support by telephone or e-mail. Further support resources may be added as desired. The online user support resources can be used through a WorldWide Web browser. Messages cannot be sent into the message handling unit and the title registry cannot be modified through the user support resources; they simply enable users to look up needed information and update the information pertaining to themselves.

User systems are a user's computer facilities, including a communications link to a network connected to the message handling unit, desktop computer hardware connected to that communications link, and software for creating, sending and receiving messages using the message handling unit.

The first four of the components listed above are central services provided by the system service provider to all users. The fifth component, user systems, are provided by third-party vendors and service bureaus, and need to conform with the specifications defined by the service provider for interfacing with the message handling unit.

Figure 1A:
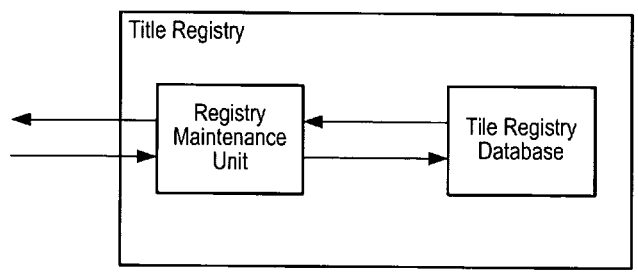
FIG. 1A shows internal structure of the title registry in more detail.

FIG. 1 illustrates the system structure and also shows the information and transaction flows between the components. Further internal structure of the title registry is shown in FIG. 1A. Some of the more important information flows are messaging between users, browsing the user support services, changing information in the user support resources and user database, and interaction with the title registry.

Regarding messaging between users, the principal means of communication between users of the present system is electronic messages via the message handling unit, which checks and logs each message as it passes through. The message handling unit also provides for acknowledgment of each message as it is received in order to assure the sender that a message is actually delivered.

Regarding browsing the online user support resources, to send another system user a message using the message handling unit, a user must know the recipient's user identifier (or user ID). The online user support resources enable one user to look up another user's identifier, to find out other available information about users, check the status of messages, and obtain help for use of the present system, all through a simple Web-browser interface. Authorized representatives of a user may also update certain information about the user.

Regarding the changing of information in the user support resources and user database, the information in the user support resources originates from the enrollment process by which new users join the system. After enrollment, a user updates its information using special online forms available through the user support resources.

Regarding interaction with the title registry, users introduce records into the title registry by sending digitally signed messages through the message handling unit. By the same means, they enter further information to update those records and modify their status and relations to those records and the rights they signify.

While making use of familiar desktop applications such as Web browsers, these processes have been designed for a far greater level of reliability and security than is common in Internet applications.

1.2. System Security

The present system secures its components and information flows mainly by user identification, resource access controls, document authentication, message integrity checking and message encryption.

Regarding user identification, the identity of all individuals using the system and their company affiliations are investigated and certified before usage is permitted. Factors that tend to weaken the reliability of an individual user's identification (such as repeated loss of a smart cards, lack of long-term familiarity, etc.) are taken into consideration in determining whether to issue a certificate identifying the user.

Regarding resource access controls, the ability of a user to gain access to and use the components of the present system is limited to the user's legitimate requirements. Further, access to and usage of the system is tracked and audited.

Regarding document authentication, all messages (including the attached documents they contain) are digitally signed by the person originating them. By digitally signing a message, a system user identifies itself with the message in a way functionally similar to a wet-ink signature on a paper document. The digital signature has the legal effects prescribed for it in the Rulebook.

Regarding message integrity checking, verifying a digital signature makes evident any changes in the digitally signed message made between the time when the message was signed and the time when verification took place. The present system verifies a message's digital signature on receipt of the message into the message handling unit. It then sends on the message only if it is verified as free from tampering.

Regarding message encryption, if the sender of a message wishes, the sender may encrypt the message so that, as a practical matter, it will not be readable by users other than the intended recipient. Some legal systems regulate the availability and use of encryption capabilities. users subject to those legal systems will, of course, need to comply with applicable encryption regulations. That compliance is required by the force of the regulations themselves, and by the general requirement in the Rulebook to comply with applicable regulations. The present system imposes no restrictions of its own on the use of encryption technology, other than the practical limits of what its implemented systems are capable of accommodating.

Some of these security processes work automatically, but some require the user to take certain actions. Areas in which users should consider active security measures include private key safekeeping, prompt action after losing a private key and general system security.

Regarding private key safekeeping, as section 2.4 explains, all messages sent in the present system are digitally signed to make their authenticity verifiable. A user system creates a digital signature through a mathematical process requiring the user's private key, a large number used in the signature calculations. The resulting signature is associated with that private key in a practically unmistakable way. Since anyone with that private key can create the user's digital signature, it is very important to keep the private key secret and secure, much in the way that a check-writing machine or other signing device must be kept secure. Use of smart cards, passwords or personal identification numbers (PINs), and similar security procedures help keep private keys secure.

Regarding prompt action after losing the private key, if the security of a private key becomes uncertain or compromised, the remedy is to revoke its certificate immediately. A digital signature can be traced to that private key through verification, but it is the certificate that associates that private key with an identified user. By revoking the certificate, the user disassociates itself with the related private key, and consequently, digital signatures by that private key are not attributable to the user after revocation. (Digital signatures made before revocation is effected, even if performed by a usurper of the private key, are nevertheless absolutely attributable to the user. Accordingly, a user is well advised to take action to effect revocation at the earliest opportunity). A user can revoke a certificate in the manner provided by the user's public key certifier.

Regarding general system security, besides the safeguards for private keys, the overall security of the user's network, operating system, and user system are important. A user may be well advised to employ appropriate login practices, a properly configured Internet firewall, routine virus checking, access controls, and similar measures.

Although some important areas warranting a user's attention have been identified, what a user does to maintain security is for the user itself to decide. The user will be responsible for all actions taken in the present system regardless of whether the user's security was adequate; in other words, lack of security by a user is no excuse for an action using the present system that disadvantages another user (see Rulebook). Thus, the extent of a user's security precautions are matters for the user's judgment.

2. Message Handling Unit

Much of what a user does with the present system is accomplished through the message handling unit. To send a message to another user, enter an electronic bill of lading into the title registry, or to change rights in relation to an electronic bill of lading in the title registry, a user sends a message through the message handling unit. Section 2 explains the content of messages and their movement from one user to another.

2.1. Message Components

Figure 2:
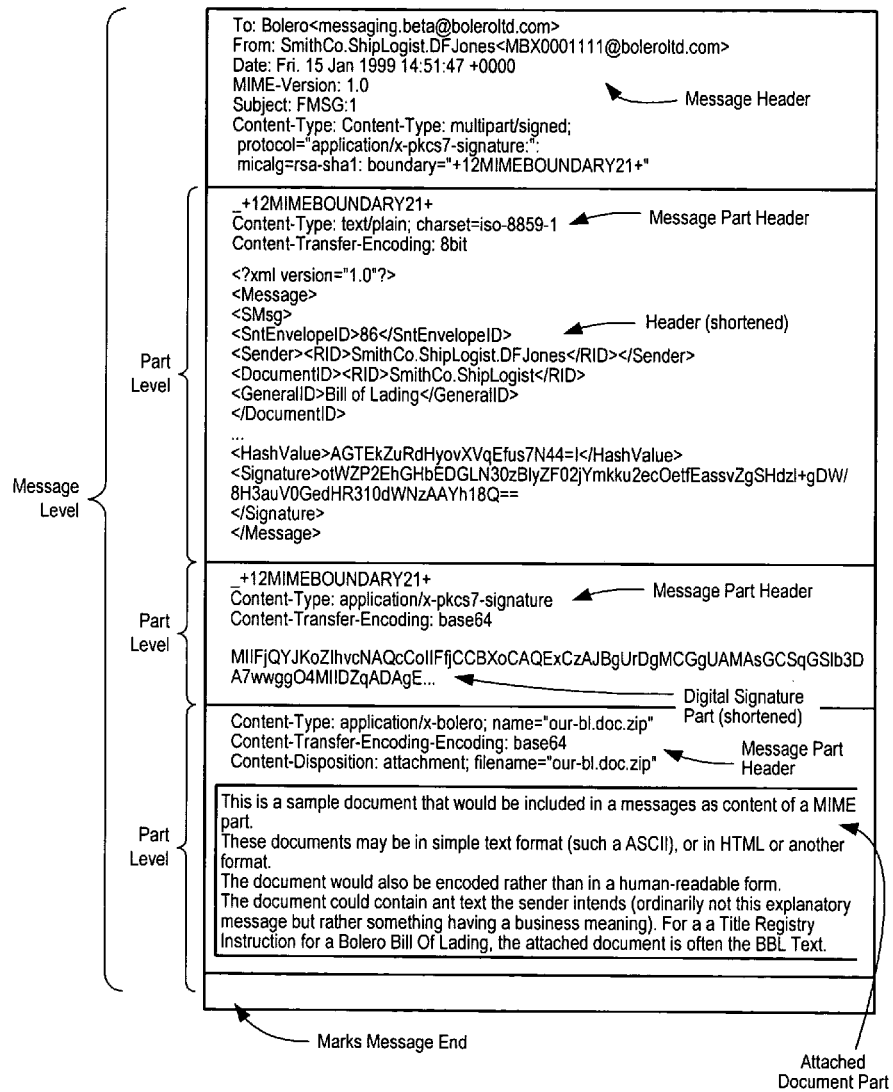
FIG. 2 shows structure of a message.

A message consists of a series of components, as illustrated in FIG. 2. Generally, a user system does not display messages in this way, but rather will divide out a message's content into more appealing screen layouts. However, to describe how to create what happens with messages, the plain, uninterpreted depiction of the message in the illustration shows its components.

As FIG. 2 illustrates, the principal components of a typical message are message headers, message part headers, type headers, document parts, and message end indicators.

Message headers are lines of text appearing at the beginning of a whole message to route it (such as "To" or "From"), indicate its "Subject", indicate to the software how to process it (such as by noting its "Content-Type"), and serve similar purposes at the level of the message as a whole. The message headers are prescribed by standards and are not specific to the present system. The principal standard prescribing message headers for Internet mail using the Simple Mail Transport Protocol is RFC 822 of the Internet Engineering Task Force.

Regarding message part headers, messages are divided into parts in accordance with the specifications for Multipurpose Internet Mail Extensions (MIME). MIME message format is standardized mainly in RFCs 1521 and 1522 of the Internet Engineering Task Force. Each part is delimited by a header noting its content type and the encoding used to pass it through e-mail channels. The message part headers are prescribed by the MIME standards and are not specific to the present system.

A type header is contained in each message. This is a part of the message which indicates its type and function within the present system and conveys data into the present system's logs, title registry, and other records. The type header is specific to the present system. It contains data tagged as elements in accordance with the Extended Markup Language and document type definitions prescribed by the service provider. XML is a method for labeling data. It is prescribed in a specification entitled "Extensible Markup Language (XML) 1.0: W3C Recommendation adopted by the WorldWide Web Consortium as of 10 Feb. 1998. It is available online at http://www.w3.org/TR/REC-xml.

One or more document parts may also be included in a message after the type header. A message may have one or more such additional parts, each consisting of a document introduced by a message part header. The document parts of a message are often termed "attachments", "attached documents" or the like. Document parts are optional, but are common in most messages sent in the present system. The form of document parts is not specific to the present system and is prescribed by the MIME standards.

A message end indicator is a line consisting of a single dot marks the end of the message as a whole. The message end indicator is the standard way of showing the end of a message according to Internet e-mail standards (mainly RFC 822 of the Internet Engineering Task Force).

Message headers, message part headers, and the type header are technical devices used mainly for moving and processing messages behind the scenes and serving as containers for their contents. The message headers are not signed or encrypted, although the matter within them (including the type header) is. The above is summarized by Operational Rule 1 relating to the form of a message in the system:

Operational Rule 1: Form of Message

A. A message shall be in the form required by IETF RFC 822, IETF RFCs 1521 and 1522 (MIME standards), and IETF RFCs 1847 and 1848. Further, it shall have technically proper content as according to the specifications described herein.

B. A user shall disregard a message which does not conform to the requirements of this Operational Rule, except to the extent that another rule requires an acknowledgment of the nonconforming message.

Composing a message into this technical form is a task for the user systems, rather then the message handling unit or any other components maintained by the system service provider. The message handling unit does however require that the message be in this required form. It further requires that accredited user systems demonstrate an ability to compose messages in that format. They may do so by providing on-screen forms to fill in, text editing and display capabilities, linkage with local databases and document systems, and other functionality to aid in creating a message.

A user system will only rarely display received messages in this raw form. A user system may not display all of the message headers, and except in troubleshooting, only the to, from, dates of sending and receipt, and subject headers hold interest. In contrast, the type header and documents within a message are used extensively in doing business via the present system, although usually in a more user-friendly on-screen display. Although the raw forms of the type headers are usually presented in more readable ways, the type header forms play an important and definitive role in the flow of messages through the message handling unit.

2.2. Type Header Forms and Flows

Three principal user activities involving the message handling unit are the sending of messages, the issuing of acknowledgments of receipt and handling of refusals to do business.

Regarding the sending of messages, sending a message from one user to another user or to a present system resource such as the title registry with instructions to perform a function there (such as create an electronic bill of lading). As noted, the message consists of a type header and possibly one or more included documents, along with the headers used in routing and processing the message.

Regarding acknowledging receipt of a message sent through the present system, when a user receives a message originating from a fellow user, Operation Rule 2 (Acknowledging FMsg Messages) requires the receiving user to send a return message to notify the present system that the incoming message was received. An acknowledgment is not an assent to any obligations proposed in the acknowledged message. It is simply and merely a notice that the message arrived in proper, authentic form, and nothing more. The recipient acknowledges receipt of the message even if the recipient declines to proceed with any business proposed in the message.

Regarding business refusals pursuant to a received and acknowledged message, the recipient of a message may notify its original sender that the recipient intends to take no action in response to the message that the recipient has received and acknowledged from the original sender.

To carry out these three basic functions, the type header of a message takes on different forms, each with different functional implications and content. These differing forms of type headers are noted below in explaining these basic message processes for creating, sending, and receiving messages.

2.2.1. Sending a Message

Sending a message from one user to another or to the title registry consists of a two-stage movement: First, the sender transmits the message to the message handling unit, which then relays it to its recipient. The message handling unit checks and tracks all message flows as an intermediary between all users, so all messages pass through the present system en route to their final destinations.

To send a message to another user or to the title registry, the user creates a message with a type header in the form of a sent message or SMsg. A SMsg is the form of type header for a message sent by a system user into the message handling unit, and to be sent on from there to its ultimate recipient.

When the message handling unit receives a SMsg, the message handling unit:

Checks the message to determine if it satisfies the message validity Requirements of an SMsg.

Logs the SMsg by recording its type header, a hash result of any documents included in it, the time of processing, and other information.

Stores the message in the message database component of the message handling unit for a period specified in the applicable records retention schedule. (A Records Retention Schedule forms part of each Operational Service Contract between the system service provider and a user. Either the Records Retention Schedule from the sender's contract or the ultimate recipient's could apply, or both, depending on how the schedules in their respective Operational Service Contracts are worded and the options chosen by each user in making its Contract).

Returns an acknowledgment of receipt by the message handling unit, if it received the message and found that it satisfied the message validity requirements. This return acknowledgment is a message having a type header in the form of a "System Acknowledgment", abbreviated BAck. A BAck does not indicate receipt by the ultimate recipient of the message; rather, it merely indicates that the message handling unit has received and processed the SMsg. If the message handling unit receives the message but encounters an error checking it, it returns a type header in the form of a Bolero Non-acknowledgment (BNak), where Bolero is the trading name of the service provider. If the message handling unit never receives the message, nothing is returned to the sender. Accredited user systems provide a function to link each SMsg with its BAck or BNak and alert the user after a BNak arrives or a message remains for a specified amount of time without either a BAck or a BNak.

Forwards the SMsg on to the recipient (or recipients) designated by its sender. Once forwarded, the SMsg takes the form of a Forwarded message, abbreviated FMsg. The recipient of the FMsg (the relayed SMsg) may be a user or the title registry. A FMsg ordinarily differs from its antecedent SMsg mainly in its type header, message identifiers, timing information, digital signature (which is the service provider's on an FMsg and the original sender's on a SMsg), and in its elements having to do with the title registry.

Awaits an acknowledgment from the recipient indicating that the forwarded message (FMsg) was received.

Figure 3:
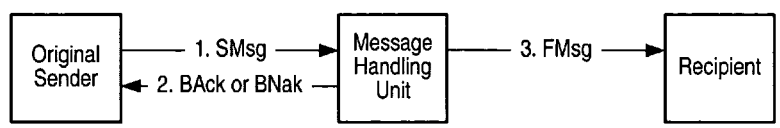
FIG. 3 illustrates sending a message from a sending user to a receiving user through the message handling unit of the central system.

FIG. 3 illustrates the flow of this process of sending a message via the message handling unit.

To sum up, the basic information flow in sending a message to another user or the title registry consists of (1) dispatching the message (a SMsg) to the service provider, (2) receiving an acknowledgment from the service provider (a BAck) indicating that the message was received and processed by the service provider or a BNAk indicating that it was received but not processed or forwarded, and (3) having the present system forward the message (now an FMsg) on to the intended recipient.

2.2.2. Recipient's Acknowledgment of Receipt

Acknowledgments by users proceeds according to Operational Rule 2.

Operational Rule 2: Acknowledging FMsg Messages

A. If a user receives a FMsg message which is technically improper, then the recipient shall, if possible, return for that message a UNAk message to the message handling unit at its earliest reasonable opportunity.

B. For every other FMsg message, the recipient of the message shall return a UAck message to the message handling unit at its earliest reasonable opportunity.

When the message arrives at the recipient's user system, Operational Rule 2 requires the recipient to acknowledge its receipt promptly. The recipient makes this acknowledgment by sending a message with a type header in the form of a user acknowledgment (UAck) to the message handling unit. On receipt of the UAck, the message handling unit then relays it on to the original sender as a type header in the form of a delivery notification (DNot), if the sender of the original SMsg requested notification of delivery.

Figure 4:
FIG. 4 illustrates the receiving user's acknowledgment of receipt of the forwarded message originating from the sending user.

FIG. 4 illustrates this process.

The UAck-DNot sequence indicates receipt of the message by its intended recipient (the recipient specified as the user who is to receive the message); in other words, it shows that the FMsg message arrived at its designated recipient's user system in accordance with the technical requirements prescribed by the system service provider. By returning a UAck, a recipient does not admit that the recipient has read the message, has the functionality necessary to read the message properly, has knowledge or notice of any of its contents, or agrees with or accepts any obligation in the message (see Rulebook). A UAck-DNot sequence indicates nothing more than the simple fact that the message arrived as a technically valid message, exactly as it was forwarded from the present system as a FMsg.

If the forwarded message does not arrive as a technically valid FMsg message but rather bears an unverifiable digital signature or is not in the form specified for an FMsg, the recipient returns a type header in the form of a user non-acknowledgment (UNAk) to the message handling unit. The message handling unit in turn relays to the original sender a message containing a type header in the form of a failure notification (FNot). The message handling unit will also return a FNot if no UAck is received for the message within a timeout period. The originator of the message may specify timeout period or the message handling unit will apply one by default. The original sender may then address the problem indicated in the FNot as the reason for failure, and then resend the message or take other action as needed.

Figure 5:
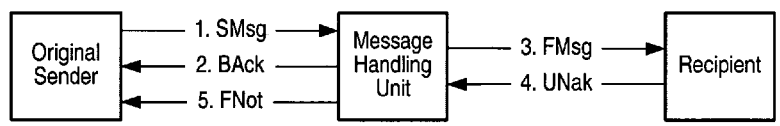
FIG. 5 illustrates the receiving user's non-acknowledgment of receipt of the forwarded message originating from the sending user.

FIG. 5 illustrates the non-acknowledgment process. Accredited user systems return UAck or UNAk messages automatically as each FMsg is received, without requiring the recipient to take any action.

As Operational Rule 2 requires, a recipient may only send a UNAk if the message as received appears to have a critical technical fault. A UNAk should not be used to indicate that the recipient wishes not to have received the message, refuses to read or be bound by the message, or intends to disregard the message. Simply put, a UNAk indicates a failure in message delivery for apparent technical causes, whereas a sender's business refusal (SBRf) indicates that no further response will be forthcoming due to human volition or inability to proceed, i.e., the recipient does not wish to progress or deal further with the content of the message.

2.2.3. Refusing to do Business Pursuant to a Message

A message may be received technically intact but make no sense to the receiving user, perhaps because the recipient cannot relate the message to a business context known to be significant. In other situations, the message may be unwelcome or otherwise worth ignoring in the recipient's judgment. In such circumstances, the recipient may notify the original sender of the message that the recipient intends to take no action based on the message and will ignore it.

To notify the original sender of those intentions, the recipient sends a type header in the form of a sent business refusal (SBRf) to the message handling unit, which in turn relays a user's business refusal (FBRf) to the original sender of the message.

Figure 6:
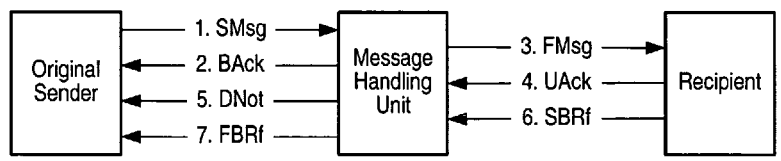
FIG. 6 illustrates a user's indication of its intent to ignore a message through a SBRf-FBRf sequence.

FIG. 6 illustrates this procedure.

The recipient of a message may send the SBRf (which triggers the FBRf to the original sender) within 24 hours after the message is received. Any other convenient time period could be selected. The SBRf will be confusing and contradictory if it is sent after the recipient has already taken some apparent action in response to the message. To illustrate, suppose that R, a recipient, receives and duly acknowledges a message from S, a sender. R then replies to S in a message reading: "I got your note and will look into it shortly." R later "looks into" the message from S and decides to ignore and discard it. A SBRf-FBRf sequence, after R's earlier message to S, could be confusing or ambiguous. R could avoid that confusion by including an explanation in the free text fields of the SBRf-FBRf sequence, or by foregoing the SBRf option entirely and simply sending an ordinary SMsg to the sender expressing R's intentions.

2.2.4. Summary of Message Flow and Type Headers

Messages in the message handling unit serve different functions necessary to provide a high-assurance messaging service. Those functions are indicated by the type headers in the messages. The varying forms of the type headers have varying significance for users, and they trigger varying operations, often another message with a responsive type header, within the message handling unit.

FIG. 7 summarizes the type header flow sequence, with one message triggering another.

FIG. 7A indicates as a table the type header forms illustrated in FIG. 7, where they come from and where they go, and what they mean. The numbers in FIG. 7A refer to the numbers used in FIG. 7.

All of these messages are digitally signed, and a BNak will result from a digital signature that fails verification. For more information about digital signatures and message authenticity, see Section 2.4.2.

In a practical sense, an original sent message (SMsg) causes to exist and sets in motion the other type headers in a series or chain reaction. Some of the type header types are alternatives to others, or are optional, depending on the circumstances. Accredited user systems can link together or associate all of the type headers from various messages that comprise a single series or chain, all related to the same original Sent message (SMsg). Some user systems refer to this process of linking related messages as "reconciling".

The different forms of type headers indicate the varying directions in which messages flow in the message handling unit. Besides indicating message flow, each type header form requires certain content, such as user identifiers and information about documents attached to the message. The type header is the principal means used by the server of the message handling unit of tracking the message and assuring that it satisfies requirements for documents, addressing and routing, and authenticity. To provide that tracking and assurance, the message handling unit checks the type header of each message, and will not proceed if required content is erroneous. The next sections examine some of these content requirements.

2.3. Included Documents

As explained in Section 2.1, a message consists of a type header and one or more optional documents, all encased in message headers used to route and process the message. The preceding section explained the various types of type headers recognized in the present system. This section explains what the present system, specifically the message handling unit and the title registry, does with documents included within a message.

Documents included in or "attached to" a message are incorporated into the message by a user system in the manner required by Internet MIME standards. The MIME methodology provides for transport of the document within the message through the digital communication channels used for e-mail. However, as is typical of general electronic mail technology, MIME does not provide for tracking of any documents traveling through the e-mail system, and it does not pass any information about the document other than the bare minimum necessary to move it through e-mail channels.

The system keeps track of documents, although it does not scan them or examine their content. The information that the system keeps about a document consists of information about the message (or messages) in which it was contained, its form, and information necessary to determine whether one document purporting to be the same as another is indeed identical. That information is stored under a unique identifier for the document.

To determine whether one document is identical to another, system components such as the message handling unit compare the "hash results" of the two documents.

A hash result is also known as a mathematical "message digest", "cryptographic checksum", or "seal" (in technical documents, without relation to the legal effect of a seal). A hash result is the product of a hash function, which is an algorithm converting one set of digital bits to another, smaller set, which is termed in this document the "hash result". The hash function produces the same hash result each time it is executed with the same input. Further, for a hash function to be sound, it must be computationally infeasible (1) to reverse the hashing process and derive the input back from the hash result, and (2) to have two messages produce the same hash result using the same hash algorithm.

2.3.1. Document IDs and References

The system tracks documents by a document identifier (also termed a "document ID"), which uniquely identifies its document from among all other documents logged in the system. Accordingly, the corresponding operation rule stipulates as follows:

Operational Rule 3: Document ID Required

For each document that a user sends into the system, that user shall specify a document ID in the prescribed form.

A document ID is made up of a user identifier, a general identifier and a version indicator.

The user identifier is the system user identifier of the user who first sent the document into the system. (User identifiers are explained in section 2.4.1). Both the base user identifier and any user division identifiers are included in the document ID, but not the extension of the user identifier (if an extension is used).

The general identifier is a series of alphanumeric characters which uniquely identifies the document from among all documents sent into the present system by the user indicated in the user identifier forming part of the document ID.

The version indicator is a portion of alphanumeric text indicating the version of the document.

The above three sub-identifiers together comprise the document ID. Together, they form a unique identifier for the document, although either by itself may not necessarily be unique. For example, two distinct instances of the same document may share the same document ID, but must be identical.

Besides those basic components of a document ID, the sender creating the document ID can choose to include with it an on-or-off indicator to show that the sender regards the identified document as preliminary and nonbinding, a draft rather than a final, effective text.

Once the document is successfully recorded in the system, a sender or receiver of the document can review its movements through the present system by looking it up in the user support resources. For a user representative to be able to review a document in the present system, the representative must (1) have a user identifier indicating that she is part of the user's organization and (2) be equal or senior to the sender or recipient of the document to be viewed within the division identifiers included in the relevant user identifiers, and (3) be listed in the user database as having a monitoring privilege.

Once a document is filed under a document ID, subsequent messages or documents may refer to the document by its document ID. If the draft indicator is on, a subsequent message may also replace the previously filed document with a new one bearing the same document identifier. However, if the draft indicator is off (indicating that the document is final), a new message never overwrites an older one. A new message may refer to a previously filed document by its document ID, and may send along a copy of the document. In such a case, when the message handling unit processes the new message, it will check the document copy and document ID to determine whether they are identical to the previously filed document and document ID. If they are not identical, the message handling unit returns a BNAk; for the SMsg sending in the nonconforming document. Otherwise, it returns a BAck if the message is valid in all other respects.

2.3.2. Description of Document Type

The system records not only a document's unique identifier but also information about its form. Currently, only the document Type is supported as an indicator of form.

Document type indicates the business role of the document as defined in the present system. As of this writing, the document type may be any of the document or message types defined for EDIFACT.

2.4. Identification of Users and Authentication of Messages

The preceding section explained messages, particularly the type header and included-document components of a message. Once these components are assembled into a message, the message is ready to be sent to another system user or resource such as the title registry.

Sending a message or performing any other significant action via the present system requires the sender to declare its user identifier. On receipt of each message, the present system checks for the user identifier and verifies the digital signature on the message according to that user identifier and the related public-key certificate. This verification process is to prevent one user from impersonating another without detection. It also ensures all users of the present system that only Enrolled persons governed by the Rulebook can send and receive Messages through the message handling unit. Thus, a user must supply a valid user identifier and digitally sign each message or information stream. This section explains user identifiers and how users digitally sign their messages.

An information stream is the channel linking two digital information resources such as a Web browser and server.

Signing an information stream consists of signing the packets (small, digital blocks of data) or groups of packets that comprise the stream. To use the user support resources via a WorldWide Web browser, the browser and server will establish a channel between them that will be digitally signed in order to limit use of the user support resources to enrolled system users in good standing.

2.4.1. User Identifiers

As the term suggests, a user identifier is the name by which a system user is known within the present system. Because it is a name, the user identifier is different from an address, including an e-mail address, and other attributes of the user that may be recorded in the present system. In particular, an e-mail address, does not, strictly speaking, identify a user; rather it identifies a location in a machine where e-mail can be received. An e-mail address, like a street address, a telephone number, and other location codes, may be a helpful attribute in identifying a company, but it is not the company itself. Any of those attributes may change without really affecting the identity of the company. That identity, as distinct from all other users and indeed, from all other companies, is what the user identifier signifies.

All system users are companies, rather than the individual employees or other persons representing a company. Therefore, each user identifier refers to a company, although often abbreviated. To interpret a user identifier or find out more information about a user, look up the user identifier in the user support resources.

A user may add onto its user identifier a reference to a company division or department, and an "extension" noting whatever the user wishes FIG. 8 illustrates optional additions to the base user identifier.

The division identifiers and extension (the italicized text in the figure) are each optional and determined by the user. They are entirely for the user's convenience and have no legal significance (see Rulebook). As Section 2.4.3 explains, other users may consider the identified user responsible for the message, regardless of what divisions or extensions are tacked onto the user identifier.

The system service provider assigns each user a user identifier when the user is enrolled. Subsequent changes in the user identifier are rare, unless the user undergoes a fundamental organizational change such as a merger. The system service provider deactivates and will not recognize a user identifier after the user withdraws or is expelled, or while the user is suspended.

Operational Rule 4: Supplying User Identifier when Required
In every message sent into the message handling unit, a user shall include its user identifier within the elements specified for it by the system.

Operational Rule 5: Misuse of a User Identifier
A user shall not attempt to include a user identifier in a message sent into the message handling unit when either:
(a) the user is not enrolled in good standing, or
(b) the system service provider has not assigned that user identifier to the user. In the event of apparent misuse of user identifier contrary to this Operational Rule, the system service provider has the right to return a BNAk message to the sender and refrain from processing the message further.

2.4.2. Certificates and Digital Signatures

User identifiers are public to the user group. Any active user can look up any other user's identifier in the user support resources, and a user often keeps lists of common user identifiers as a ready address book for sending messages. Because users all have each other's user identifiers, the user identifiers are not a secure means of authenticating documents. Therefore, a user generally cannot reliably infer from the user identifier that a message or document is genuinely signed by or associated with the identified user. Rather, that inference should be drawn from the user's digital signature, if the digital signature can be properly verified by reference to a valid certificate. This section is a basic introduction to digital signatures and the principal rules governing their use in the present system.

2.4.2.1. Creating and Verifying Digital Signatures

A digital signature results from a complex mathematical calculation, which produces a large number unique to both a given unit of data and a given private key. That large number unique to both the signed data and the signing private key, is the digital signature. Accredited user systems include functionality for creating digital signatures on messages.

Statements in this section that a number is unique to something else (generally another number, and data to be signed is reduced to a number for digital signature purposes), mean that there is a one-to-one correspondence between the two numbers. Conceivably, another number could exist with the same correspondence, but the numbers used in digital signing are so enormous that it is highly unlikely that another number exists and is feasibly discoverable with the same correspondence. What is feasible is, of course, subject to change, and continuing computational progress necessitates ever larger numbers as time goes on in order to maintain good digital signature security.

A private key is another large number that only the digital signer should possess. private keys are such large numbers that remembering them is practically impossible; instead, they are stored on smart cards, in computer files, or other storage media. For the present system, the Rulebook requires that they be stored in smart cards. A smart card or other storage medium housing a private key must in turn be kept exclusively in the possession of the person authorized by the user to use the private key for signing. If an unauthorized person obtains another person's private key, the unauthorized person will be able to impersonate that other person in the present system. Therefore, a user is well advised to keep the private key safe, and have security policies designed to maintain private-key security.

After a digital signature is created, it can be verified as its signer's signature of the signed data by means of another mathematical process termed "verification". To verify a digital signature, a computer runs a function and provides both the data that purports to have been signed and a certificate. The message handling unit verifies the digital signature on every message that it receives and forwards, and every user must verify the service provider's digital signature on every message that it receives purportedly from the message handling unit, or other system components under control of the service provider, if the user is to be certain that the message comes from the service provider. An accredited user system has a demonstrated ability to verify digital signatures, and often does so automatically as messages are received.

Besides verifying digital signatures on messages, a user may also digitally sign or encrypt a document sent within the message and forwarded on by the message handling unit. The present system does not verify any digital signature on such a document or decrypt it. That verification or decryption is left to the recipient of the document. Users who digitally sign or encrypt documents should take note of the document checking performed by the message handling unit, as described in section 2.3.

A certificate, in this specialized, digital-signature sense, means a digital record identifying the Holder of a private key, which is indicated, not by listing the private key (because the private key is a secret), but rather by listing its public key. A public key is a large number unique to its private key, and therefore, the public key can be used to indicate or identify its private key. The public and private keys of such a pair are mathematically related, but discovering the private key by knowing the public key is computationally infeasible.

If the digital signature verification yields a positive result, it demonstrates (1) that the digitally signed unit of data was not altered since it was digitally signed, and (2) that the digital signature was created with the private key corresponding to the public key listed in the certificate used for the verification. That certificate, in turn, identifies the Holder of that private key (the digital signer) as a particular user, and so the verifier can infer, based on the certificate, that the digital signature was created by that particular user.

Pursuant to the Rulebook, a digital signature is absolutely attributable to that user, if that digital signature can be verified using the public key listed in a certificate issued by an the system service provider and valid when the digital signature was created. Thus, a digital signature is deemed to be a particular user's if:

(a) It is verified: The user relying on a digital signature relies at its own risk if the digital signature is not verifiable;

(b) The certificate was issued by an accredited certifier: A certificate which identifies a non-existent user or a user which does not have the private key indicated by the certificate will lead to inferences that are erroneous and potentially dangerous.

The system service provider may be the only certifier, but accreditation of third party certifiers is also possible. Certifier accreditation is a special kind of enrollment for enrolling certifiers in the system. It helps assure that certificates will be reasonably reliable. However, the user relying on such a certificate in verifying a digital signature retains discretion to seek greater quality or further assurance, regardless of whether the verifier or certificate meets the specifications of the system; and (c) It is valid when the digital signature was created: A certificate has an expiry date and may be revoked by the certifier that issued it. After its expiry or revocation, a certificate is no longer valid and should not be used for verifying a digital signature. A digital signature created after a certificate has expired or been revoked should not be considered the digital signature of the subscriber listed in that certificate.

These requirements are reflected in the defined term "signed". A message or document is "signed" when it bears a digital signature that can be verified as provided in the foregoing list. Further, if a message or document is signed, it satisfies any applicable legal requirements regarding its form (see Rulebook at 2.2.2).

For a message to be verifiable in this way, the Sender must digitally sign it as required in Operational Rule 7 (Requirements for digital signatures).

To sum up, a digital signature associates a message with a particular private key. verification of that digital signature indicates which private key was used to create it, and a certificate indicate which user holds that private key. In light of proper verification, the message can be attributed to its signer.
Operational Rule 6: Digitally Signing Messages Sent
A user shall digitally sign each message sent via the message handling unit.
Operational Rule 7: Requirements for Digital Signatures
(a) A user shall create its digital signature using a private key which corresponds to the public key listed in a certificate issued to the user by an accredited certifier.

(b) the system service provider has the right to return a BNAk message to the sender and refrain from processing further a message which fails to satisfy the requirements of this Operational Rule.
Operational Rule 8: Verifying Messages Received
A user shall treat a message as of questionable authenticity if it is not signed. A user may disregard a message which is not signed.
Operational Rule 9: Authenticity of Documents
A document sent in a signed message is deemed signed as received in that message, regardless of whether it is signed as a separate unit.
2.4.2.2. Implementation of Digital Signatures in Message Handling Unit As mentioned, one of the principal benefits of the present system is that its message handling unit tracks messages and provides for assurance of delivery through message acknowledgments. To provide message tracking and trustworthy delivery, the present system acts as a disinterested operational intermediary between users. The process of sending a message from one user to another is a multi-step sequence as described in Section 2.2 above. The present section explains how digital signatures fit in that sequence.

In each step along that sequence, the sender digitally signs the message. When the present system sends relays a message (including an acknowledgment) from one user to another, it digitally signs the message relayed from the original sender. Its digital signature on that forwarded message attests to the verifiability of the original sender's signature on the original message. This figure illustrates this sequential signing and messaging process.

As FIG. 9 shows, the message flow, digital signing, and verification in the message handling unit proceeds by a sequence of steps as follows.

(1) A message is sent in the form SMsg. The originating user digitally signs and sends a message to the message handling unit for forwarding to the recipient.

(2) The message handling unit issues an acknowledgment in the form of a positive acknowledgment, referred to as a BAck or a negative acknowledgment referred to as a non-acknowledgment or BNak. The message handling unit verifies the sender's digital signature on the SMsg, checks its authenticity and form, and returns a BAck to the original sender if the message handling unit properly verifies the original sender's digital signature and finds the content in correct form. If the message handling unit fails to verify the digital signature properly or finds errors in form, it returns a BNack. The BAck or BNak message is signed by the system service provider.

(3) The message is forwarded with a forward message or FMsg. If the SMsg from the original sender bears a verified digital signature and is in technically proper form, the message handling unit returns a BAck to the original sender and sends the SMsg message on to its ultimate recipient as a FMsg. The FMsg is digitally signed by the system service provider. That digital signature indicates that the FMsg is from the service provider, and it further attests that the message handling unit has properly verified the sender's digital signature on the original SMsg, as the Operational Service Contract provides. On request, the system service provider will provide proof of that verification in accordance with the Operational Service Contract. The original user's signature and the original SMsg is available on request, from logs and records maintained by the service provider. A FMsg has a type header form differing from the SMsg that caused that FMsg to exist. Although the substantive content of the FMsg and its SMsg remains the same, the FMsg reflects its logging and tracking by the service provider run parts of the system. Consequently, it is not precisely identical in form to the SMsg, so the digital signature on the original SMsg cannot be verified against the resulting FMsg.

(4) A user acknowledgment (UAck) or user non-acknowledgment (UNAk) is issued. On receipt of the FMsg, the recipient verifies the service provider's digital signature on the FMsg. If the message is properly received and verified, the recipient's user system responds by sending a UAck to the message handling unit. If the verification fails or a technical fault is apparent, the recipient's user system returns a UNAk. The UAck or UNAk is digitally signed by the recipient of the FMsg before it is sent into the message handling unit.

(5) A delivery notification (DNot) or failure notification (FNot) is issued. When the message handling unit receives a UAck, it relays a DNot to the sender of the original SMsg. If the message handling unit receives a UNAk, it relays a FNot to the original sender. The DNot or FNot, as the case may be, bears the digital signature of the system service provider, and that digital signature attests to proper verifiability of the recipient's digital signature on the UAck or UNAk.

The message handling unit handles a sent business refusal (SBRf) from the ultimate recipient in a way similar to a UNAk.

Figure 10:
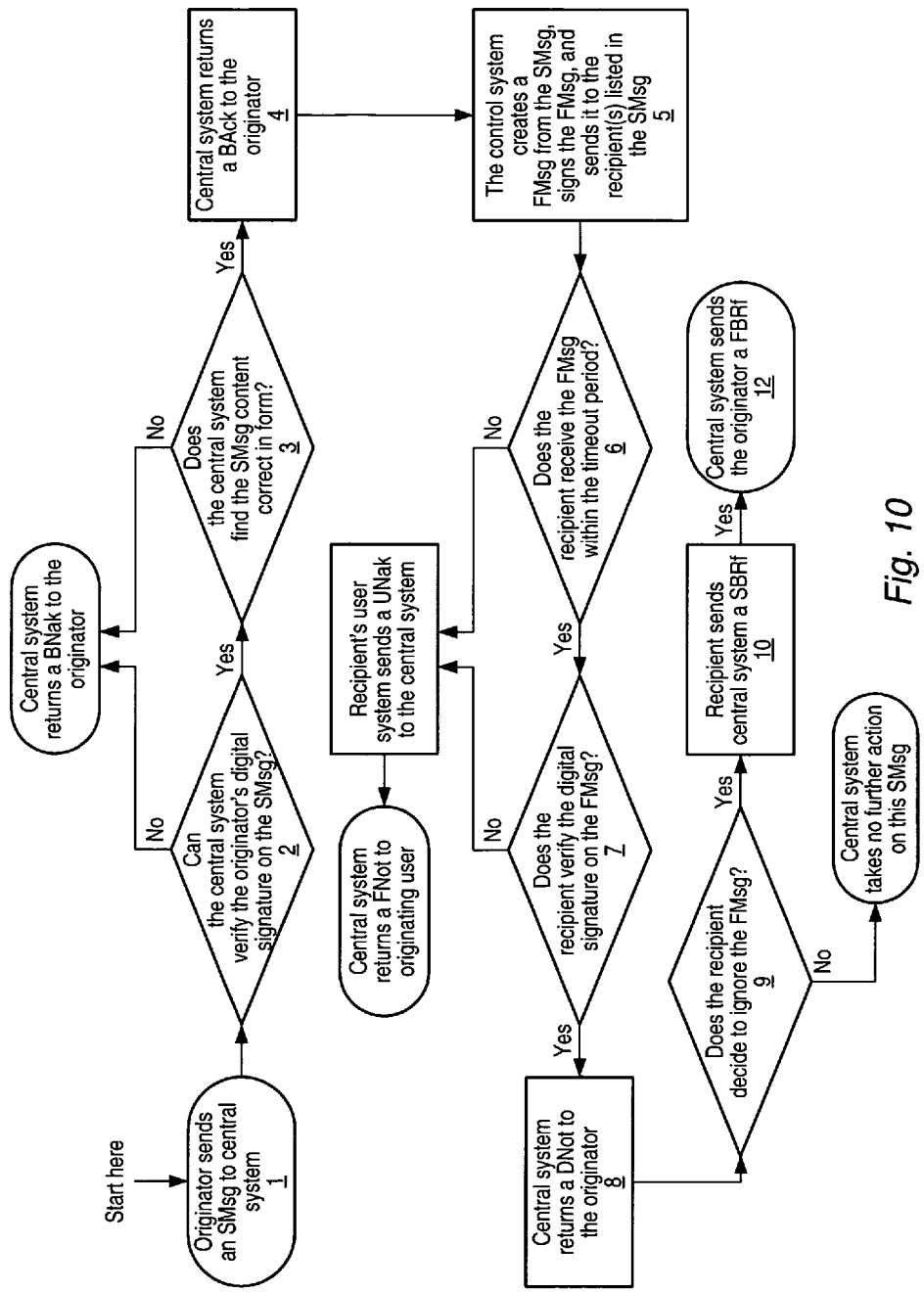
FIG. 10 is a flow diagram showing sending a message from user to user with signature verification and acknowledgments.

FIG. 10 is a flow chart illustrating the message handling unit flows with the digital signature steps shown.

2.4.3. Agency and User Responsibility

In the present system, a digitally signed message and the documents within it are legally deemed to have been signed by the user listed in the certificate used to verify the digital signature (See Rulebook 2.2.1(1); Operational Rule 6). As section 2.4.1 notes, a system user is a company, regardless of whether the user identifier or a relevant certificate has an appended reference to a particular division, employee, or representative of the user company.

The user company is responsible for all messages sent to the message handling unit. Of course, all messages sent by a user are actually sent by the human hands of the user's representatives (including employees, independent contractors, and others acting for the user), or by programs or automated routines that the user has set up to act for it. Lack of proper authorization for those representatives or improper design or set-up of those programs or routines does not excuse the user company from responsibility for its signed messages. All persons using the user's user identifier and a private key certified to that user are irrefutably deemed to have the authority necessary for their acts to be binding on the user (see Rulebook).

A private key is deemed to be certified to the user if the user's user identifier appears in a subfield of the subject field in a certificate. Other fields may also be appear within the subject field, at the user's option in cooperation with the issuer of the certificate. Those other fields can be used to manage individual representatives of the user and their keys and to trace and audit individuals' activities within the user's organization.

2.5. Encryption of Messages and Documents

Users sending messages via the message handling unit may encrypt them, if they wish. Encryption is not required by the Rulebook, but users may choose to encrypt messages.

Encryption is the most secure means of assuring the confidentiality of a message sent through the message handling unit. The electronic communication channels used to send messages are often not secure on their lowest technical levels. Eavesdropping on the communication channels used by the message handling unit is not easy and seems unlikely, but encryption is optional for users who require high assurance of confidentiality, depending on the user's right to use it under applicable law.

The effectiveness of encryption in making digital communications secret raises national security and law enforcement concerns in some countries. Consequently, the sender's or receiver's legal system may regulate the use of encryption technology. In implementing a local user system, a user is well advised to inform itself of any applicable restrictions on the use of encryption technology. In most cases, these restrictions do not apply to digital signatures, but they may restrict the use of encryption technology used for confidentiality. The Rulebook requires all users to comply with applicable law; consequently, users will need to check on any local encryption regulations and comply with them. Further, the service provider's certificate profile requires assurance by the subscriber of a certificate that the public key listed in it is suitable for encryption, if its "keyUsage" field is set appropriately.

Use of encryption for confidentiality involves public and private keys and certificates, but in a different way from the way in which they are used for digital signatures. The basic properties of this encryption technology is that the public key decrypts what the private key encrypts, and the private key should be available only to its certified holder, whereas the public key may be known by anyone. To encrypt a message intended for the receiver's eyes only, the sender uses the receiver's public key to encrypt the message. The recipient then uses its private key to decrypt the message.

The encryption process is actually slightly more complicated in most applications. Public and private key encryption and decryption algorithms are very slow to run on ordinary computers, so using them to encrypt large quantities of information would be require uncomfortable waiting periods. To solve this problem, encryption programs usually use a simpler algorithm requiring only one key to encrypt the message, and then they encrypt that key using the recipient's private key. The recipient decrypts the message by using its Public Key to decrypt the key previously encrypted by the recipient's private key, and then using that decrypted key to decrypt the message. The encryption of the message is thus actually performed using a single-key algorithm for reasons of speed, and using a public-private key algorithm only to encrypt that single key.

Using the wrong public key to encrypt the message will leave the recipient unable to decrypt and read the message, because the recipient's private key decrypts only with its corresponding public key encrypts. To make sure that the encrypting sender uses the correct public key, the sender needs a certificate, which assures that that public key truly corresponds to a private key held by the recipient. The certificate can be the same one used for verifying digital signatures or a different one, depending on how the recipient and its user system manage its private keys and implement the encryption technology. The optional "keyUsage" field in the certificate can also be used to determine whether a certificate is intended to be used for digital signatures only, encryption only, or both.

As implemented in the present system, the user database records whether a user or a user representative is authorized to encrypt messages. If so, the user or user representative may encrypt message using a public key in a certificate listing the system service provider as subscriber. On receipt of that message, the message handling unit decrypts it using its private key. If the message handling unit sends on a message (such as an FMsg) based on the incoming message, the message handling unit encrypts it using the recipient's public key. The recipient can then decrypt it using its private key.

Operational Rule 10: Encrypting Messages

To the extent permitted by law, if a user encrypts a message, the user shall do so using the public key listed in a certificate which:

(a) is issued by an accredited certifier;
(b) contains a key Usage field which indicates that its public key may be used for encryption; and
(c) is published in a recognized repository.

3. Public Key Certification

As described in section 2.4.2 and section 2.5, public-key certificates are used in the message handling unit to establish the authenticity of messages and optionally providing for their confidentiality in transit. The authenticity service is provided by means of digital signatures, which depend on certificates to associate the digitally signed data with its signer. In providing confidentiality service, the certificate is used to assure that the person establishing the confidentiality encrypts the confidential data by the public key of the person who is to break that confidentiality using his or her private key.

Certificates therefore figure prominently in the message handling unit. This chapter describes how they come about, are used and distributed, and how they end.

3.1. Basic Roles and Structure

Figure 11:
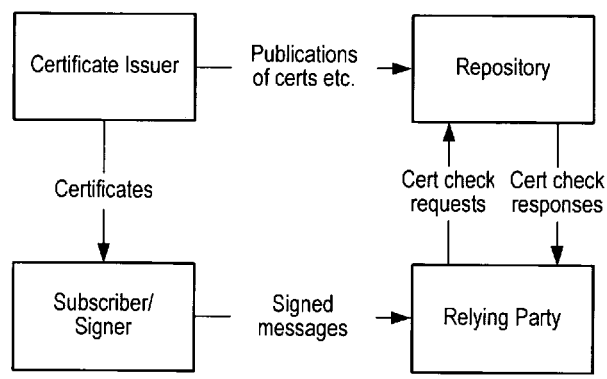
FIG. 11 shows basic organizational structure for certificate services.

As FIG. 11 illustrates, the following roles exist regarding certificates, independent of other roles that a person may have in the title registry, for example:

The Issuer is the company that Issues certificates, in other words, who creates and digitally signs certificates, and then sends them to the subscribers listed in them.

The Subscriber (or Signer) is the person listed in a certificate as the Holder of the private key corresponding to the public key listed in the certificate. The Subscriber is also the person who creates digital signatures verifiable by that certificate. The person is termed the "Subscriber" when referred to as the person listed in the certificate, and the "signer" when referred to as creating digital signatures.

The Relying Party is the person to whom the signer of a digital signature, after creation of the digital signature, sends that digital signature with a message to the relying party, who verifies the digital signature. The Relying Party then ordinarily relies on the digital signature and the certificate to establish the authenticity of the digitally signed message.

The Repository is a directory or database. In verifying the certificate, the Relying Party should obtain up-to-date information about its current validity. That information is ordinarily obtained from an online directory or database of certificates and information about them. That directory or database is termed a Repository. It provides support for the process of relying on certificates using information obtained from one or more Issuers and other sources.

These certificate-related roles map onto the roles in the message handling unit as follows:

The only Accredited Issuer of certificates in the present system is the system service provider, i.e. the operator of the present system. Other Issuers could also be accredited in due course. The system service provider performs the issuer role pursuant to a contract with each user, and that contract provides the details of this relationship.

The Service Provider and all Users are Subscriber/signers. Everyone who digitally signs messages sent via the message handling unit is the subscriber of a certificate by which that certificate can be verified.

The Service Provider and all Users are Relying Parties. The message handling unit and users verify digital signatures and rely on them. The design of the message handling unit places its operator, the system service provider, in the role of relying directly on a user's digital signature, and then forwarding a message bearing its digital signature to another user, who in turn rely on that digital signature of the service provider. If the message handling unit cannot verify the digital signature on a message by reference to a certificate on file, the message handling unit returns a BNak to the sender and does not process the message further. The message handling unit also digitally signs all messages that it sends. It digital signature is verifiable by a certificate distributed to all users. This two-stage process is described in greater detail in section 2.4.2.2.

The service provider is the Repository. The service provider keeps all user certificates in its user database. When the message handling unit verifies a digital signature, it obtains the needed certificate from the user database. When a user verifies the service provider's digital signature on a message, it obtains up-to-date information about the relevant certificate by checking a repository.

This basic structure oversimplifies what happens in the upper part of the diagram, however. In issuing certificates, the Issuer relies on information obtained from others and on the enrollment process in which users enter into contracts for use of the present system and membership in the user group.

3.2. Certificate Authenticity

As explained in section 2.4.2.1, a certificate is a digital record which identifies a named person with a public key, and contains other information needed to manage and limit its use. As the preceding section noted, the person who assembles this information into a certificate is its Issuer. An Issuer undertakes significant responsibility for the information in a certificate, because Relying Parties rely on them to establish the authenticity of messages. In view of the critical role that certificates play in message security, the question arises how to know whether a certificate is authentic.

The authenticity of a certificate is established by verification of a digital signature on the certificate. In Issuing a certificate, a certifier digitally signs it. When using the certificate to verify a digital signature, the verifier must verify the digital signature on that certificate to determine whether the certificate is authentic. To verify the digital signature on that certificate, the verifier must refer to another certificate to obtain the necessary public key and subscriber identification. The digital signature on that other certificate must likewise be verified to establish its authenticity. Verification thus includes a chain reaction of verifications of the digital signatures on certificates along a generation line ending with a public key that is reliable without being certified.

The reliability of this end-of-the-line Public Key can be achieved in various ways, some more reliable than others. The present system achieves a reasonable degree of reliability by embedding this Public Key in accredited user systems, as described later in this section.

Figure 12:
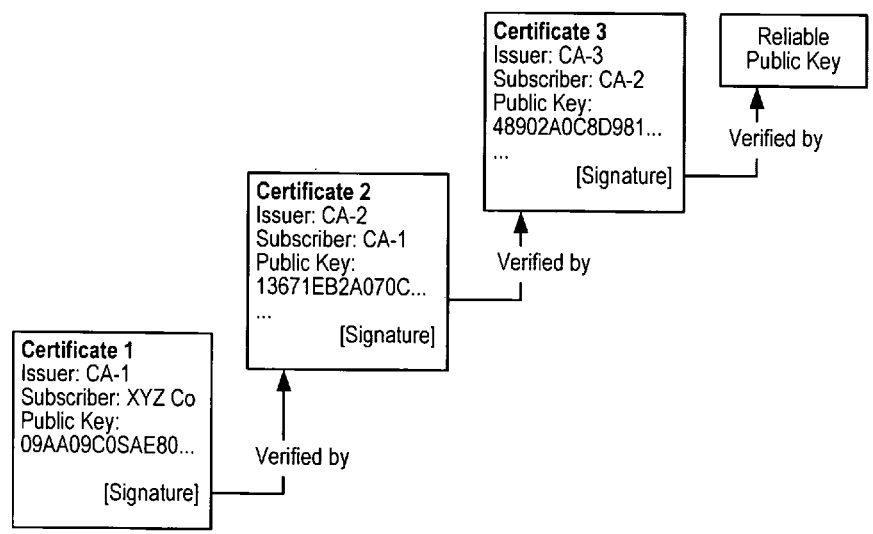
FIG. 12 shows a sample certificate chain.

FIG. 12 illustrates this chain reaction, which is sometimes termed "certificate chaining". The number of "links" in a certificate chain, in other words, the number of certificates to which a verifier must refer in order to verify a digital signature, is determined by the Issuer of the certificate and its antecedents in the chain. The number may vary from the three certificates shown in the illustration.

If the system service provider Issues a certificate to a user, the authenticity of that certificate can be verified by a multi-link certificate chain. At the user level, the system service provider Issues certificates to users from its certification system. Those certificates can be verified by reference to a certificate issued by another certifier.

3.3. Certificate Content and Meaning (Certificate Profile)

Turning to a closer look at certificates, this section examines what they contain and what the items of their content signify. The content and meaning of certificates is standardized mainly by ITU X.509, and certificates in the present system conform to those standards.

The principal standards for Public-Key certificates are Recommendation X.509 of the International Telecommunications Union (ITU, formerly CCITT) and the first of the series of draft standards of the PKIX Working Group of the Internet Engineering Task Force, entitled "X.509 certificate and CRL Profile". This draft, termed "PKIX-1" in this document and elsewhere, has been highly influential although it is not yet finally adopted.

The certificate standards, however, are quite open-ended, and leave many details to be defined in specific implementations. This section describes how the present system implements those details of form and meaning.

3.3.1. Documentary and Concise Forms of Certificates

The standardized form of a certificate is an encoded group of nested fields. The encoding makes possible its transmission via digital communications and enables it to carry different forms of digital data; however, the encoding also makes it impossible for human eyes to read, even if displayed on a screen or printed in its native form. Once decoded, what emerges consists of fields, and fields within fields and within still more fields. The nesting of fields within fields groups related fields together.

All fields in a certificate are labeled by means of "Object identifiers", unique numbers registered with an international standards institution. The certificate standards map a name and a general meaning onto these labels; however, the meanings given the fields in the standards are very general, since they must fit all conceivable applications of certificates. Further, the meanings tend to be defined in terms of functionality, since a standard's objective is, after all, to make a technological system work. For business purposes, the standard meanings are the starting point, and the present system adds greater precision to the standard definitions by means of a documentary interpretation of the certificate.

To make that documentary interpretation, the present system places the fields of a standard certificate into a documentary context prescribed by the Issuer of the certificate. That documentary context enables the Issuer to give as precise a meaning to the certificate as the Issuer wishes. The certificate in its documentary context is termed the documentary Form of the certificate. Certificates in documentary form are readable by a WorldWide Web browser or user systems incorporating browser-like display functionality.

To save time and effort, the documentary forms of the user certificates are all standard forms, so to a great extent reading one certificate in the form is like reading every other having similar data. Users can therefore use their discretion in deciding how many instances of the same form to consider. Once the standard documentary form has been considered, a user may be able to make do with viewing only the variable data, which is listed in the concise form and described in the next section.

3.4. User Certifier Practices

In acting as a certifier, the system service provider employs the following practices, among others. This section overviews the practices relevant to subscribers and relying parties. Other practices relevant to internal operations are documented in internal rules, which, for security reasons, are disclosed only to operational staff and auditors.

Full disclosure of all operations and practices is necessary only if the certifier's engagement to relying parties and others is to do precisely what is disclosed, regardless of whether the content of the certificate is accurate. That sort of engagement leaves the relying party to pore over a vast amount of technical minutia and then judge whether all that adds up to a sufficient degree of assurance. In contrast, the approach of the system service provider in its contract is to assure that the certificate is accurate, regardless of what was done to make it so, and to pay up to specified liability limits for inaccurate factual statements in the certificate. Thus, by assuring that the result of all the minute practices is commercially acceptable, the service provider alleviates the need to immerse users in the details of identification and security operations.

The service provider's internal certification rules cover most of the topics listed in "Certificate Policy and Certification Practice Statement Framework", a draft of the PKIX Working Group of the Internet Engineering Task Force. This draft, often termed "PKIX-4", is under revision at the present time. The draft makes assumptions about the need to disclose internal operations that are inconsistent with the level of assurance provided by user certificates in the present system, and is therefore not entirely applicable. Because much of its content handled internally and based on alternative assumptions, this chapter does not follow the format specified in PKIX-4.

3.4.1. Certification Account Life Cycle

The customer-provider relationship between a subscriber and a certifier is termed a "certification account" in the present system. For each certification account, the certifier (a) enters into a contract with the subscriber, (b) confirms the accuracy of facts to be used in certificates, and (c) keeps a certificate account history.

Regarding (a), the subscriber and certifier enter into a contract. The subscriber and certifier agree on rights and obligations of their customer relationship in a contract. Sometimes this contract is made on behalf of the certifier by an agent often termed a "Registrar". This contract should be concluded only when or after the contract enrolling the user into the present system is made. When the system service provider acts as certifier, this contract is part of the Service Contract between the system service provider and a user.

Regarding (b), the certifier confirms the accuracy of the facts to be represented in certificates issued for the certification account. In confirming that information, the certifier may use information and evidence obtained from agents (including Registrars), the subscriber itself, or any source of information that the certifier considers reliable. How much evidence is sufficient to confirm the certificate content is a matter for the certifier's discretion, and in making that determination, the certifier generally considers the level of assurance to be provided in the certificates issued for the account.

Regarding (c), for each certification account, the certifier keeps an account history tracking all certificates issued for the account, their revocation (if any) and other extraordinary incidents, claims made on the account, and the scope of the certifier's risk exposure in view of all certificates valid at any one time in the account. Tracking an account history enhances a certifier's ability to confirm the accuracy of information in certificates over time and remedy problems that cause undue risk to the certifier, the present system, and its users.

The certifier manages its risk by considering the total exposure based on all certificates issued for an entire account. Thus, for example, a suspected fraud or mistake involving one certificate may well affect all others in the account, as for example when a certificate is issued to an impostor. All certificates issued in that impostor's account would then be suspect.

A certifier can best and most efficiently perform these activities on a per-account rather than a per-certificate basis. These activities also tend to be the most expensive to perform, whereas the issuance of certificates, once information to confirm their content has been gathered in the account, becomes simple, inexpensive, and easily automated. Because the cost of Issuing certificates is low (once confirmation has been performed), a subscriber can easily have multiple certificates valid at the same time.

With multiple certificates in effect, a subscriber has backup mean available for digitally signing messages for the message handling unit. A Subscriber is advised to avoid having only one valid certificate for verification of its digital signatures at any time, because revocation of that certificate would entirely disable the subscriber from using the message handling unit.

In order to facilitate the services listed in this section, a certifier issues User certificates only to subscribers who hold certification accounts in good standing, except on a test, trial, or pilot basis in which the certificates have no substantial reliability.

3.4.1.1. Opening Certification Accounts

The certifier opens a certification account after a user is enrolled in the present system pursuant to a service contract with the system service provider. Precisely what is required to open that account depends on that contract. In general, the contract provides for the following steps, not necessarily in this sequence:

(1) The prospective Subscriber and the certifier enter into a contract for certification services. With the system service provider currently the certifier for the present system, this contract is made as part of the Service Contract enrolling the user.

(2) The certifier gathers evidence by obtaining information from its agents (such as a Registrar), the subscriber (through account-information forms), and other information sources as the certifier requires to confirm the accuracy of the representations that the certifier will make in certificates issued in the account. Those representations that require supporting evidence include, depending on the content of the certificate and the wording of the documentary form of the certificate, (a) identity; (b) private key possession; (c) private key functionality; (d) security in key generation; (e) safekeeping since generation; and (0 private key not a duplicate.

Regarding identity, it is checked that the prospective Subscriber is indeed the person identified by the names to be listed in the certificate.

Regarding private key possession, it is checked that the prospective Subscriber actually holds the private key corresponding to the public key to be listed in the certificate. A secure procedure should be used to confirm this fact without disclosing the prospective Subscriber's private key to the certifier. An approach commonly taken in standards is to have the prospective Subscriber digitally sign certain information, so that the certifier can evaluate the functioning of the private key by verifying that digital signature.

Regarding private key functionality it is checked that the private key is capable of use as specified in the certificate. For example, if the private key is to be used for digital signatures, it should be capable of creating a digital signature verifiable by the public key and algorithm to be listed in the certificate.

Regarding security in key generation it is checked that the private key was created under circumstances of security reasonable in view of the level of reliability to be provided by the certificate.

Regarding safekeeping since generation it is checked that the prospective Subscriber has not compromised the private key since its creation.

Regarding the private key not being a duplicate, it is checked that the public key is not listed in another certificate listed in the present system's user database.

Some of these representations, particularly those regarding the private key, vary from one certificate to another and therefore must be performed on a certificate-specific basis. However, they are also quite easily automated, whereas confirmation of the subscriber's identification often requires greater effort and expense. It is therefore ordinarily done only when the account is opened.

(3) When the evidence is gathered, the certifier evaluates the evidence to determine whether it is sufficient to support the representations to be made in certificates relative to the account limits to be set and the overall risk. The certifier may use internal checklists or guidelines in making this evaluation, but it ordinarily does not disclose them widely in order to avoid publishing the exact recipe for committing a fraud. The certifier retains discretion to require more evidence, regardless of whatever guidelines it may have adopted.

(4) If the certifier determines to open the account, it archives the supporting evidence and contracts.

(5) To implement a new account an account history and limits are initialized. The certifier creates a new database record in which to record the account history. That database includes thresholds or limits at which incidents in the account history will trigger responsive actions by the certifier. Once set, those limits may rise or fall depending on the account history. If no claims of fraud or other untoward incidents occur, the certifier will ordinarily raise the limits as time passes. If the account reaches the limits set for it, the certifier may avoid increasing its risk (such as by declining to issue further certificates in the account) or may require additional evidence for the certified representations While the account is open, the certifier Issues certificates for it as described in section 3.4.2.

3.4.1.2. Closing Certification Accounts

The certifier or subscriber may close the certification account as provided in their contract. Closure of the account generally terminates the contract and vice versa. Often, the certifier retains the right to suspend service or close the account quickly, and also to revoke all valid certificates in the account, in the event of a serious breach of the subscriber's obligations.

Closing a certification account does not terminate the enrollment of the subscriber as a user of the present system, although it may affect the ability of the user to use the system as a practical matter, because a valid certificate is required to send messages via the message handling unit.

3.4.2. Certificate Life Cycle

Figure 13:
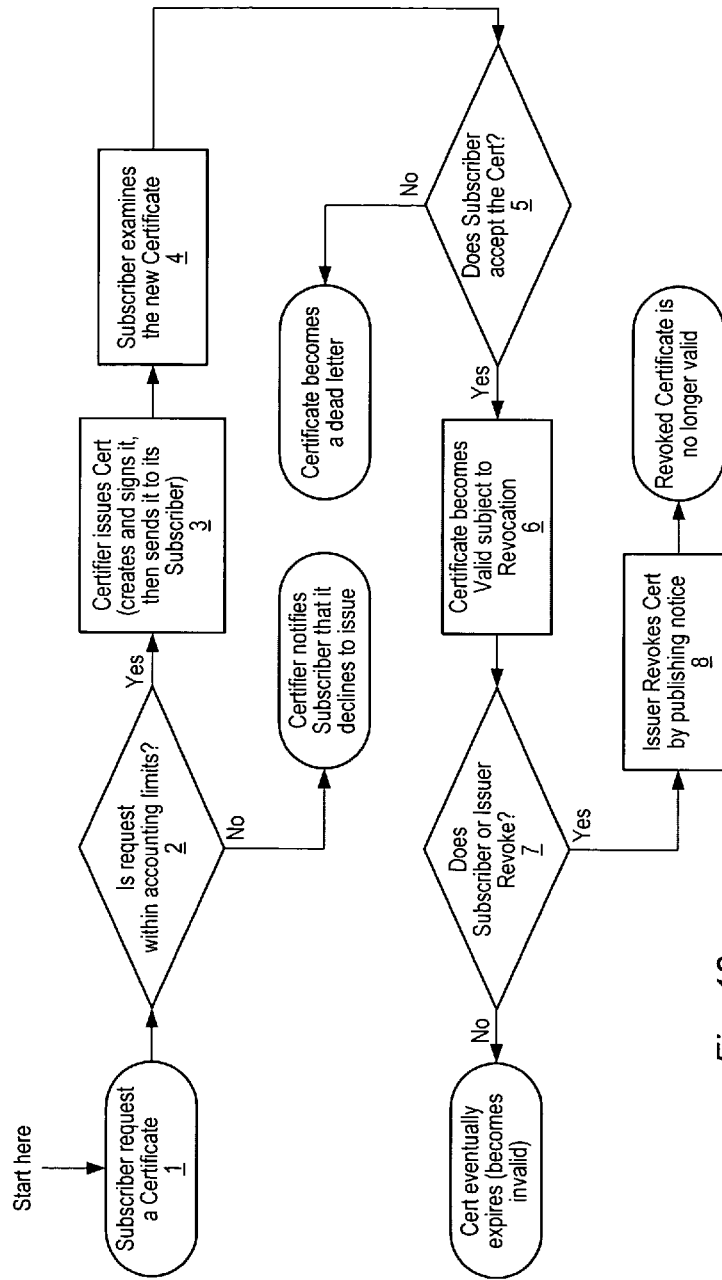
FIG. 13 is a flow diagram showing the lifecycle of a subscriber certificate, from beginning to end.

FIG. 13 is a flowchart showing how a certificate begins when issued, becomes valid when accepted by its subscriber, and terminates when it expires or is revoked. The subsections describe the events shown in the flowchart in greater detail.

3.4.2.1. Issuance of Certificates

When an account is opened, an initial certificate is issued based on a paper and ink-signed request together with certain information provided in digital form. Because the account is newly opened, the subscriber probably has no means of digitally signing a certificate request, so this initial or "bootstrap" certificate must be requested on paper.

Ordinarily, this first certificate becomes the initial account maintenance certificate. An account maintenance certificate is a certificate which the subscriber reserves for use in digitally signing messages to its certifier in order to request services from the certifier. Ordinarily, the account maintenance certificate has only one proper relying party, namely its Issuer, and it may be valid for a longer period than most certificates. If it does expire, the subscriber can request another account maintenance certificate before the expiration of the current one, or by digitally signing a request using another valid certificate. The certifier revokes the account maintenance certificate when the certification account is closed.

To have a certificate issued, the subscriber sends a digitally signed certificate request to the certifier. The request provides certain specifications from the subscriber and information to be included in the new certificate, such as the new public key to be listed in the new certificate and some data digitally signed by the new private key to demonstrate that the subscriber possess it and that it functions properly.

When the certifier receives a request for a new certificate, it checks the applicable limits in the requesting subscriber's certification account. It also checks the content of the proposed certificate to determine whether its accuracy can be confirmed. To confirm the identity of the subscriber, the certifier ordinarily refers to evidence gathered when the certification account was opened. To confirm the functionality of the private key and the subscriber's possession of it, the certifier verifies a digital signature from the subscriber using the new private key, checks the system user database, and checks the subscriber's response to certain questions about the safekeeping of the private key, all of which are automated processes. If the requested certificate falls within those limits and all its content is confirmed:

(1) The certifier creates a certificate in the form required by ITU X.509, containing the content requested by the subscriber and confirmed by the certifier, and including a reference to a documentary Form for interpretation.

(2) The certifier then digitally signs the certificate using a private key reserved for signing certificates. The corresponding public key is listed in a certificate issued by an accredited certifier as described in section 3.2.

(3) The certifier then sends the certificate to the subscriber via the message handling unit so that the subscriber can accept it.

The certifier then awaits any express acceptance that the subscriber may return.

3.4.2.2. Certificate Acceptance and Publication by the Subscriber

When the subscriber receives its newly issued certificate from the certifier, the subscriber should examine it and report to the certifier any errors in the certificate content. If the subscriber finds no errors, the subscriber can accept the certificate by (a) express acceptance, (b) usage (active implied acceptance), or (c) passage of time or other act (passive implied acceptance).

Express acceptance follows from the Subscriber returning to the certifier an expression of its satisfaction with the certificate, its intention to accept it, or to retain and use it or the private key corresponding to its public key.

Implied acceptance through usage follows when the subscriber creates a digital signature verifiable using the public key in the certificate or encrypts information using that public key, or otherwise performs any act that induces any other person to rely on the certificate.

Implied acceptance may also follow from the passage of time or other act. If the contract between the certifier and the subscriber provides, another act by the subscriber may constitute acceptance. For example, the subscriber may be deemed to have accepted the certificate if a specified amount of time passes after the certifier sends the certificate to the subscriber, during which time the subscriber does not notify the certifier of any defect or other error in the certificate or of any intent of the subscriber not to accept it.

Acceptance may be defined more specifically in the contract between the subscriber and the certifier.

In general, the subscriber's duties with respect to the new certificate become final and fully effective when the subscriber accepts the certificate. Specifically, by accepting the certificate, the subscriber promises or warrants to the certifier and all users who may rely on the certificate that:

(a) The certificate is accurate. All representations in the certificate (as expressed in its documentary Form) are entirely true and accurate, and the subscriber is not aware of any fact material to the reliability of those representations which has not been communicated to the certifier in a writing signed by the subscriber.

(b) The private key will be kept safe. The Subscriber will retain exclusive control of the private key corresponding to the public key listed in the certificate, and prevent its disclosure to any person. If the subscriber knows or has reason to believe that the private key may have been disclosed or may not be within the subscriber's exclusive control, the subscriber will immediately request the certifier to revoke the certificate.

(c) The private key was generated securely. The Subscriber has generated the private key corresponding to the public key listed in the certificate by means of a reasonably secure system and in a reasonably trustworthy manner. Since generating the private key, the user has exercised reasonable care to prevent disclosure of the private key to any person other than the user.

(d) To the best of the subscriber's knowledge, the private key corresponding to the public key in the certificate is not listed in any certificate issued to any other person or to the subscriber. Further, the private key was not obtained by trespassory or other improper means.

(e) The subscriber further will use the private key corresponding to the public key listed in the accepted certificate only in accordance with the limits set in the documentary form of that certificate. The user shall comply with all applicable requirements of the documentary Form of the certificate and shall not induce other parties to violate those requirements or exceed the limits set in the documentary form of the certificate.

If the subscriber does not accept the certificate, these promises and warranties do not apply, but the subscriber should promptly notify the certifier so that the certifier can nullify the certificate and to prevent any misunderstanding.

The certificate is not valid until its subscriber has accepted it. It is best if the notBefore subfield in the validity field of the certificate roughly coincides with the time of the subscriber's acceptance, but since the validity field must be specified before the subscriber accepts, it cannot be a perfect indicator of acceptance. To prevent reliance on a certificate that may be invalid but whose invalidity will not be apparent from its content, the certifier should not disclose the certificate to anyone until the certifier is certain that the subscriber has accepted it. To this end, the contract between certifier and Subscriber may provide for acceptance by allowing a specified amount of time to pass.

Once the certificate becomes valid, the certifier may publish it in a repository, if the subscriber permits or the contract between the subscriber and certifier provides for publication. Publication is described in section 3.4.2.4.

3.4.2.3. Certificate Revocation

If the safekeeping of the subscriber's private key becomes compromised or in doubt, or if the subscriber no longer wishes to be bound by its obligations with respect to a certificate, the subscriber should request the certifier to revoke the certificate. Revocation invalidates the certificate, so that neither the subscriber nor the certifier are bound by it any longer.

The certifier may revoke a certificate a certificate that it has issued without a request from the subscriber or without the subscriber's consent in some situations. These situations include (i) when an account is closed, (ii) when the certificate is unreliable, and (iii) following a governmental order.

Regarding account closure, this relates to when the certifier closes the user's certification account as described in section 3.4.1.2.

An unreliable certificate can arise when the certifier finds that (a) the certificate was not properly requested, issued, or accepted by its subscriber, (b) was issued without sufficient authorization by any person whose authorization is required, (c) was obtained by fraud or based on a mistake, (d) contains false, misleading, or highly questionable information, (e) is defective in form, or (f) in any other way creates a possibility for erroneous or inappropriate reliance or usage.

A governmental order ordering revocation of a specified certificate is actioned by the certifier if issued by a governmental authority reasonably believed to have jurisdiction over the certifier.

When a certifier revokes a certificate, it does not destroy it or make it any less available than it ordinarily is. Neither does the subscriber destroy the revoked certificate. Instead, revocation is accomplished by publishing notice that the certificate indicating that the certificate is no longer valid. Ordinarily, the notice is published in a repository, which is a facility engineered so as to be available online when needed to support reliance on the certificate. The specific repository where notice of revocation must be published is the location listed in the crlDistributionPoints field of the certificate. If that field is not present in the certificate or lists no repository, then notice of revocation must be posted at the Issuer's address listed in the issuer field of the certificate.

Since revocation does not make the revoked certificate unavailable, even though it has become wholly unreliable, it is important for the Relying Party to check the Repository listed in the crlDistributionPoints field to ascertain whether the certificate has been revoked. The message handling unit performs this check when it verifies a digital signature, and, as noted in section 2.4.2.2, it is commonly the message handling unit that verifies the digital signatures of other users of the present system. However, when a user receives a digital signature, including the service provider's digital signature on a message forwarded from the message handling unit, the user must verify that digital signature and check for revocation of the certificate used for that verification. The Subscriber's user system ordinarily checks for revocation automatically, without intervention by the subscriber, but the subscriber nevertheless bears responsibility to assure that it does so.

Operational Rule 11: Checking for Revocation

When required to verify a digital signature, a subscriber shall check the Repository listed in the crlDistributionPoints field in the certificate (or in the issuer field if crlDistributionPoints is not in the certificate) to determine whether notice of revocation has been posted for a certificate necessary for that verification.

When the subscriber encrypts information using the public key listed in a certificate, the subscriber should also check whether the certificate is revoked, although that check is not currently mandated by an operational rule.

Revocation of a certificate has only prospective effect; until revoked, a valid certificate remains valid until it expires. Thus, a digital signature created before a certificate is revoked can be properly verified, and another user may rely on that digital signature and hold responsible for it the subscriber listed in the certificate used for verification, even if the subscriber's private key had been stolen and the certificate should have been revoked.

Operational Rule 12: Time of Revocation and Digital Signature

A certificate is revoked at the time listed in the notice of revocation. In determining when a digital signature was created, the decision-maker considers all relevant facts and circumstances, including the times ascribed to the message or document bearing the digital signature.

A certifier never states in a notice of revocation that the time of revocation is before the actual time when notice of revocation is published in the appropriate repository. The contract between the certifier and the subscriber should specify how soon, after receipt of a request, the certifier must effect the requested revocation through publication.

3.4.2.4. Publication into Repository

A repository is an online directory or database containing notices of revocation, certificates, and other information useful in the process of relying on certificates. In the field of certificates and digital signatures, "directory" often implies the system specified in ITU X.500 for coordinating, relating, and referring to users and information resources. The present system includes a repository, and that repository is the one listed as the location where notice of revocation will be posted (the crlDistributionPoint) for all certificates issued by the system service provider.

The message handling unit checks that repository for notice of revocation of a certificate when verifying a user's digital signature on a message sent through the message handling unit.

Users may obtain revocation information, copies of certificates, and other available information about users via version 3 of the Lightweight Directory Access Protocol (LDAP), which is a standard means of accessing information from a repository. LDAP Version 3 is standardized in RFC 2251 of the Internet Engineering Task Force. Also applicable are IETF RFCs 2254 (text representation), 1823 (API), 2164 (e-mail addresses via LDAP), 2247 (existing domain names in Distinguished Names for use via LDAP), 2252 (attribute syntax definitions), 2255 (URL formats), 2256 (user schema).

4. Title Registry

The title registry is a central electronic database of information relating to electronic bills of lading. In the following, it is described how the title registry processes electronic bills of lading. A basic knowledge of traditional paper bills of lading is assumed.

The Title Registry is a database application for recording and transferring the rights and obligations contained in an electronic bill of lading (eBL). The Title Registry does not store or read the eBL document but records information about the eBL contained in the Title Registry instruction. Thus, the bill of lading document itself is simply an electronic version of the bill of lading that is used today.

Figure 31:
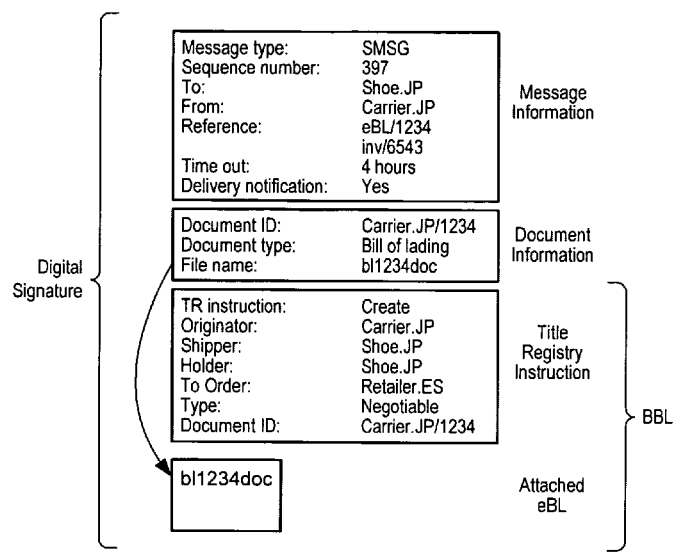
FIG. 31 shows the format of a system message including message and document information, and a title registry instruction and attached electronic bill of lading (eBL)

The Title Registry instruction together with the eBL is referred to as a BBL (see FIG. 31). The BBL and the Rule Book provide the functional equivalent of a traditional paper bill of lading.

For each BBL, the Title Registry creates a set of records containing: (1) the parties (user IDs) involved; (2) the function requested/completed; (3) the type of eBL; and (4) the eBL identifier.

Creation of or changes to a Title Registry record are made by instructions issued by authorized parties. These instructions are sent as normal system messages. When the message handling unit receives a message containing a Title Registry instruction, it forwards the message to the Title Registry. The Title Registry validates the information, creates or updates the records, and returns a result to the message handling unit. The message handling unit adds the result to the sender's message and forwards the new message to the recipient. To avoid receiving instructions out of sequence, the Title Registry only permits a single instruction in a system message.

One important distinction should be made between a paper bill of lading and an eBL recorded in the Title Registry. Paper bills of lading typically come in sets of three "originals". The concept of multiple originals is not necessary in the present system because the message handling unit guarantees the original content of the carrier's or NVOC's (Non Vessel Operating Carrier's) eBL (using digital signatures) and the Title Registry records all rights and obligations in a single place. The eBL can be copied to multiple parties for information, but the ability to act is determined by the status of the BBL in the Title Registry.

In addition to recording information and controlling access to records, the Title Registry also carries out four additional functions, namely (1) automatic notifications; (2) assurance that the eBL is enclosed when required; (3) management of amendments to the BBL; and (4) conformance with the rules as stated in the Rule Book. Maintenance of endorsement chains.

When processing is completed in the Title Registry, a result is issued to the sender and receiver(s).

4.1.1. Nature of Electronic Bills of Lading

In simplistic terms, a bill of lading is a document signed by a carrier and which serves as a receipt for goods in carriage, a contract for that carriage, and a document entitling the holder to delivery of the goods from the carrier. Functionally, the bill of lading moves from the carrier to the shipper and ultimately to the buyer of the goods, and it may pass through the hands of others such as banks along the way. As they come into possession of the bill, these persons may acquire rights and obligations in relation to it.

The electronic bill of lading retains the traditional business meaning and functions of a bill of lading, while replacing its paper medium with electronic records. To that end, an electronic bill of lading consists of an electronic record of a document in combination with transactional information.

The document part represents a bill of lading. The document, digitally signed by the carrier, has a document ID and the other properties of a document as described in section 2.3, including the hash result that can be used to determine whether the document is identical to another. The bill-of-lading document is digitally signed as part of the message creating the electronic bill of lading. As with all documents included in digitally signed messages, the digital signature applies to the entire message, rather than to the document specifically. The bill-of-lading document is sent into the central parts of the system maintained by the service provider via the message handling unit, where it is recorded by its document ID. This document is termed the "electronic bill of lading text" or eBL text.

The transactional information is related to the associated bill-of-lading document. For each electronic bill of lading, the title registry maintains a database record in the form of a table which is known as a "title registry record". The title registry record lists the user identifiers of users who occupy certain roles in relation to the electronic bill of lading, as well as certain other data. The rulebook interprets these role specifications to create certain rights and obligations in relation to the electronic bill of lading. Users empowered to change the data in the title registry record do so by sending title registry instructions in the type headers of messages sent via the message handling unit.

The electronic bill of lading is thus (1) an eBL Text, a document reading like a conventional, paper bill of lading, combined with (2) a database record, termed a title registry record, kept by the system service provider to record the transactions in relation to that document by which system users acquire rights and obligations under it pursuant to the rulebook.

4.1.2 Title Registry Parties

The following are the parties that are named in a Title Registry instruction. We have used the same terms that are currently used in the paper world where possible. However, we have had to create new terms and alter others to take into account the specific requirements of BBLs. In each case, there can only be one User ID named as one of the parties at a time.

Originator is the party that creates the BBL (carrier or NVOC). This field is mandatory.

Surrender party is the party to whom the BBL will be surrendered (the agent of the carrier). If the Originator is also the Surrender Party, this field is not used.

Shipper is the party that contracts with the Originator for carriage of the goods. This field is mandatory.

Holder is the party that is analogous to the person who would have physical possession of the eBL if it were a paper document. The Holder is the party that is entitled to receive the paper bill of lading if the BBL is switched to paper. When the BBL has no named To Order party or Consignee (blank endorsed), the Holder is described as a Bearer Holder. Either a Holder or a Pledgee Holder is mandatory.

Pledgee Holder is the party that has a pledge on the BBL. A Pledgee Holder is a bank that has provided risk financing for a trade transaction covered by the BBL (typically through a letter of credit). A pledge enables the bank to assume the rights (subject to the liabilities) relating to the BBL in the event of a default. When the BBL has no named To Order party or Consignee (blank endorsed), the Pledgee Holder is described as a Pledgee Bearer Holder. Either a Holder or a Pledgee Holder is mandatory.

To Order Party is the party that is the endorsee of a transferable (negotiable) BBL. The Title Registry can also maintain a blank-endorsed (no named To Order party) transferable BBL. This field is optional.

Consignee is the party that is normally the buyer of goods and is named on a non-transferable (non-negotiable) BBL. This field is optional.

Moreover, any User ID (registered) can be a party in a Title Registry record. The Title Registry will act on instructions from a party as long as the User ID shares the same root name. For instance, if the user "Shoe.GB" (root="Shoe") is the Holder of a BBL, the user "Shoe.JP" (root="Shoe") will be able to act on the BBL as the Holder.

4.2. Roles in Electronic Bills of Lading

The rights and obligations of the users in relation to an electronic bill of lading are grouped into roles that reflect both the traditional functions of a bill of lading and the way those functions have been replicated by the operation of the title registry, which keeps a record of those roles as data fields within a title registry record. In those fields in a title registry record, the title registry stores information about the status of the electronic bill of lading and the rights and obligations of system users in relation to it.

FIG. 14 depicts in a simplified way the logical structure of a title registry record. The fields in this illustration are explained below in this section.

The content of a role field must be a user identifier, including all user division identifiers (the parts of the user identifier indicating departments or other subunits of the user), but without the user identifier extension. Although a full user identifier is listed, any person able to digitally sign on behalf of the user can send a title registry instruction to effect a change in the title registry for the user, unless limited by the user's own system. Whilst user division identifiers are listed in the title registry record, they are ignored when the title registry carries out title registry instructions.

A user takes on a role in the title registry when a user having the requisite power designates itself or another user to that role. The processes for designating users to roles are explained in section 4.4. Section 4.2 describes the roles themselves.

4.2.1. Originator (Carrier)

The Originator is the contracting carrier, the user that creates the electronic bill of lading by agreement with the Shipper. The role of Originator has various properties in the title registry as now described.

As a matter of functional power, any user can be entered into the field in a title registry record for an Originator (carrier), although as a real-world, practical matter, only certain users will be able to act as carriers in fact.

Only one user can be listed as the Originator of an electronic bill of lading (i.e., its user identifier is in the Originator role field).

Every electronic bill of lading has an Originator (carrier).

An Originator (carrier) designates itself as such when creating an electronic bill of lading as described in section 4.4.2.

Once an electronic bill of lading has been created, no user can designate a new Originator for it or change the user identifier recorded as its Originator.

An Originator has the power to: (1) create an electronic bill of lading, and in so doing, designate its Shipper, initial Holder, and its initial To Order Party or its Consignee, along with other roles as explained in section 4.4.2; (2) grant or deny a request to amend an electronic bill of lading; and (3) carry out a switch-to-paper directive given by another user.

4.2.2. Surrender Party

A Surrender Party is the person appointed by the Originator to receive the surrendered electronic bill of lading. The title registry uses the term "surrender" to mean the final transfer of an electronic bill of lading to its Originator (or Surrender Party) when delivery of the shipped goods is to occur. The Surrender Party role has a number of properties in the title registry as now described.

Any user can be designated the Surrender Party (i.e., have its user identifier placed in the Surrender Party role field).

Only one user identifier can be designated the Surrender Party for an electronic bill of lading.

Designation of a Surrender Party is optional at the Originator's (carrier's) discretion. If no Surrender Party is specified, the Originator (carrier) will receive the surrendered electronic bill of lading.

Only the Originator of the electronic bill of lading can designate the Surrender Party.

Once designated, the Surrender Party is entered permanently and cannot be changed by normal title registry functions, although it can be changed by amendment of the electronic bill of lading by its Originator as described in section 4.4.5.

The Surrender Party does not have the power to perform any title registry functions in its role as Surrender Party.

4.2.3. Shipper

A Shipper is the person contracting with the originator/carrier for the shipment of the goods in question. Often, the Shipper is the seller or exporter of the goods. The Shipper role field has a number of properties in the title registry as now described.

Any user can be designated the Shipper (i.e., have its user identifier placed in the Shipper role field).

Only one user can be designated the Shipper of an electronic bill of lading.

Every electronic bill of lading has a Shipper designated when the electronic bill of lading is created.

The Originator who creates the electronic bill of lading designates the Shipper, in accordance with its agreement with that Shipper.

Once designated, the Shipper is permanently entered and cannot be changed using normal title registry functions, although it can be changed by amendment of the electronic bill of lading by its Originator as described in section 4.4.5.

A Shipper does not have the power to perform any title registry operations simply by virtue of its role as Shipper. A Shipper's powers derive from other roles besides being a Shipper. As detailed in section 4.3, in combination with other roles, a Shipper can, for example:

(1) Designate a Holder or Pledgee, if the Shipper is also simultaneously Holder of the electronic bill of lading;

(2) Designate a Consignee or successive To Order Party, or blank endorse the bill so as to make it transferable by changing its Holder, if the Shipper is also simultaneously the bill's Holder-To Order or Bearer Holder;

(3) Surrender the bill, if the Shipper is also simultaneously its Holder-To Order or both its Holder and Consignee (which is expected to be a rare case); and (4) Request amendment of the electronic bill of lading or give a switch-to-paper directive, if the Shipper is also simultaneously its Holder.

A Shipper who has ceased to be the Holder of the electronic bill of lading cannot perform any functions in relation to that bill.

4.2.4. Consignee

A Consignee is the buyer or importer, the person who is to receive the goods according to a non-transferable electronic bill of lading. When a Consignee is designated for a transferable electronic bill of lading, the bill becomes non-transferable. The Consignee role field has various properties in the title registry as now described.

Any user can be designated the Consignee (i.e., have its user identifier placed in the Consignee role field).

Only one user identifier can be designated the Consignee of an electronic bill of lading.

The present system does not require a Consignee to be designated.

In creating an electronic bill of lading, the Originator can designate a Consignee of the bill, if the Originator is not designating a To Order Party for that bill. After a To Order Party has been designated for a bill, its current Holder-to-order or Bearer Holder can designate a Consignee.

Once designated, the Consignee is entered permanently and cannot be changed using normal title registry functions, although it can be changed by amendment of the electronic bill of lading by its Originator as described in section 4.4.5.

The Consignee which is also simultaneously the Holder of an electronic bill of lading has the power to:

(1) Request amendment of the electronic bill of lading;

(2) Surrender the electronic bill of lading to the Originator-carrier or designated Surrender Party; and (3) Give a switch-to-paper directive for the electronic bill of lading. If the Consignee is not also the Holder of the electronic bill of lading, the Consignee cannot perform any title registry operations.

4.2.5. To Order Party

A To Order Party is the endorsee of a transferable electronic bill of lading. The role field for a To Order Party in the title registry has various properties as now described.

Any user can be designated a To Order Party (i.e., have its user identifier placed in the to-order role field).

Only one user identifier at a time can be designated the To Order Party of an electronic bill of lading.

The present system does not require a To Order Party to be designated.

In creating an electronic bill of lading, the Originator may designate its initial To Order Party (as the Shipper instructs).

A Bearer Holder may also designate a To Order Party by an instruction removing the blank endorsement on the bill and entering a user identifier in the To Order Party role field. Once designated, a To Order Party may designate a successor by a process analogous to endorsement, as described in section 4.4.3.3.

Once a To Order Party has been designated, it may be changed by the process described in section 4.4.3.3.

A user which is the current To Order Party and simultaneously Holder (i.e., a Holder-To Order) of an electronic bill of lading has the power to:

(1) Designate a successor To Order Party for the bill;

(2) Designate a Consignee, and thereby convert the electronic bill of lading into a non-transferable bill;

(3) Blank endorse the bill and then designate a new Holder, thereby making the bill transferable by the new Bearer Holder;

(4) Pledge the bill by designating a Pledgee;

(5) Surrender the bill to the Originator-carrier or designated Surrender Party; and (6) Give a switch-to-paper directive for the electronic bill of lading.

A To Order Party cannot perform any operation in the title registry unless the To Order Party is also simultaneously the Holder of the affected electronic bill of lading. Such a To Order Party that is also the Holder is termed a "Holder-To Order".

4.2.6. Bearer Holder

A Bearer Holder is analogous to the person in physical possession of a bearer bill of lading, i.e., one that is transferable by changing physical possession of the bill. A Bearer Holder is created by blank endorsing an electronic bill of lading and then designating a Holder as described in section 4.4.3.1. Thus, a Bearer Holder is simply the Holder of a blank endorsed electronic bill of lading.

The role of Bearer Holder has various properties in the title registry as now described.

Any user can be designated a Bearer Holder (i.e., have its user identifier placed in the Holder role field of a blank endorsed electronic bill of lading).

Only one user at a time can be the Holder (and thus, a Bearer Holder) of an electronic bill of lading.

A Bearer Holder exists only if an electronic bill of lading has been blank endorsed. Blank endorsement is also optional.

An Originator (carrier), in creating an electronic bill of lading, or the current Holder-To Order can blank endorse it.

Successive Holders of an electronic bill of lading are designated as described in section 4.4.3.1. As mentioned above, while an electronic bill of lading is blank endorsed, designating a Holder is equivalent to designating its Bearer Holder.

The current Bearer Holder may designate a successor by making another user the Holder of the electronic bill of lading. The Bearer Holder may also eliminate its role by removing the blank endorsement and designating a To Order Party or Consignee.

The current Bearer Holder of an electronic bill of lading has the power to:

(1) Designate a new Bearer Holder (by designating a new Holder for the blank endorsed electronic bill of lading). The Bearer Holder cannot, however, blank endorse the bill, because it is already blank endorsed;

(2) Designate a To Order Party and thereby convert the electronic bill of lading to one transferable by designating successive To Order Parties;

(3) Designate a Consignee, and thereby convert the electronic bill of lading to a non-transferable bill;

(4) Pledge the bill by designating a Pledgee;

(5) Request amendment of the bill; and (6) Give a switch-to-paper directive for the electronic bill of lading

4.2.7. Pledgee

A Pledgee is a financial institution which has an interest in the electronic bill of lading based on financing of the shipped goods or assuring payment for them. The Pledgee role field has these properties in the title registry:

Any system user identifier can be designated a Pledgee (i.e., placed in the Pledgee role field).

Only one user identifier at a time can be designated the Pledgee of an electronic bill of lading.

Designation of a Pledgee is not mandatory.

A Holder-To Order or Bearer Holder can designate a Pledgee. One Pledgee may also name another, succeeding Pledgee. Whenever a Pledgee is designated, the Pledgee is also automatically designated the Holder of the pledged electronic bill of lading. So long as the Pledgee remains Pledgee, it is also Holder. A Pledgee which is also simultaneously the Holder is termed a Pledgee Holder.

A Pledgee can designate a successor, or may delete its user identifier from the Pledgee role field and thereby relinquish its pledge.

A Pledgee which is also simultaneously the Holder (i.e., a Pledgee Holder) has the power to:

(1) Relinquish its pledge by deleting its user identifier from the Pledgee role field;

(2) Enforce its pledge by designating itself the To Order Party, if the electronic bill of lading is not blank endorsed. If it is blank endorsed, the Pledgee Holder simply removes its user identifier from the Pledgee role field, thereby becoming Bearer Holder of a bill no longer pledged;

(3) Give a switch-to-paper directive for the electronic bill of lading; and (4) Designate a successive Pledgee Holder. The Pledgee Holder cannot, however, designate a new Holder which is not also Pledgee.

As mentioned above, a Pledgee which is not also Holder exists only in theory. The title registry makes a newly designated Pledgee also the Holder, and does not permit the Pledgee to designate another Holder while also Pledgee.

4.2.8. Holder

The Holder is the party who is entitled to physical possession of the bill-of-lading document, if the electronic bill of lading is switched to paper. The Holder role field has various properties in the title registry as now described.

Any system user identifier can be designated a Holder (i.e., have its user identifier placed in the Holder role field).

Only one user at a time can be the Holder of an electronic bill of lading.

It is mandatory for every electronic bill of lading has a Holder at all times from its creation until its surrender. A Holder cannot delete its user identifier from the Holder role field.

A system user who is currently the Holder of an electronic bill of lading can designate another system user as the Holder, unless the Holder is also Pledgee.

The Holder of the electronic bill of lading may change as long as the bill is active (i.e., from the time when the bill is created until it is surrendered or switched to paper).

A Holder has the power to: (1) Designate a Pledgee Holder or a successive Holder (if not also Pledgee); (2) Give a switch-to-paper directive for the electronic bill of lading; and (3) Request amendment of the electronic bill of lading.

4.3. States and Types of Electronic Bills of Lading

Tradition built up over the centuries provides several taxonomies for bills of lading, which can, for example, be clean or claused, straight or "negotiable", and so on. These distinctions generally persist for bills of lading in their electronic form as implemented in the present system. A bill-of-lading document sent into the present system can, for example, be claused or clean, depending on how the Originator and its counterparties draft the eBL Text.

However, to these traditional distinctions between bills of lading, the functionality of the title registry adds a new typology based on whether the electronic bill of lading is operationally active. That functionality also adds some operational nuances to the concept of transferability and distinctions based on that concept. The following subsections examine these distinctions based on operational activity and transferability.

4.3.1. Operational States

An electronic bill of lading passes through a life cycle of creation and termination. The operations that the title registry can perform on the electronic bill of lading vary depending on which state the electronic bill of lading is in. Briefly, the electronic bill of lading has three operational states. It is created into an active state, may transfer into a suspended state while an amendment is pending, and also has a terminated state which results from the electronic bill of lading having exhausted its functionality as a transaction support instrument.

The active state begins when an Originator properly creates an electronic bill of lading. The active state is interrupted when the electronic bill of lading enters suspended status indicating an unresolved amendment request. The active state ends when the electronic bill of lading is terminated. In the active state, the electronic bill of lading can be transferred as described in section 4.4.3., or pledged, amended, switched to paper, or surrendered.

The suspended state is entered if a party with the power to request an amendment of the electronic bill of lading does so. The suspended state ends, and the active state is resumed, when the Originator denies the request for amendment, or grants the request and completes the amendment. While an electronic bill of lading is in the suspended state, no operations are possible other than the granting or denying of a request for amendment.

The terminated state is entered when a party with the necessary power surrenders the electronic bill of lading or switches it to paper. Entry of the terminated state is irreversible. Moreover, no operations are possible on an electronic bill of lading in the terminated state.

Section 4.4. below describes in more detail the operations that cause an electronic bill of lading to change between these operational states.

4.3.2. Transferability States

The criterion differentiating the active, suspended, or terminated status of operational activity is based on the stages in the life cycle of an electronic bill of lading and the operations that should be permitted at each stage. The criterion differentiating the typology described in this subsection is the transferability of the electronic bill of lading. Since transfers are operations consisting of designating another user in a particular role, transferability differs only perhaps conceptually rather than functionally from the operational states.

The system distinguishes between three states of transferability, namely non-transferable, transferable and pledged.

A non-transferable state is entered when an Originator, current Holder-To Order or Bearer Holder designates a Consignee for an electronic bill of lading. Entry into the non-transferable state is irreversible and permanent as far as transferability state is concerned, and ends only when the electronic bill of lading enters the terminated state by surrender or a switch to paper. Transferability state changes are not possible with an electronic bill of lading in the non-transferable state.

A transferable state is entered when an Originator designates a To Order Party or blank endorses the new electronic bill of lading. Transferability is interrupted while a bill is pledged. The transferability state ends when the bill is made non-transferable by designating a Consignee or when the bill enters the terminated operational state. The current To Order Party or Bearer Holder of a transferable bill may designate a successive To Order Party or Bearer Holder, designate a Consignee (making the bill pledged), or designate a Consignee (making the bill non-transferable).

A pledged state is entered when a Holder designates a Pledgee for a transferable electronic bill of lading. The pledged state ends when the Pledgee enforces or relinquishes the pledge. In the pledged state, enforcement or relinquishment of the pledge are possible. The bill can also be amended or switched to paper. Transfers (e.g. designation of a successive Holder, To Order Party, or Consignee) are not possible.

4.4. Operations on Electronic Bills of Lading

As noted in describing the states of operational state activity in section 4.3.1., an electronic bill of lading typically passes through a several transactions or events from its beginning to end. This progress changes data in the title registry record for the electronic bill of lading. Through the rulebook those changes in data in turn effect change the rights of system users in relation to the electronic bill of lading, much like a paper bill of lading changes hands and transfers rights along its transactional course. To effect these changes in rights, a user occupying a role having the requisite power designates other users to roles. Besides designations, a user in a suitably empowered role may perform other operations affecting the title registry record as well. This section describes those operations.

The following is a list of instructions supported by the Title Registry. The functions available to parties are summarized in FIG. 32.

(1) Create—allows the creation of a record in the Title Registry for a new BBL.
(2) Name Holder—transfers holdership in an existing BBL record.
(3) Name Pledgee Holder—names a Pledgee Holder or transfers a pledge in an existing BBL record.
(4) Name To Order—names a To Order party in an existing BBL record.
(5) Name Consignee—names a Consignee in an existing BBL record.

(6) Blank Endorse—removes the To Order party in an existing BBL record.
(7) Enforce Pledge—makes the Pledgee Holder the Holder and To Order party (if one is named) of a transferable BBL, in an existing BBL record.
(8) Request Amendment—requests the Originator to amend the BBL(s) related to the existing BBL record(s).
(9) Grant Amendment—grants the amendment by updating or creating BBL record(s) in the Title Registry.
(10) Deny Amendment—denies the amendment by returning the BBL record(s) in the Title Registry to their pre-request amendment state.
(11) Switch to Paper—requests the Originator to create an original paper BL from an original BBL.
(12) Surrender—returns the BBL to the Originator (to fulfill the obligations in the contract of carriage).

4.4.1. Title Registry Operations in General

Each operation involving title registry records is described specifically and in detail in the sections after this one. However, this section notes at the outset that all of the title registry operations have a common way of using the general messaging framework of the message handling unit. Each operation affecting the title registry is accomplished by means of the message handling unit's SMsg-FMsg-DNot sequence explained in section 2.2, and as illustrated in FIG. 15.

In FIG. 15, reference numeral 1 denotes the SMsg message sent from a User to the Message Handling Unit of the Central System, reference numeral 2 denotes the input from the Message Handling Unit to the Title Registry of the Central System, reference numeral 3 denotes the return code from the title registry regarding success of the database update, reference numeral 4 denotes a notice in the form of a FMsg to the affected user (if required), and reference numeral 5 denotes a DNot notice sent to the sender of the SMsg regarding completion.

Figure 16:
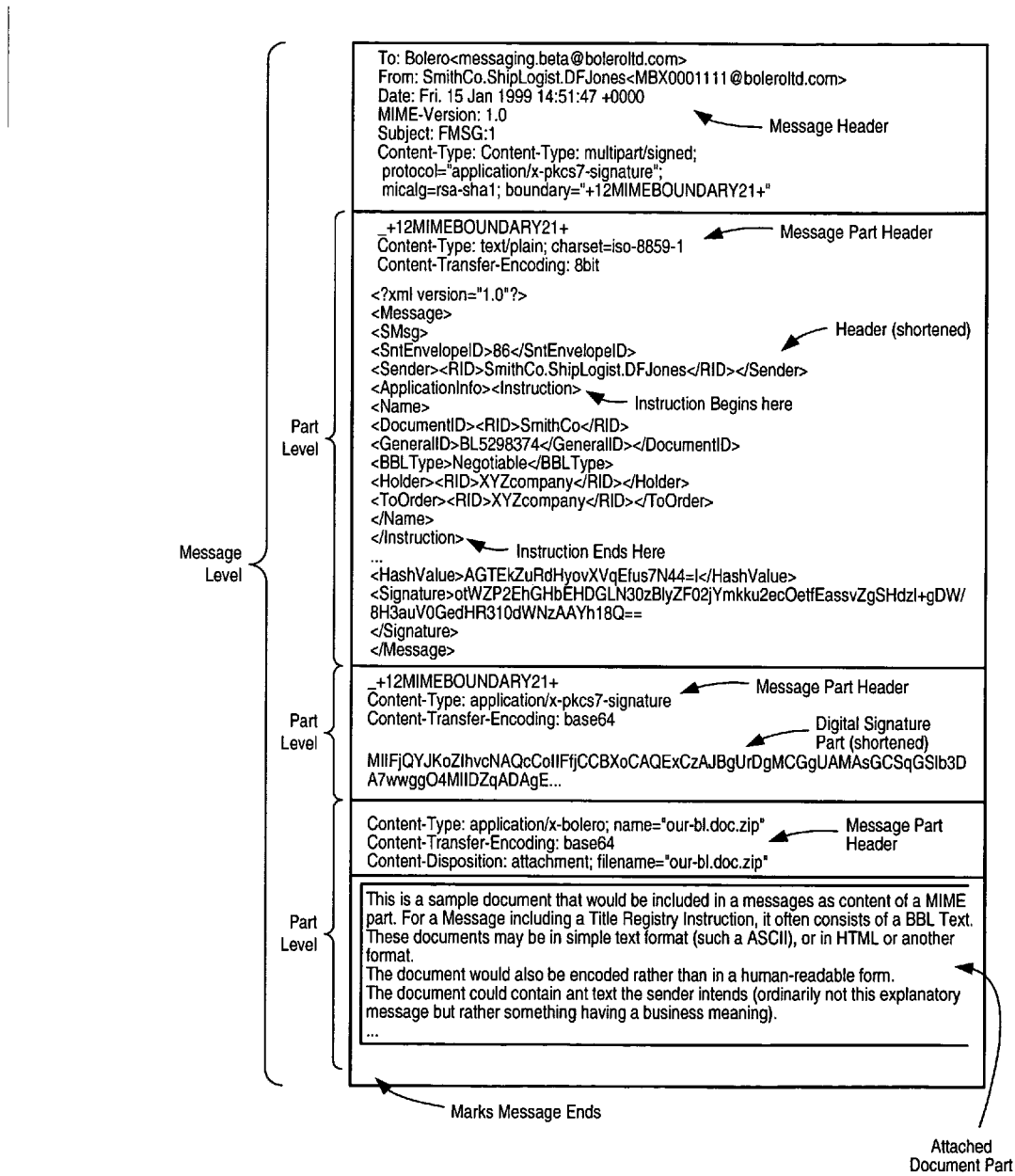
FIG. 16 illustrates message components showing the Instruction element for the title registry.

More specifically, to perform an operation changing data in the title registry:

(1) The user initiating the operation sends a message having a type header in the SMsg form to the message handling unit. That SMsg message includes in its type header an element labeled Instruction as illustrated in FIG. 16. In addition, the sending user must often include the eBL Text as a document in the message. The eBL Text need not be included in relinquishing or enforcing a pledge, requesting or denying amendment, switching to paper or surrendering the electronic bill of lading. For all other transactions, the sender must include the eBL Text in the SMsg message. In no case is it an error to include a eBL Text when not required. The SMsg message need not indicate the recipient of an FMsg message, because the message handling unit and/or title registry will determine automatically as described in the sections below which users are to be notified and send them FMsg messages, regardless of which recipients the sender indicates in the SMsg message. As usual, when the message handling unit receives an SMsg with the Instruction element, it returns a BAck (or BNak if the SMsg message is technically invalid as defined by prescribed criteria.

(2) If the SMsg message is technically valid, the message handling unit passes an Instruction based on its Instruction element to the title registry, which processes the Instruction as explained below with regard to each specific type of Instruction. After processing the Instruction, the title registry returns to the message handling unit a code indicating whether the processing succeeded or failed.

(3) After the title registry has processed the input from the SMsg Instruction, it reports the action to affected users (other than the sender of the SMsg) in the form of forwarding messages each of which has a type header in the FMsg form. Which users receive such FMsg messages is explained below for each title registry operation.

(4) After the message handling unit forwards the FMsg messages to the affected users and they each return a UAck message, the message handling unit returns to the sender of the original SMsg message a delivery notification DNot message indicating that the title registry carried out the instruction and sent the related FMsg notifications to affected users. If one or more of them fails to acknowledge the FMsg notification by returning a UAck, the message handling unit returns a FNot to the sender of the SMsg message.

The SMsg message has the same overall structure as any other message, except that its SMsg type header contains an element named Instruction, as illustrated in the simplified example in FIG. 16. The Instruction element contains the information necessary to update the title registry, as explained in greater detail in the subsections of this section.

Operations involving the title registry and the SMsg messages, and Instruction elements that effect them, can be classified into the categories of: (a) creation, (b) transfers, (c) pledges, (d) amending, (e) surrendering and (f) switching to paper.

Creation of an electronic bill of lading is effected by an Originator (the carrier).

Transfers occur as users change their rights and obligations in an electronic bill of lading pursuant to the Rulebook by designating users to roles such as To Order Party, Holder, Consignee, and the like.

Pledges result from financial institutions designating themselves as pledgees. A pledge makes the electronic bill of lading analogous to collateral for credit that the institution has extended in financing the sale of the shipped goods. While designated as Pledgee, the financial institution can enforce or relinquish its pledge.

Amending of an electronic bill of lading is authorizable by the Originator of an electronic bill of lading on request by certain users.

Surrendering occurs after the electronic bill of lading has run its course. The electronic bill of lading is surrendered to the Originator (carrier) or the Surrender Party (the carrier's agent, if there is one). The Originator or Surrender Party will then set in motion the procedure for delivery of the shipped goods.

Switching to paper can be performed if necessary to convert an electronic bill of lading to paper form at the request a user in an appropriate role.

The remainder of this section examines each of the operations in those categories in detail.

4.4.2. Creating an Electronic Bill of Lading

Creating an electronic bill of lading initializes a new record for the bill in the title registry with a reference to the eBL Text. The record contains blank fields for the various roles possible for the bill.

Operational Rule 13: Creating an Electronic Bill of Lading
When creating an electronic bill of lading, an Originator shall:
(a) complete the title registry instruction by:
  (1) Supplying the document ID for the eBL Text;
  (2) Designating the Shipper;
  (3) Stating whether the electronic bill of lading is transferable or non-transferable, and
    (i) if non-transferable, designate the Consignee, or
    (ii) if transferable, either designate the To Order Party or indicate that the bill is Blank Endorsed;
  (4) designating the Surrender Party (f any);
  (5) designating the Holder of the electronic bill of lading;

(b) attach the eBL Text in the form of a document; and (c) sign and send a message (including the title registry instruction created under sub-rule (a) above and the eBL Text to the title registry via the message handling unit.

The remainder of this section comments on that Operational Rule.

The Originator (carrier) creates an electronic bill of lading. The present system does not distinguish between users who are Originators and may create electronic bills of lading and users who cannot.

The title registry does not restrict when an Originator may create an electronic bill of lading.

Figure 17:
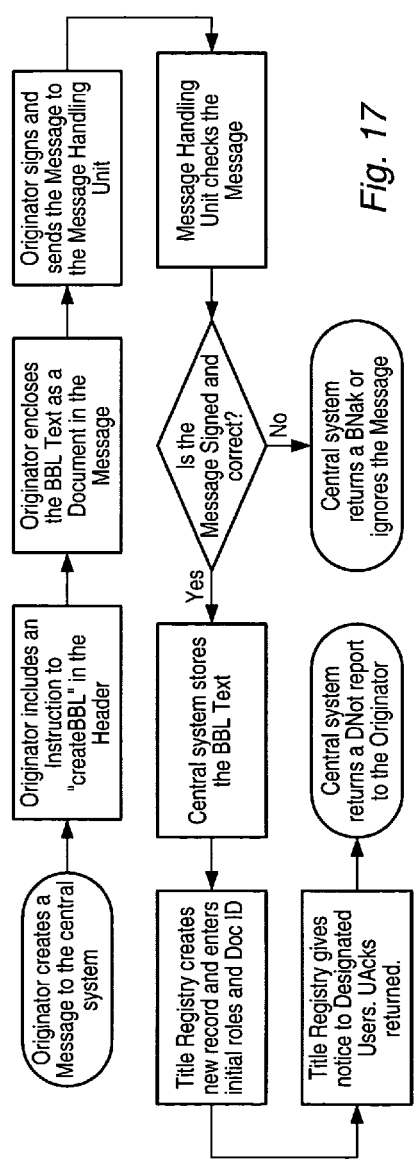
FIG. 17 is a flow diagram showing the process of creating an electronic bill of lading.

FIG. 17 illustrates creation of an electronic bill of lading. Creation takes place by the following steps:

(1) Using a user system, the Originator creates a message to the message handling unit. The message has a type header in the SMsg form.

(2) The title-registry is then supplied with the required information. In the Instruction element within the SMsg type header of the message, the Originator's user system inserts the subelement CreateBBL., which directs the title registry to create a new electronic bill of lading. Within the CreateBBL element the Originator specifies a number of parameters, as follows:

(a) the Originator supplies a document ID for the accompanying eBL Text;

(b) the Originator indicates whether the new electronic bill of lading is to be "negotiable" (i.e. transferable as described in section 4.3.2.) or "non-negotiable" (non-transferable as described in section 4.3.2.). The title registry checks this indicator of transferability against roles designated for the electronic bill of lading to determine whether the role designations are consistent with the "negotiable" or "non-negotiable" listing for the bill;

(c) the Originator also includes its own user identifier to indicate which user is sending the message and creating this electronic bill of lading;

(d) the Originator may also specify a Surrender Party, depending on whether the Originator intends to authorize an agent to act on its behalf when the bill is surrendered;

(e) the Originator specifies the user identifier of the Shipper of the new electronic bill of lading;

(f) the Originator also specifies the initial Holder of the new bill; and (g) the Originator may specify either a Consignee or a To Order Party, or the Originator may Blank Endorse the new bill and thereby make its Holder a Bearer Holder. If a To Order Party is designated or the bill is Blank Endorsed, the Instruction must also indicate that the bill is "negotiable". If a Consignee is designated, the Instruction must also indicate that the bill is to be "non-negotiable".

(3) The Originator includes in the message (or "attaches" to it) a document that is to serve as the text of the bill of lading, i.e. the eBL Text. This document must have a document ID and satisfy the other requirements, including uniqueness, set out in section 2.3 above. The title registry stores this document as provided in the applicable document retention schedule. It is generally unnecessary to attach multiple instances of the same document by analogy to the practice of issuing multiple counterparts of a single bill of lading on paper. Because all users who need to see and change the electronic bill of lading can do so, users can forego the confusion and disputation that attends multiple copies.

(4) The Originator then digitally signs the message containing the eBL Text and the initial role designations and sends the message into the message handling unit.

(5) As for any SMsg message, the message handling unit checks the message for conformity with the message validity requirements, including a check of its authenticity through verification of the Originator's digital signature on the message. The title registry and/or message handling unit also checks the form of the message. If the digital signature cannot be verified or any other fault in the message is detected, the message handling unit returns a BNak to the Originator.

(6) If the message is established to be technically valid and signed, it is decoded and the eBL Text included in the message is stored.

(7) If the title registry and message handling unit finds the message to be signed and technically valid, a record for the new electronic bill of lading is created in the title registry and the initial roles as designated by the Originator are entered in that record.

(8) The title registry sends a message through the message handling unit having an FMsg type header to the Shipper and Holder of the new electronic bill of lading, and to the Surrender Party, if one is designated. The message serves as notice of the creation of the new electronic bill of lading and of the rights and obligations associated with designations of relevant users in the new electronic bill of lading.

(9) The title registry then confirms the successful creation of the electronic bill of lading by returning a message through the message handling unit having a BAck type header to the Originator who created the new electronic bill of lading. That type header includes a report from the title registry of the actions it has taken.

Once an electronic bill of lading has been created, it becomes active as described in section 4.3.1. beginning when the new record is created in the title registry.

The information entered into the title registry when an electronic bill of lading is created, including the eBL Text and designations, all remains in the title registry and available to permitted users for the time specified in the applicable retention schedule. Entry of the new electronic bill of lading is also noted in the chronological logs of message flow, and that log is retained for as specified in the applicable retention schedule.

4.4.3. Transfers of an Active Electronic Bill of Lading

Transfers of an electronic bill of lading pass rights and obligations from one user to another. A user makes a transfer by designating another user in a role field. The present system recognizes four transfers based on prior practices with paper bills of lading, namely: transfer by one Holder to a successor, transfer to a Consignee, transfer to a To Order Party, and transfer to a Bearer Holder by blank-endorsing.

For transfer by one Holder to a successor, transferring the rights of a Holder is analogous to transferring the physical possession of the bill of lading, if it were in tangible form. This transfer consists of the current Holder designating a successor.

For transfer to a Consignee, the transfer is similar to making a paper bill of lading "straight" or "non-negotiable". An electronic bill of lading with a Consignee is not transferable to a To Order Party or capable of being blank endorsed. The Consignee, if also Holder, can surrender the electronic bill of lading and take delivery of the goods.

For transfer to a To Order Party, when this is performed by an Originator creating a new electronic bill of lading, designating a To Order Party is similar to issuing a negotiable paper bill of lading to the designee's order, and handing it to the Holder (probably the Shipper). As long as the To Order Party is not also Holder and thus Holder-to-order, its capabilities are very limited. When an existing Holder-to-order or Bearer Holder designates a Holder-to-order, the effect is analogous to endorsing the bill of lading to a specified endorsee.

For transfer to a Bearer Holder by blank-endorsing, blank endorsement flags the electronic bill of lading as being blank endorsed and eliminates the existing To Order Party. It leaves the electronic bill of lading transferable simply by changing its Holder. It is thus analogous to a paper bill transferable by bearer.

The next subsections examine in greater detail these transfers of an active electronic bill of lading. Pledges of electronic bills of lading, which are transfers of interests for purposes of securitization, are examined in section 4.4.4.

4.4.3.1. Designating a Holder

As section 4.2.8. explains, the Holder is analogous to the person who would have physical possession of the electronic bill of lading, if it were a tangible document. Therefore, the Holder the person who is entitled to receive the paper bill of lading, if the electronic bill of lading is switched to paper. Further, if the bill is blank endorsed as described in section 4.4.3.4., its Holder is a Bearer Holder described in section 4.2.6. Thus, designating a new Holder of a bill which is not blank endorsed indicates who will henceforth be entitled to receive the paper bill when the switch-to-paper directive is carried out. However, if the bill is also blank endorsed, designating a Holder is equivalent to designating a Bearer Holder.

The initial Holder is designated when the electronic bill of lading is created. Thereafter, the bill always has a Holder, because the title registry can only substitute user identifiers in the Holder role field. It does not empty the field of its content.

The instruction for designating a Holder may be combined with either the instruction for designating a To Order Party, designating a Consignee, or blank-endorsing the electronic bill of lading. It is always automatically combined with designation of a Pledgee; so that the user designated as Pledgee is always also designated as Holder. The designation of a Pledgee as Holder is automatic and need not be included in a title registry instruction.

Operational Rule 14: Designating a Holder

To designate a new Holder of an electronic bill of lading, the current Holder of that electronic bill of lading shall:

(a) Complete a title registry instruction designating the new Holder for that electronic bill of lading; and (b) Attach the eBL Text of that electronic bill of lading in the form of a document; and (c) Sign and send a message (including that Instruction and eBL Text) to the title registry via the message handling unit.

The remainder of this section comments on that Operational Rule.

A user can designate a Holder only if the user is either the current Holder of the electronic bill of lading, or an Originator creating a new electronic bill of lading.

A Holder may designate a new Holder only when the electronic bill of lading is active as described in section 4.3.1. Further, if the electronic bill of lading is pledged, the Holder may designate a new Holder only if the designator is also Pledgee and the user designated the Holder is also simultaneously designated as the Pledgee. An Originator may designate a Holder only when creating the electronic bill of lading.

Figure 18:
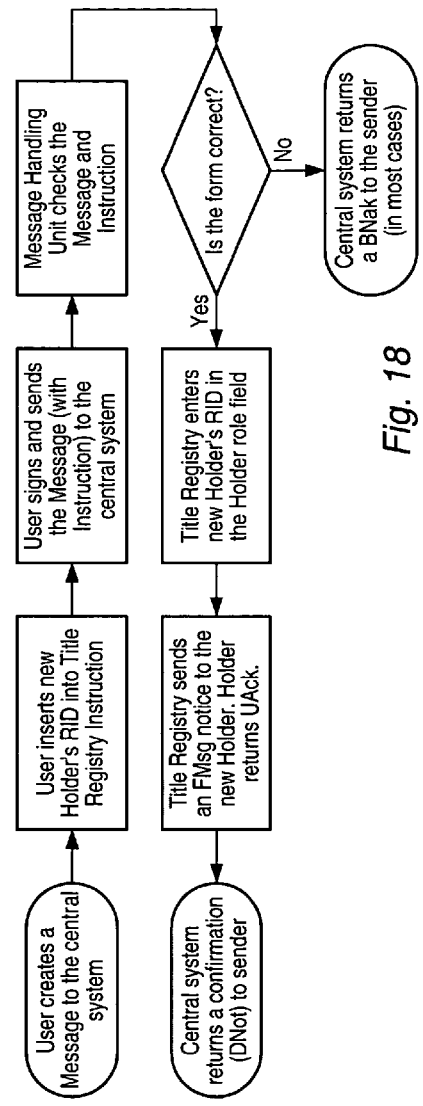
FIG. 18 is a flow diagram showing the process of designating a new holder.

As FIG. 18 illustrates, to designate a new Holder the following processes are involved:

(1) Using a user system, the appropriate user creates a message to the message handling unit.

(2) The user identifier is then tagged by the user designating the new holder in the create message by listing the new Holder's user identifier within appropriate tags in the Instruction element of the message type header. Further tagged data, such as the Document ID of the bill to be affected, is also required there.

(3) The user then digitally signs the message containing the new-Holder designation and sends the message into the message handling unit.

(4) As for any message, the message handling unit checks the message's authenticity by verifying the sender's digital signature. The message handling unit and/or title registry also check the form of the message. If the message handling unit and title registry cannot properly verify the digital signature or does not find the form of the message correct, the message handling unit returns a BNak.

(5) If the sender's digital signature is verified and the message found to be valid, the title registry is updated by changing the content of the Holder role field to be the user identifier of the new Holder listed in the message type header. The former Holder's user identifier is removed from the title registry record for that bill.

(6) The title registry then confirms the successful designation of the new Holder by returning to the sending user, through the message handling unit, a DNot message having a BAck type header. That type header includes a report from the title registry of the actions it has taken.

The title registry notifies the newly designated Holder of its designation.

Designating a new Holder generally does not affect the status of an electronic bill of lading. However, if the designation occurs as part of creating the bill, the completion of the creation process leaves the bill in the active state.

The title registry record containing the designation of the Holder remains in the title registry and available to permitted users for the time specified in the applicable retention schedule. The title registry instruction effecting the designation is also recorded in the chronological log of message flow, and that log is retained for as specified in the applicable retention schedule.

4.4.3.2. Designating a Consignee

As section 4.2.4. explains, the Consignee of an electronic bill of lading is analogous to the Consignee of a conventional non-negotiable bill of lading. Designating a Consignee makes the electronic bill of lading non-transferable from that point on. Designation of the Consignee ordinarily occurs only once in the lifetime of an electronic bill of lading, so once the Consignee role field is filled in, its content remains unchanged.

Operation Rule 15: Designating a Consignee

A. An Originator may designate a Consignee in creating an electronic bill of lading (see Operational Rule 13).

B. To designate a Consignee, a Pledgee Holder, Bearer Holder, or Holder-to-order of an electronic bill of lading shall:

(a) Complete a title registry instruction designating the Consignee for that electronic bill of lading; and (b) Sign and send a message, including the title registry instruction, to the title registry via the message handling unit.

Operational Rule 16: Designating a Consignee Holder

To designate a Consignee Holder, the Holder of an electronic bill of lading shall perform the procedures required in Operational Rules 14 and 15. The title registry instructions designating the same user as both Consignee and Holder may be sent within the same message.

The remainder of this section comments on that Operational Rule.

An Originator may designate a Consignee when creating the electronic bill of lading, but not after the present system has returned an acknowledgment notifying the Originator that the bill has been successfully created. The current Holder-to-order or Bearer Holder of the electronic bill of lading may also designate a Consignee.

As mentioned, an Originator must be creating the electronic bill of lading to designate its Consignee. The current Holder-to-order or Bearer Holder may designate a Consignee only if the bill is active and transferable.

Figures 19, 20:
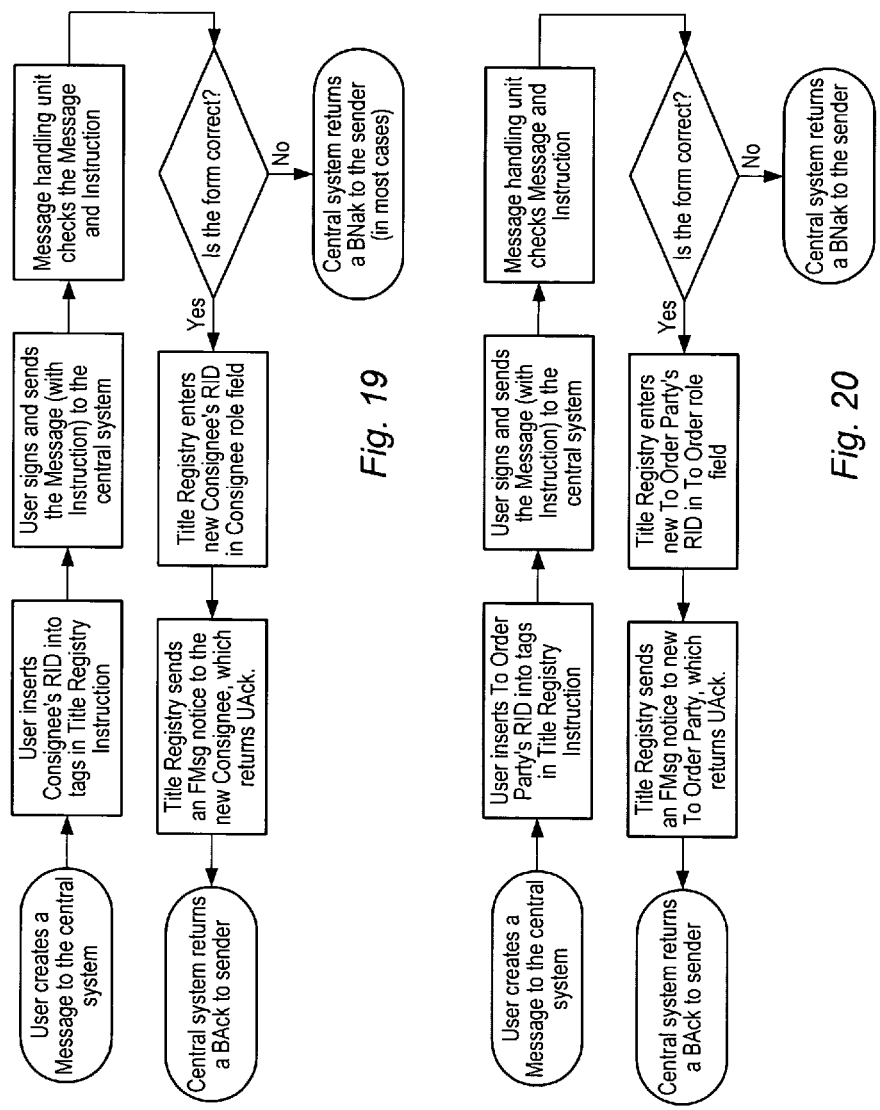
FIG. 19 is a flow diagram showing the process of designating a Consignee.
FIG. 20 is a flow diagram showing the process of designating a To Order Party.

As FIG. 19 illustrates, to designate a Consignee, the following steps are performed:

(1) The appropriate user creates a message to the message handling unit;

(2) In that message, the user designates a Consignee by listing the new Consignee's user identifier within appropriate tags in the Instruction element of the message type header. Further tagged information, such as the document ID of the bill to be affected and an indication that the bill is "non-negotiable", is also required there;

(3) The user then digitally signs the message containing the Consignee designation and sends the message into the message handling unit;

(4) As for any message, the message handling unit checks its authenticity by verifying the sender's digital signature. The message handling unit and/or title registry also checks the form of the message. If the message handling unit and/or title registry cannot properly verify the digital signature or finds the form incorrect, it returns a BNak;

(5) If the sender's digital signature is verified and the message is found valid, the title registry changes the content of the Consignee role field from empty to the user identifier of the new Consignee listed in the message type header; and (6) The title registry then confirms the successful designation of the Consignee by returning via the message handling unit a DNot message having a BAck type header to the sender. That type header includes a report from the title registry of the actions it has taken.

The Title Registry notifies the new Consignee of its designation. If the Consignee is also the current Holder (perhaps through the same message as the one effecting the Consignee designation), the notice includes the following text notice: "You have been designated as the Holder of this electronic bill of lading in accordance with the Rulebook. By virtue of your capacity as Holder of this electronic bill of lading, in addition to your designation as a To Order Party, Consignee, Bearer or Pledgee, we (the Service Providers) confirm on behalf of the Originator of this electronic bill of lading (the carrier) that the goods are now held to your order."

Further, if the new Consignee is also the Holder, it may reverse the designation by returning to the Title Registry a message with a header in the SBRf form within the timeout period of 24 hours beginning when the title registry record is updated with the new designation, provided that the SBRf message is sent before the designated user takes any other action in relation to the bill. Alternatively, it may accept the appointment by returning a UAck, letting the timeout period elapse, or taking action in relation to the bill other than returning an SERE Designating a Consignee makes the electronic bill of lading non-transferable beginning when the title registry is updated.

The title registry record containing the designation of the Consignee remains in the title registry and available to permitted users for the time specified in the applicable retention schedule. The title registry instruction effecting the designation is also recorded in the chronological log of message flow, and that log is retained for as specified in the applicable retention schedule.

4.4.3.3. Designating a To Order Party

As section 4.2.5. explains, the To Order Party of an electronic bill of lading is analogous to the endorsee of a conventional bill of lading. Like an endorsee, the To Order Party can further transfer the bill, if the To Order Party also holds it. For an electronic bill of lading, the process analogous to endorsement to order consists of designating a successive To Order Party and Holder (i.e., a Holder-to-order).

Operational Rule 17: Designating a To Order Party

A. An Originator may designate a To Order Party in creating an electronic bill of lading (see Operational Rule 13).

B. To designate a To Order Party, a Pledgee Holder, Bearer Holder, or Holder-to-order of an electronic bill of lading shall:

(a) Complete a title registry instruction designating the To Order Party for that electronic bill of lading; and (b) Sign and send a message, including that title registry instruction, to the title registry via the message handling unit.

Operational Rule 18: Designating a Holder-to-Order

To designate a Holder-to-order, a Pledgee Holder, Bearer Holder, or existing Holder-to-order of an electronic bill of lading shall perform the procedures required in Operational Rules 14 and 17. The title registry instructions designating the same user as both To Order Party and Holder may be sent within the same message.

The remainder of this section comments on that Operational Rule.

An Originator may designate a To Order Party when creating the electronic bill of lading, but not after the title registry has returned an acknowledgment through the message handling unit notifying the Originator that the bill has been successfully created. The current Bearer Holder of the electronic bill of lading may also designate a Consignee. One To Order Party may also designate a successive To Order Party if the designating To Order Party is also Holder (i.e., the Holder-to-order).

As mentioned, an Originator must be creating the electronic bill of lading to designate its To Order Party. The current Bearer Holder or Holder-to-order may designate a To Order Party only if the electronic bill of lading is active and transferable.

FIG. 20 illustrates the process of designating a To Order Party, that has the followings steps:

(1) The appropriate user creates a message to the message handling unit;

(2) In that message, the user designates a To Order Party by listing the new To Order Party's user identifier within appropriate tags in the Instruction element of the message type header. Further tagged information, such as the document ID of the bill to be affected and an indication that the electronic bill of lading is "negotiable", is also required there;

(3) The user then digitally signs the message containing the To Order Party designation and sends the message into the message handling unit;

(4) As for any message, the message handling unit checks its authenticity by verifying the sender's digital signature. The message handling unit and/or title registry also checks the form of the message. If the message handling unit or title registry cannot properly verify the digital signature or find the form incorrect, a BNak is returned;

(5) If the message handling unit and title registry properly verify the sender's digital signature and find the message valid, the title registry changes the content of the To Order Party role field to the user identifier of the new To Order Party listed in the message type header. The former To Order Party's user identifier is removed from the title registry record for that bill; and (6) The title registry then confirms the successful designation of the new To Order Party by returning a DNot message having a BAck type header to the sender through the message handling unit. That type header includes a report from the title registry of the actions it has taken.

The title registry notifies the new To Order Party of its designation. If the newly designated To Order Party is also the current Holder (perhaps through the same message as the one effecting To Order Party designation), the notice includes the following text: "You have been designated as the Holder of this electronic bill of lading in accordance with the Rulebook. By virtue of your capacity as Holder of this electronic bill of lading, in addition to your designation as a To Order Party, Consignee, Bearer or Pledgee, we (the system service provider) confirm on behalf of the Originator of this electronic bill of lading (the carrier) that the goods are now held to your order." Further, if the new To Order Party is also Holder, it may reverse the designation by returning to the title registry a message with a type header in the SBRf form within the timeout period of 24 hours beginning when the title registry record is updated with the new designation, provided that the SBRf message is sent before the designated user takes any other action in relation to the bill. Alternatively, it may accept the appointment by returning a UAck, letting the timeout period elapse, or taking action in relation to the bill other than returning an SBRf.

Designating a To Order Party when none is currently designated makes the bill transferable by designating a successive To Order Party beginning when the title registry is updated. When one To Order Party designates a successive To Order Party, the bill remains transferable, with the transfer possible only by the successor beginning when the title registry is updated.

The title registry record containing the designation of the To Order Party remains in the title registry and available to permitted users for the time specified in the applicable retention schedule. The title registry instruction effecting the designation is also recorded in the chronological log of message flow, and that log is retained for as specified in the applicable retention schedule.

4.4.3.4. Blank Endorsing and Designating a Bearer Holder

If an electronic bill of lading is not already transferable by Bearer Holder, creating a Bearer Holder for it consists of blank-endorsing the bill. Blank-endorsing consists of flagging the electronic bill of lading as being Blank Endorsed in the title registry, which has the effect of making its Holder at that time its Bearer Holder. The new Bearer Holder may thereafter transfer the bill simply by changing its Holder as described in section 4.4.3.1. In other words, a Bearer Holder is the Holder of a blank endorsed electronic bill of lading.

Designating a new Holder has already been covered in section 4.4.3.1. This section focuses on blank-endorsing electronic bills of lading.

Operational Rule 19: Blank Endorsing an Electronic Bill of Lading

A. An Originator may Blank Endorse an electronic bill of lading in creating it (see Operational Rule 13).

B. To Blank Endorse an electronic bill of lading, a Holder-to-order of an electronic bill of lading shall:

(a) Complete a title registry instruction Blank Endorsing that electronic bill of lading (Note: The To Order Party designation will be automatically removed by the title registry upon processing that Instruction.); and (b) Sign and send a message, including that title registry instruction, to the title registry via the message handling unit.

Operational Rule 20: Becoming Bearer Holder by Blank Endorsement

A. The Holder of an electronic bill of lading becomes its Bearer Holder when the Instruction effecting the Blank Endorsement is entered into the title registry record B. A Holder-to-order may designate a new Holder by an Instruction in the same message as the Instruction effecting the Blank Endorsement. The newly designated Holder thereby becomes the Bearer Holder of the newly Blank Endorsed electronic bill of lading.

Operational Rule 21: Transfers by Bearer Holder

A Bearer Holder (the Holder of a Blank Endorsed electronic bill of lading) may designate a new Bearer Holder by the procedure required in Operational Rule 14 for designating a new Holder.

The remainder of this section comments on that Operational Rule.

Only the Originator creating an electronic bill of lading or the current Holder-to-order may blank endorse an electronic bill of lading.

An electronic bill of lading can be blank endorsed only if it is active, transferable, and not pledged.

As mentioned above in this section, for one Bearer Holder of a Blank Endorsed bill to designate another, the Bearer Holder simply designates a new Holder as described in section 4.4.3.1.

To make a Bearer Holder when none exists already, the bill's current Holder-to-order blank endorses it.

FIG. 21 illustrates the process of blank endorsing an electronic bill of lading, the operations of which are now described:

(1) the appropriate user creates a message for dispatch to the message handling unit;

(2) in that message, the user includes a blank endorse indicator in the form of a BlankEndorse tag in the Instruction element of the message type header. Further tagged data, such as the document ID of the bill to be affected and an indication that the electronic bill of lading is "negotiable", is also required;

(3) the user then digitally signs the message containing the BlankEndorse tag and sends the message into the message handling unit;

(4) as for any message, the message handling unit checks its authenticity by verifying the sender's digital signature. The message handling unit and/or title registry also check the form of the message. If the message handling unit or title registry cannot properly verify the digital signature or find the form incorrect, a BNak is returned;

(5) if the message handling unit and title registry properly verify the sender's digital signature and find the message valid, the title registry marks the electronic bill of lading as blank endorsed and changes the content of the To Order Party role field to empty; and (6) the title registry then confirms via the message handling unit the successful Blank Endorsement by returning a DNot message having a BAck type header to the sender. That type header includes a report from the title registry of the actions it has taken.

A new Bearer Holder is notified by the following text in the FMsg message: "You have been designated as the Holder of this electronic bill of lading in accordance with the Rulebook. By virtue of your capacity as Holder of this electronic bill of lading, in addition to your designation as a To Order Party, Consignee, Bearer or Pledgee, we (the system service provider) confirm on behalf of the Originator of this electronic bill of lading (the carrier) that the goods are now held to your order."

The new Bearer Holder may reverse the designation by returning to the title registry a message with a type header in the SBRf form within the timeout period of 24 hours beginning when the title registry record is updated with the new designation, provided that the SBRf message is sent before the designated user takes any other action in relation to the bill. Alternatively, it may accept the appointment by returning a UAck, letting the timeout period elapse, or taking action in relation to the bill other than returning an SBRf.

Blank-endorsing an electronic bill of lading makes it transferable by its Bearer Holder.

The title registry record containing the blank endorsement remains in the title registry and available to permitted users for the time specified in the applicable retention schedule. The title registry instruction effecting the designation is also recorded in the chronological log of message flow, and that log is retained for as specified in the applicable retention schedule.

4.4.4. Pledge Transactions

Pledge transactions reflect the activities of financial institutions involving bills of lading. There are three main pledge transactions, namely designating a Pledgee, relinquishing a pledge, and enforcing a pledge.

Regarding designating a Pledgee, when the current Holder-to-order or Bearer Holder designates a Pledgee, it enters a user identifier into the Pledgee role field for the electronic bill of lading. It thereby converts the bill to pledged status, and thus suspends the ordinary powers of the To Order Party or Bearer Holder while the bill is pledged, as described in section 4.3.2. Designating an initial Pledgee for an electronic bill of lading is analogous to giving a conventional bill of lading to a bank as a sort of security for a documentary credit. Once a Pledgee is designated, it may also designate a successor.

Regarding relinquishing a pledge, to return a bill from pledged status to ordinary transferable status, the Pledgee deletes its user identifier from the Pledgee role field. That deletion is the relinquishment of the pledge.

Regarding enforcing a pledge, if the Pledgee must exercise its rights in the security represented by the pledge, the Pledgee designates itself the current Holder-to-order, if a To Order Party had previously been designated, or Bearer Holder if the electronic bill of lading had been Blank Endorsed. That double designation by the Pledgee is termed "enforcing the pledge".

The following subsections describe these transactions in more detail.

4.4.4.1. Designating a Pledgee Holder

Designation of a Pledgee always includes designation of a Holder. When a new Pledgee is designated by entering a user identifier into the Pledgee role field for the electronic bill of lading in question, the title registry also enters that user identifier into the Holder role field. This section describes that two-step process in greater detail.

Operational Rule 22: Designation of a Pledgee Holder

For a Holder to designate a Pledgee Holder of an electronic bill of lading (or for a Pledgee Holder to replace itself as Pledgee Holder), the Holder of that bill shall
  (a) Complete a title registry instruction designating a Pledgee Holder for that electronic bill of lading;
  (b) Attach the eBL Text of that electronic bill of lading in the form of a document; and
  (b) Sign and send a message including that Instruction and eBL Text to the title registry via the message handling unit.

The remainder of this section comments on that Operational Rule.

The current Holder (including Bearer Holder, Holder-to-order, or Pledgee Holder) can designate a Pledgee. If an electronic bill of lading is pledged, its Holder is invariably also its Pledgee, and that Pledgee Holder may thus also transfer the bill.

A Pledgee can be designated for an electronic bill of lading only if it is active and transferable.

As FIG. 22 illustrates, designation of a Pledgee involves the following steps:

(1) The appropriate user creates a message to the message handling unit;

(2) In that message, the user designates a Pledgee by listing the new Pledgee's user identifier within appropriate tags in the Instruction element of the message type header. Further tagged data, such as the document ID of the bill to be affected, is also required there;

(3) The user then digitally signs the message containing the Pledgee designation and sends the message into the message handling unit;

(4) As for any message, the message handling unit checks its authenticity by verifying the sender's digital signature. The message handling unit and title registry also check the form of the message. If the message handling unit or title registry cannot properly verify the digital signature or find the form incorrect, a BNak is returned;

(5) If the message handling unit ant title registry properly verify the sender's digital signature and find the message valid, the title registry changes the content of the Pledgee role field to the user identifier of the new Pledgee listed in the message type header. The former Pledgee's user identifier is removed from the title registry record for that bill. In addition, the title registry also enters the new Pledgee's user identifier into the Holder role field in place of whatever user identifier was there; and (6) The title registry then confirms the successful designation of the new Pledgee by returning, via the message handling unit, a DNot message having a BAck type header to the sender. That type header includes a report from the title registry of the actions it has taken.

The title registry notifies the new Pledgee Holder of its designation as such.

Designating a Pledgee for an electronic bill of lading makes it a pledged bill as described in section 4.3.2. beginning when the title registry is updated.

The title registry record containing the designation of the new Pledgee Holder remains in the title registry and available to permitted users for the time specified in the applicable retention schedule. The title registry instruction effecting the designations is also recorded in the chronological log of message flow, and that log is retained for as specified in the applicable retention schedule.

4.4.4.2. Relinquishing a Pledge

Relinquishing a pledge removes the current Pledgee's user identifier from the Pledgee role field, which in turn has the effect of returning the bill from pledged to transferable status. This section describes the process of relinquishing in detail.

Operational Rule 23: Relinquishing a Pledge

To relinquish a pledge on an electronic bill of lading (other than by naming a successive Pledgee Holder as provided in Operational Rule 24), the Pledgee Holder shall:
(a) Complete a title registry instruction which
  (1) removes his designation as a Pledgee,
  (2) designates a new Holder as required in Operational Rule 14, (b) Attach the eBL Text of that electronic bill of lading in the form of a document (c) Sign and send a message including that Instruction and eBL Text to the title registry via the message handling unit.

Figure 23:
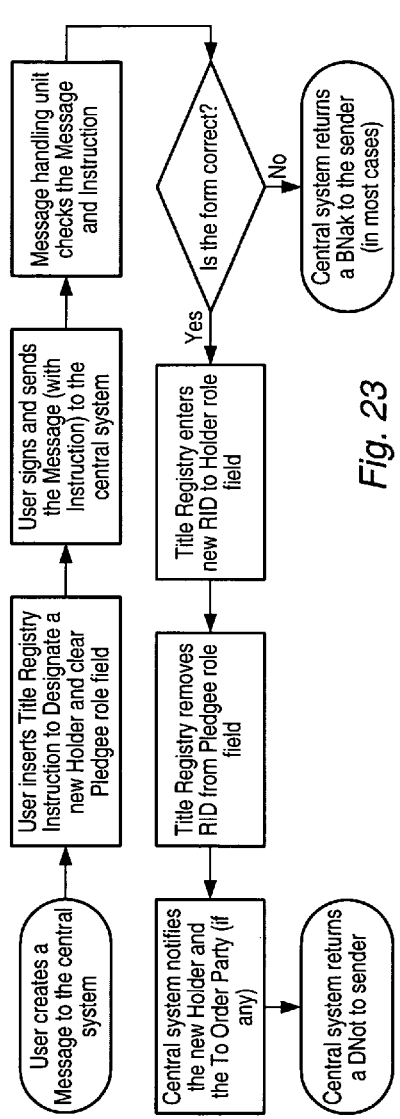
FIG. 23 is a flow diagram showing the process of relinquishing a pledge in an electronic bill of lading.

FIG. 23 is a flow chart illustrating the process of relinquishing a pledge. The remainder of this section comments on that Operational Rule.

Only the current Pledgee Holder may relinquish the pledge in an electronic bill of lading. An Originator cannot designate a Bearer Holder when creating a bill (or in any other circumstances). Rather, if the bill is to be transferable, the Originator designates a To Order Party (often the Shipper), who can then Blank Endorse the bill.

Clearly, an electronic bill of lading must be in the pledged status for its Pledgee to relinquish its pledge.

Relinquishing a pledge consists of emptying its Pledgee role field so that no Pledgee is designated. This is implemented by the following steps:

(1) The current Pledgee creates a message to the message handling unit;

(2) In that message, the current Pledgee includes a RelinquishPledge sub-element within the Instruction element of the message type header. Further tagged data, such as the document ID of the bill to be affected, is also required;

(3) The current Pledgee then digitally signs the message containing the blank Pledgee designation and sends the message into the message handling unit;

(4) As for any message, the message handling unit checks its authenticity by verifying the sender's digital signature. The message handling unit and title registry also check the form of the message. If the message handling unit and title registry cannot properly verify the digital signature or find the form incorrect, a BNak is returned;

(5) If the message handling unit and title registry properly verify the sender's digital signature and find the message valid, the title registry changes the content of the Pledgee role field to empty; and (6) The title registry then confirms the successful relinquishment of the pledge by returning, via the message handling unit, a DNot message having a BAck type header to the sender. That type header includes a report from the title registry of the actions it has taken.

No notice is given of the relinquishment of a pledge.

Relinquishing a pledge discontinues the bill's pledged status and returns it to transferable status beginning when the title registry is updated.

The title registry record reflecting the relinquishment of the pledge remains in the title registry and available to permitted users for the time specified in the applicable retention schedule. The title registry instruction effecting the relinquishment is also recorded in the chronological log of message flow, and that log is retained for as specified in the applicable retention schedule.

4.4.4.3. Enforcing a Pledge

By enforcing a pledge, the current Pledgee Holder of an electronic bill of lading displaces the current To Order Party of the bill if any, and thus becomes its Holder-to-order). If the electronic bill of lading is blank endorsed (and therefore has no To Order Party), its Pledgee Holder simply removes its designation as Pledgee, leaving itself the Bearer Holder. This section describes the process of enforcing a pledge in detail.

Operational Rule 24: Enforcing a Pledge when a to Order Party is Designated

To enforce the pledge on an electronic bill of lading when a To Order Party is currently designated, a Pledgee Holder shall:

(a) Complete a title registry instruction designating itself as the To Order Party and removing its designation as Pledgee;

(b) Sign and send the message, including that title registry instruction, to the title registry via the Message handling unit.

Operational Rule 25: Enforcing a Pledge when Blank Endorsed

To enforce the pledge on an electronic bill of lading when it is currently Blank Endorsed, a Pledgee Holder shall:

(a) Complete a title registry instruction removing its designation as Pledgee;

(b) Sign and send a message, including that title registry instruction, to the title registry via the message handling unit.

The remainder of this section comments on that Operational Rule.

Only the current Pledgee of an electronic bill of lading can enforce the pledge.

Generally, some event must have occurred giving rise to the Pledgee's right to enforce the pledge. However, the title registry does not inquire into whether the Pledgee actually has such a right.

Figure 24:
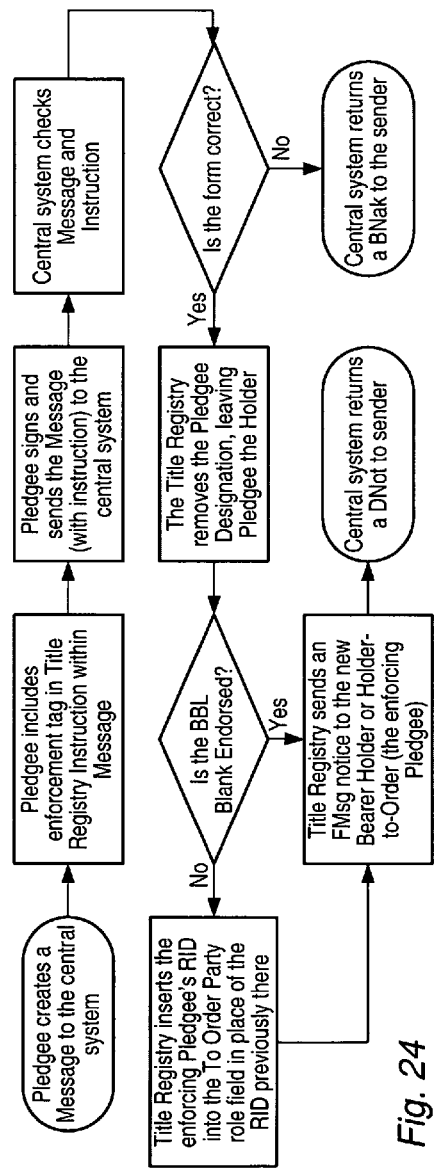
FIG. 24 is a flow diagram showing the process of enforcing a pledge, where a To Order Party is designated.

FIG. 24 illustrates the process of enforcing a pledge. Enforcing a pledge where a To Order Party is designated is substantially the same process as for designating a new To Order Party. If the electronic bill of lading is blank endorsed, enforcement of the pledge is substantially the same as relinquishing the pledge, leaving the former Pledgee Holder as the Bearer Holder.

The title registry does not notify any users affected by the enforcement of a pledge, although the enforcing Pledgee Holder may notify them independently.

Enforcing a pledge makes the electronic bill of lading transferable by the former Pledgee as its new Holder-to-order or Bearer Holder, beginning when the title registry is updated.

The title registry record reflecting enforcement of a pledge remains in the title registry and available to permitted users for the time specified in the applicable retention schedule. The title registry instruction enforcing the pledge is also recorded in the chronological log of message flow, and that log is retained for as specified in the applicable retention schedule.

4.4.5. Amendments to Electronic Bills of Lading

Once filed in the present system, a document, including the document serving as a eBL Text, remains unchanged, just as it was originally received. Subsequent references to the document make no changes to it and must match the document's attributes entered into the present system when the document was originally received. Among those attributes is a mathematical digest of the document, which the present system uses to compare all subsequent references or instances of the document purporting to be the same, in order to assure that they are exactly identical to the document on file in the present system.

Although the present system will leave an existing document unchanged, the title registry record for a particular electronic bill of lading can be made relate to a another, perhaps more recently filed eBL Text through the amendment process. Although termed "amendments", amending an electronic bill of lading leaves the existing document unchanged and merely makes the documentary reference in the title registry point to a different document as the operative eBL Text. Each title registry record includes a field containing the document ID for the corresponding eBL Text. That field serves as a reference to the eBL Text, and changing the content of that field to list a new document ID is referred to as amending the electronic bill of lading, even though the former document remains unchanged and available in unaltered form for future reference.

This "amendment" process occurs in two basic steps: First, a user requests the Originator to amend the bill, and then the Originator either grants or denies the request. If the request is granted, a new document ID is substituted for the former one in the title registry, and the transactional data in the title registry is then applied to the substituted eBL Text so that the pre-amendment rights and obligations of system users resume in relation to the new document.

Because the Originator creates and signs the eBL Text, the Originator's approval is necessary to substitute a new document for the one already referenced in the title registry. Other interested users besides the Originator can request an amendment, and when they do, the title registry suspends the electronic bill of lading so that all title registry instructions are declined until the Originator grants or denies the amendment request. The title registry does not process any dialogue between the Originator and other users in determining whether or how to amend; it simply suspends activity involving that title registry record until the request is either denied or granted with a substituted eBL Text.

Thus, the title registry instructions regarding amendments are threefold, namely request amendment, grant amendment and deny amendment.

A request amendment title registry instruction suspends operations affecting the title registry and is forwarded to the Originator for its consideration. The requesting user would ordinarily include a document explaining its reasons for the request, and perhaps also a suggested revision. Any ensuing discussion will not involve the title registry until the Originator decides to grant or deny the request.

A grant amendment title registry instruction from the Originator substitutes a new eBL Text for the one previously referenced in the title registry record. The electronic bill of lading then regains active (rather than suspended) status.

A deny amendment title registry instruction simply returns the electronic bill of lading to active status without any change to its title registry record.

The remainder of this section examines the amendment process in greater detail.

4.4.5.1. Requesting Amendment

The amendment process starts when Holder requests an amendment. That request is directed mainly to the Originator, but is recorded in the title registry in order to suspend further transactions in relation to the electronic bill of lading while the amendment request is pending, as described in greater detail below.

Operational Rule 26: Requesting an Amendment

To request or propose an amendment of the eBL Text, its Holder shall:

(a) Create a title registry instruction in the form of an amendment request;
(b) Sign and send a message containing that Instruction to the Title Registry via the message handling unit.

Operational Rule 27: Granting or Denying Request

The Originator of an electronic bill of lading in receipt of an amendment request forwarded by the message handling unit shall either:

(a) Grant the amendment request, or
(b) Deny the amendment request.

The remainder of this section comments on that Operational Rule.

Any Holder can request amendment of an electronic bill of lading.

The bill must be active and not pledged when the amendment is requested.

Figures 25, 26:
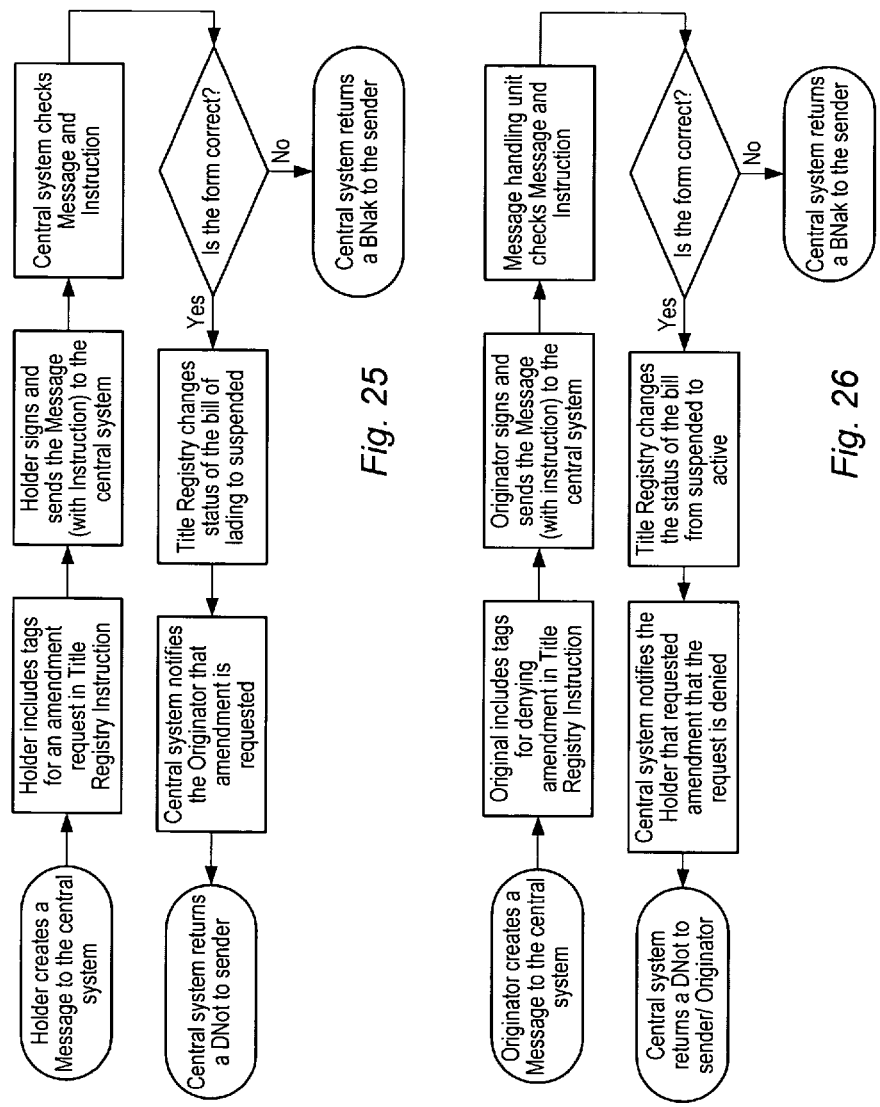
FIG. 25 is a flow diagram showing the process of requesting amendment of an electronic bill of lading.
FIG. 26 is a flow diagram showing the process of denying amendment of an electronic bill of lading.

FIG. 25 is a flow chart illustrating the process of requesting amendment of an electronic bill of lading. The steps of this process are as follows:

(1) The appropriate user creates a message to the message handling unit using a user system;
(2) The user includes an amendment request in the Instruction element of the message type header. The tagged data includes the document ID of the electronic bill of lading to be affected;
(3) The user then digitally signs and sends that message to the present system;
(4) As for any message, the message handling unit checks its authenticity by verifying the sender's digital signature and also checks the form of the message. If the message handling unit cannot properly verify the digital signature or finds the form incorrect, it returns a BNak;
(5) If the message handling unit and title registry verify the sender's digital signature and find the message valid, the title registry flags the electronic bill of lading as having an amendment pending, and changes its status to suspended. It also enters a request identifier to track which request effected that suspended state and subsequent operations relating to the requested amendment;
(6) The amendment request is forwarded to the Originator. To do this, the title registry sends to the Originator of the electronic bill of lading, via the message handling unit, a report that a request for an amendment has been received from the sender of the message; and
(7) The title registry then confirms the processing of the amendment request by returning to the sender, via the message handling unit, a DNot message having a type header in the form of a BAck. That type header includes a report from the title registry of the actions it has taken.

Requesting an amendment gives the electronic bill of lading the suspended status beginning when the title registry is updated. There is no time limit fixed for termination of that status, other than by a grant or denial of the amendment request.

The title registry record reflecting the request for amendment remains in the title registry and available to permitted users for the time specified in the applicable retention schedule. The title registry instruction requesting the amendment is also recorded in the chronological log of message flow, and that log is retained for as specified in the applicable retention schedule.

4.4.5.2. Denying an Amendment Request

The Originator, to which an amendment request is ultimately directed, can deny the request as described in this subsection.

Operational Rule 28: Denying an Amendment Request

To deny a request to amend the eBL Text of an electronic bill of lading, its Originator shall:

(a) Complete a title registry instruction in the form prescribed form to deny the request; and
(b) Sign and send a message, including that Instruction, to the Title Registry via the message handling unit.

The remainder of this section comments on that Operational. Rule.

Only the Originator of an electronic bill of lading can deny another user's request to amend the bill.

The bill must have suspended status for the Originator to deny the requested amendment.

The title registry does not inquire into whether an Originator has a legal right to deny amendment or whether any user has satisfied any conditions agreed upon with the Originator for obtaining an amendment.

FIG. 26 illustrates the deny amendment process, which proceeds as follows:

(1) The Originator creates a message to the message handling unit using a user system;

(2) The Originator expresses its intent to deny the amendment request by including a tag indicating denial of an amendment request in a form prescribed by the service provider. The tagged data includes the document ID of the bill to be affected and the request identifier of the amendment request denied;

(3) The Originator then digitally signs and sends that message to the message handling unit;

(4) As for any message, the message handling unit checks its authenticity by verifying the sender's (Originator's) digital signature and also checks the form of the message. If the message handling unit cannot properly verify the digital signature or finds the form incorrect, it returns a BNak;

(5) If the message handling unit and title registry properly verify the sender's digital signature and find the message valid, the title registry resets the flag on the electronic bill of lading to indicate that an amendment is not in process any longer;

(6) The amendment request is then forwarded to the Originator. The title registry then sends to the Originator of the electronic bill of lading, via the message handling unit, a report that a request for an amendment has been received from the sender of the message; and (7) The title registry then confirms the processing of the amendment denial by returning to the Originator a DNot message including a type header in the form of a BAck. That type header includes a report from the title registry of the actions it has taken.

Denying a request for an amendment discontinues the suspended status and returns the electronic bill of lading to active status beginning when the title registry is updated.

The title registry record containing the designation of the Holder remains in the title registry and available to permitted users for the time specified in the applicable retention schedule. The title registry instruction denying the amendment is also recorded in the chronological log of message flow, and that log is retained for as specified in the applicable retention schedule.

4.4.5.3. Granting an Amendment Request

An Originator, to which an amendment request is forwarded, may grant or deny the request as described in this subsection.

Operational Rule 29: Granting an Amendment Request

To grant a request to amend the eBL Text of an electronic bill of lading, its Originator shall:
(a) Complete a title registry instruction in the form prescribed by the service provider to grant the request; and
(b) Sign and send a message, including that Instruction, to the Title Registry via the message handling unit.

The remainder of this section comments on that Operational Rule.

Only the Originator of an electronic bill of lading can grant another user's request to amend the bill.

The Originator cannot initiate an amendment on its own. A request must have been made by the Shipper who is also the Holder or the Consignee of the bill to be amended, and the bill must have thereby have suspended status. The title registry does not inquire into whether an Originator has a right to have the amendment request granted, or whether any user has satisfied any conditions agreed upon with the Originator for obtaining an amendment.

Figures 27, 28:
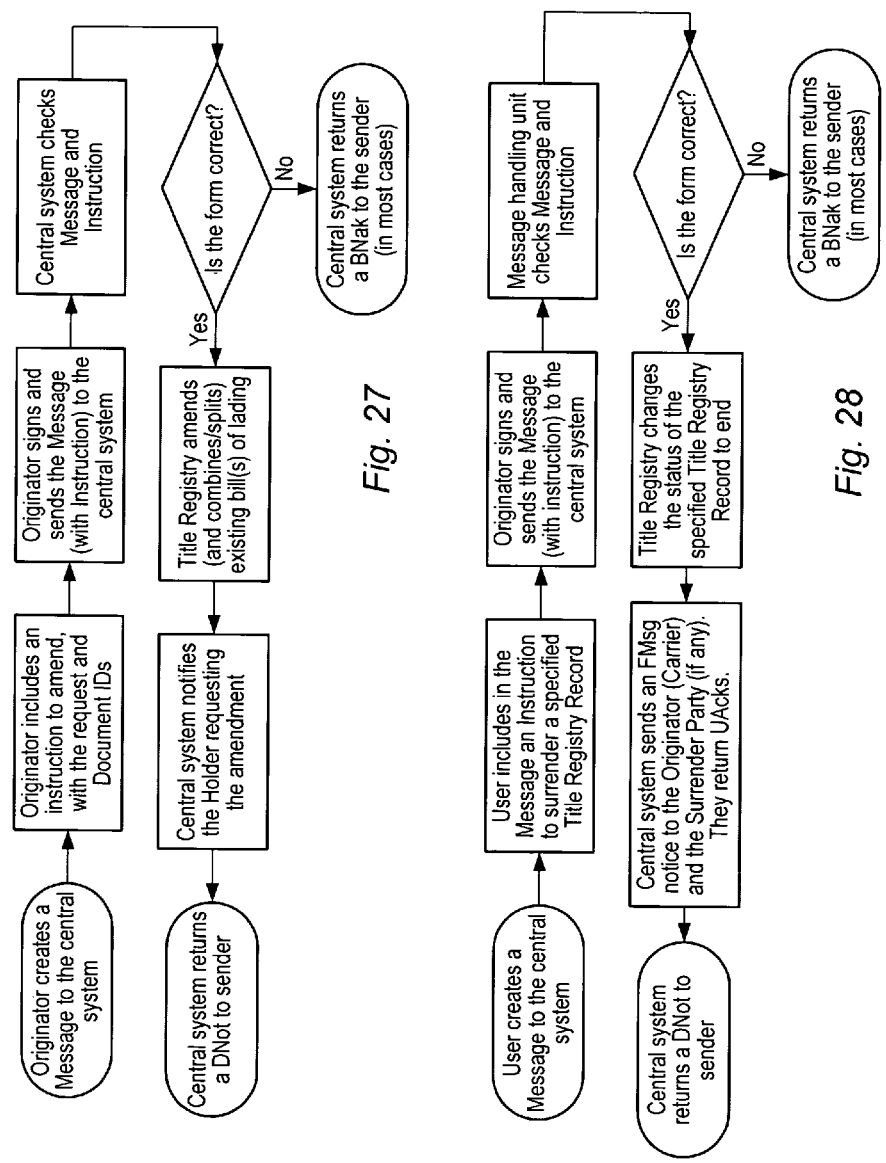
FIG. 27 is a flow diagram showing the process of granting amendment of an electronic bill of lading.
FIG. 28 is a flow diagram showing the process of surrendering an electronic bill of lading.

FIG. 27 illustrates the process for granting a request for an amendment. The following steps are involved:

(1) The Originator creates a message to the message handling unit using a user system;

(2) The Originator expresses its intent to grant the amendment request by including a tag indicating grant of an amendment request in the form prescribed by the service provider. The tagged data includes the request identifier of the amendment request granted and the document ID of the new electronic bill of lading attached. If the amendment combines multiple electronic bills of lading into one, multiple document IDs may appear in the granting Instruction. If the amendment splits a single electronic bill of lading into multiple distinct electronic bills of lading, it may have multiple Instructions, all with the same amendment request identifier, but each indicating a separate document ID referring to a separate eBL Text included in the message.

(3) The Originator then digitally signs and sends that message to the message handling unit;

(4) As for any message, the message handling unit checks its authenticity by verifying the sender's (Originator's) digital signature. The message handling unit and title registry also check the form of the message. If the digital signature cannot be verified or the form of the message is found to be incorrect, the message handling unit returns a BNak message;

(5) If the message handling unit and title registry properly verify the sender's digital signature and find the message valid, the title registry resets the flag on the electronic bill of lading to indicate that an amendment is not in process any longer; and (6) The title registry then confirms the processing of the amendment denial by returning to the Originator, via the message handling unit, a DNot message including a type header in the form of a BAck. That type header includes a report from the title registry of the actions it has taken.

Granting an amendment request discontinues the suspended status and returns the amended electronic bill(s) of lading to active status with a new eBL Text, beginning when the title registry is updated.

The pre-amendment title registry record remains in the title registry and available to permitted users for the time specified in the applicable retention schedule. The title registry instruction granting the amendment is also recorded in the chronological log of message flow, and that log is retained for as specified in the applicable retention schedule.

4.4.6. Surrendering an Electronic Bill of Lading

Surrendering an electronic bill of lading is analogous to the presentation of a paper bill of lading by its consignee or endorsee (generally the buyer or importer) to the carrier in return for the shipped goods. It does not change any of the role fields, but simply indicates that the bill is terminated, as described in more detail below.

Only the following can surrender an electronic bill of lading: (1) a Consignee, if it is also the Holder; and (2) the current holder-to-order.

The bill must be active and not pledged in order to be surrendered.

FIG. 28 illustrates the process of surrendering an electronic bill of lading which is performed by the following steps:

(1) The Consignee or current Holder-to-order creates a message to the message handling unit using a user system;

(2) The Consignee or Holder-to-order includes an Instruction in the form prescribed by the service provider. The information includes the document ID of the bill to be surrendered;

(3) The Consignee or Holder-to-order then digitally signs and sends the message to the message handling unit;

(4) As for any message, the message handling unit checks its authenticity by verifying the sender's digital signature. The message handling unit and/or title registry also check the form of the message. If the message handling unit or title registry system cannot properly verify the digital signature or find the form incorrect, the message handling unit returns a BNak;

(5) If the message handling unit and title registry properly verify the sender's digital signature and find the message valid, the title registry flags the electronic bill of lading as surrendered; and (6) The title registry then confirms the surrender by returning to the sender a type header in the form of a BAck. That type header includes a report from the title registry of the actions it has taken.

The title registry sends via the message handling unit a FMsg message to the Originator and Surrender Party (if any), notifying them that the electronic bill of lading has been surrendered and informing them who the current Consignee or Holder-to-order is.

Surrender makes the electronic bill of lading terminated beginning when the title registry is updated.

The title registry record (including all prior transactions) of the terminated electronic bill of lading remains in the title registry and available to permitted users for the time specified in the applicable retention schedule. The title registry instruction effecting the surrender is also recorded in the chronological log of message flow, and that log is retained for as specified in the applicable retention schedule.

4.4.7. Switch-to-Paper Directives

To convert an electronic bill of lading from paper to electronic form, a user directs the Originator of the bill to print out the bill-of-lading document, sign the printed version, and pass it on to the next appropriate party, as set out in Rulebook §3.7. As a technological process, it is a message ultimately directed to the Originator and passing en route through the title registry so that it can flag the electronic bill of lading as terminated, as described below.

Operational Rule 30: Switch to Paper Directives for Unpledged Bills

To direct the Originator of an electronic bill of lading which is not pledged to switch it to paper as required in Rulebook §3.7(2), its Shipper Holder, Holder-to-order, Bearer Holder, or Consignee Holder shall:
(a) Complete a title registry instruction in the form prescribed by the service provider to direct the Originator to switch to paper; and
(b) Sign and send a message, including that Instruction, to the Title Registry via the message handling unit.

Operational Rule 31: Switch to Paper Directives for Pledged Bills

To direct the Originator of an electronic bill of lading which is pledged to switch it to paper as required in Rulebook §3.7(2), its Pledgee Holder shall:
(a) Complete a title registry instruction in the form prescribed by the service provider to grant the request; and
(b) Sign and send a message, including that Instruction, to the Title Registry via the message handling unit.

The remainder of this section comments on that Operational Rule.

The current Bearer Holder, Holder-to-order, or the Consignee Holder of an electronic bill of lading can switch it to paper, if it is not pledged. If it is pledged, only its Pledgee Holder can switch it to paper. In exceptional circumstances, the system service provider can also issue a switch-to-paper directive, but only if a critical user has been inactivated. If the service provider did not then intervene, the electronic bill of lading would be permanently "stuck" in the title registry. A critical user is one which is: (1) the Shipper, if also the Holder; (2) the Consignee, if the Consignee is also the Holder; (3) the current Holder-to-order, unless the bill is pledged; (4) the current Bearer Holder, unless the bill is pledged; or (5) the current Pledgee Holder. When the system service provider inactivates a user, it checks through the title registry to determine whether the user occupies one of the above roles and if so, initiates a switch-to-paper directive.

The electronic bill of lading must not already be terminated when a switch-to-paper directive is given.

Figure 29:
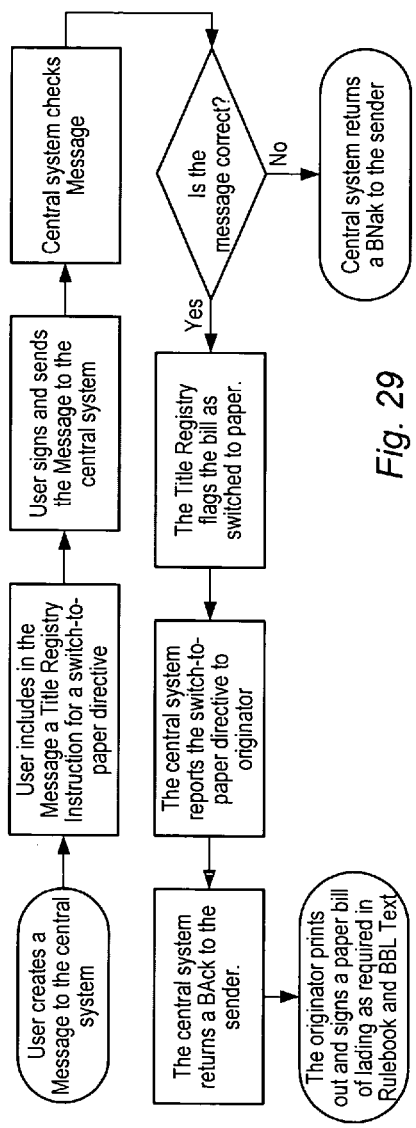
FIG. 29 is a flow diagram showing the process of processing a switch-to-paper directive.

As FIG. 29 illustrates, a switch-to-paper instruction is implemented as follows:

(1) The appropriate user creates a message to the message handling unit using a user system;

(2) An instruction is included indicating switch to paper. The Consignee or Holder-to-order includes an instruction in the form prescribed by the service provider. The information includes the document ID of the bill to be switched to paper;

(3) The user then digitally signs and sends that message to the message handling unit;

(4) As for any message, the message handling unit checks its authenticity by verifying the sender's digital signature. The message handling unit and/or title registry also check the form of the message. If the message handling unit and title registry cannot properly verify the digital signature or find the form incorrect, a BNak is returned from the message handling unit;

(5) If the message handling unit and title registry properly verify the sender's digital signature and find the message valid, the title registry flags the electronic bill of lading as being switched to paper;

(6) The switch-to-paper directive is forwarded to the Originator by the title registry sending to the Originator of the electronic bill of lading, via the message handling unit, a report that a directive for a switch to paper has been received from the sender of the message. The title registry does not interrogate the Originator to determine if the Originator has performed this directive. Regarding the directing user's right to compel performance of the directive, see the Rulebook;

(7) The title registry then confirms the processing of the switch-to-paper directive by returning to the sender via the message handling unit a type header in the form of a BAck. That type header includes a report from the title registry of the actions it has taken.

Switching to paper makes the electronic bill of lading terminated when the title registry is updated.

The title registry record (including all prior transactions) of the terminated electronic bill of lading remains in the title registry and available to permitted users for the time specified in the applicable retention schedule. The title registry instruction effecting the switch to paper is also recorded in the chronological log of message flow, and that log is retained for as specified in the applicable retention schedule.

4.5. Endorsement Chains

The Title Registry maintains an endorsement chain for each BBL. The endorsement chain reflects the parties to the contract of carriage. The service provider manages the creation and delivery of endorsement chains reflecting the contractual state and transfer of the BBL, respectively.

4.5.1. Creation of Endorsement Chains

The Title Registry creates a record in the endorsement chain whenever a new party to the contract of carriage is named. This occurs when a party becomes both a Holder and To Order party or Consignee, as a result of one of a number of instructions. These instructions are: Name Holder; Name Holder and Name To Order party or Consignee; Name To Order or Consignee when the Bearer Holder names himself the To Order party or Consignee; Enforce Pledge if there is a To Order party named on the BBL; and Grant Amendment in some circumstances. Grant amendment creates a record in the endorsement chain when there is an eBL with a new version number and (i) the Holder who is also the To Order party becomes the Consignee and (ii) the Holder who is also the Consignee becomes the To Order party. Grant amendment also creates a record in the endorsement chain when there is an eBL with a new eBL identifier. In this case, the record is created for each eBL amended when the Holder is also the To Order party or Consignee.

If a valid business refusal is generated, the Title Registry removes the party issuing the business refusal from the endorsement chain.

Figure 30:
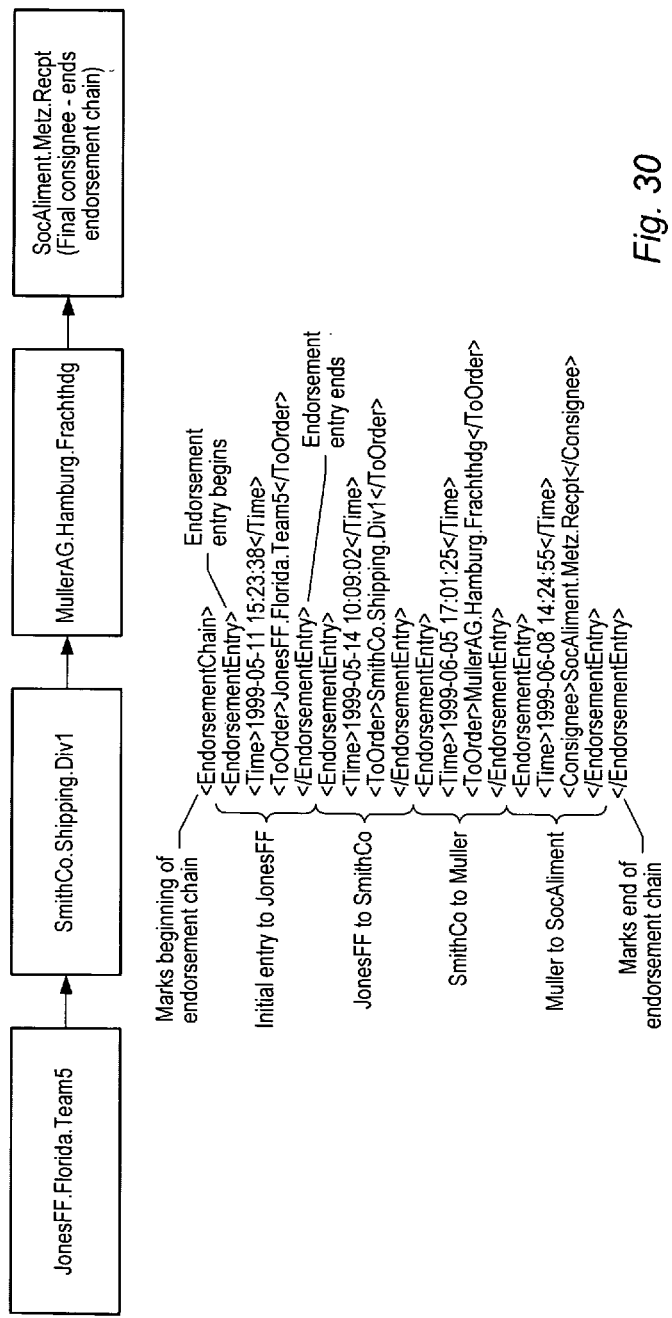
FIG. 30 shows an example of an endorsement chain.

FIG. 30 shows an example of the syntax of an endorsement chain. The definitive rules regarding when an endorsement chain is created are described with reference to FIGS. 31 to 37.

4.5.2. Delivery of Endorsement Chains

The Title Registry will deliver endorsement chain information when a number of functions are completed, namely: Name Holder; Name Pledgee Holder; Enforce Pledge; Request Amendment; Grant Amendment; Switch to Paper; and Surrender BBL.

The Title Registry will not deliver the endorsement chain if the record is empty. The definitive rules regarding when an endorsement chain is delivered are described with reference to FIGS. 31 to 37.

4.6. Looking Up Title Registry Information

A WorldWide Web site restricted to users only enables users interested in an electronic bill of lading to find out its current status and other information about it. In general, the information about an electronic bill of lading is confidential according to the service provider's contract with the user supplying the information. However, in accordance with that contract, certain information may be disclosed to certain persons at certain times. The Web site uses certificates and Transport Layer Security (formerly Secure Sockets Layer) to assure that only properly identified user representatives have access to title registry information. Further, a user representative can obtain access only if she has information monitoring privileges according to the user database.

Besides the interactive Web site, users can obtain information by telephone inquiries to the service provider help desk. The access limitations applicable to the Web site apply to the staff supplying information at the help desk.

The information that a given user can obtain varies depending on the type of information and the role of the requesting user. For messages, a user can obtain copies of messages it has sent or received (although most user systems keep copies so a need to resort to the central message handling unit to obtain a copy will likely be rare). For information in title registry (either current or archival, a user can obtain information of which the user is (or was) entitled to be notified, or which the user had previously provided. Again, a user system ordinarily keeps notices sent from the present system as well as copies of information sent in, so retrieval of the information from the present system will rarely be necessary.

The notices sent when a Consignee, Holder-to-order, or Bearer Holder is designated include the advice regarding the transfer of rights noted in the preceding sections, as well as a report of the endorsement chain leading to the newly designated user, as the next section describes.

4.6.1. Endorsement Chain Reports

The title registry reports information about the to-order endorsement chain, the sequence of transfers of an electronic bill of lading by to-order parties, to users having certain roles in a particular electronic bill of lading, as described below.

In making transfer information available, the present system is designed to strike a general balance between the privacy interests of system users and their need to know information that affects their rights and obligations. The technical operations implement that general balance, which may be acceptable for most users but perhaps not all. The present system does not prevent promises between users supplementing the Rulebook and imposing greater restrictions on the availability of information. Thus, the technical ability to obtain transfer information is independent of the right to obtain it; so even where the present system gives a user the option to obtain transfer information, promises between users to maintain privacy may restrict a user's legal right to exercise that option.

As part of that general balance, only information about to-order transfers and pledges. The available information about pledges includes information about transfers by one Pledgee to another can be obtained. Information about transfers by Holders and other roles, including Bearer Holders, is not available, except that the endorsement chain will indicate when an electronic bill of lading becomes Blank Endorsed (if that occurs) and when (if ever) it is again transferred to a To Order Party. The confidentiality of Bearer Holder transfers is, of course, subject to governmental search of the system service provider, to the extent that such information is retained in the present system.

Further, because designation of a Consignee makes the electronic bill of lading non-transferable, it terminates the endorsement chain. Information about transfers after designation of a Consignee is therefore not available, and indeed, is non-existent. Information is also available only for periods during which the bill was active. Any transfers occurring outside the present system (such as after an electronic bill of lading is switched to paper or before an initial To Order Party is designated) are unknown to the title registry. The scope of the information includes transfers both before and after amendment of the bill (if any).

Users who have the ability to obtain the available transfer information, and further limits on their ability to obtain it, are the following:

The endorsement information available to a To Order Party is as follows. For each to-order transfer or pledge that precedes the requesting To Order Party, the To Order Party can obtain the user identifier of the transferee or Pledgee and date and time of the transfer or pledge.

The endorsement information available to a Current Bearer Holder is as follows. For each to-order transfer or pledge that precedes the requesting Bearer Holder, the current Bearer Holder can obtain the user identifier of the transferee or Pledgee and date and time of the transfer or pledge.

The endorsement information available to a Consignee of a previously transferable bill is as follows. For each transfer or pledge, the Consignee can obtain the user identifier of the transferee or Pledgee and date and time of the transfer or pledge.

The endorsement information available to a Originator of a terminated bill is as follows. For each transfer or pledge, the Originator of a surrendered or switched-to-paper bill can obtain the user identifier of the transferee or Pledgee and date and time of the transfer or pledge.

The endorsement information available to a Surrender Party of a terminated bill is as follows. For each transfer or pledge, the Surrender Party of a surrendered or switched-to-paper bill can obtain the user identifier of the transferee or Pledgee and date and time of the transfer or pledge.

Moreover, transfer information is available only if the electronic bill of lading has become transferable at some time in its history, and only if the bill's status is not in error at the time the transfer is to occur.

Endorsement chains are sent to the designated user whenever a Consignee, Holder-to-order, or Bearer Holder is designated.

4.6.2. Incorporated Documents

Many documents sent through and used in the present system refer to other documents. Many documents incorporate others by reference and that incorporation permits documents to be more concise. The Rulebook deals with issues that arise in some legal systems concerning documents incorporated by reference in certain situations. User systems may automate the process of looking up the referenced document through the hyperlink mechanism common in the WorldWide Web. In XML documents and user systems supporting external entities, an entity reference can also automate the process of incorporating a document.

However, difficulties arise if the incorporated document is not available and clearly referenced. To preclude those difficulties, the present system permits users to post commonly referenced documents online in the online user support resources. It is then available to system users through the HyperText Transport Protocol (HTTP), the communication protocol commonly used in the WorldWide Web. When the document is posted, the system service provider assigns it a uniform resource locator (URL) by agreement with the posting user, and makes the document available accordingly. The URL is unique for all documents online in the user support resources. In the current system, the service provider posts documents pursuant to an e-mail request to the user support resources.

Unless the posting user and the system service provider agree otherwise, the posted document is available to and visible by all system users via HTTP, unless arrangements are made to limit access to it using the Secure Sockets Layer (SSL, also known as Transport Layer Security (TLS)) and specified classes of public-key certificates.

Operational Rule 32: Publication of User Documents in User Support Resources

A user may post a document for reference to the user support resources by further agreement with the system service provider.

4.7. Title Registry Functions

Further aspects of the title registry functions are now described.

4.7.1. Simultaneous Functions

In most cases, the Title Registry accepts only a single instruction at one time. The exception is with the Name (Pledgee) Holder instruction in which an additional instruction can be issued simultaneously.

A Name Holder instruction can be accepted simultaneously with any one of a Name To Order, Name Consignee or Blank Endorse instruction.

A Name Pledgee Holder instruction can be accepted simultaneously with a Name To Order or Blank Endorse instruction.

The simultaneous functions described above can be issued in the same message. No other simultaneous functions are available. The simultaneous functions will be available only if the sender has the right to perform each of the functions separately.

4.7.2. Multiple eBLs

In most cases, the Title Registry accepts only a single eBL at one time. The exception is with the Request or Grant Amendment instruction. In a Request Amendment, the sender may request the carrier to amend the BBL by way of a split or combine. In a split, the sender requests the creation of multiple BBLs from a single BBL. In a combine, the sender requests the creation of a single BBL from multiple BBLs.

For a split Request Amendment, the requesting user sends a single eBL to the Title Registry, and the Originator will respond with a Grant Amendment issuing multiple eBLs. For a combine Request Amendment, the requesting user sends multiple eBLs to the Title Registry, and the Originator will respond with a Grant Amendment issuing a single eBL.

In no other cases can multiple eBLs be issued to the Title Registry at one time.

4.7.3. Types of BBLs

The Title Registry caters for transferable (negotiable) and non-transferable (non-negotiable) BBLs. The roles determine the negotiability of the BBL. A transferable BBL is represented by a named To Order or blank-endorsed BBL. A non-transferable BBL is represented by a named Consignee BBL. The To Order and Consignee roles cannot co-exist on a single BBL.

The Title Registry also provides a mandatory transferable/non-transferable field in the Title Registry sub-envelope. If a To Order party is named or the BBL is blank endorsed when the BBL is indicated as non-transferable, the Title Registry will reject the message. If a Consignee is named when the BBL is indicated as transferable, the Title Registry will reject the message.

4.7.4. eBL Identifiers (Document IDs)

The Title Registry adheres to the same document ID convention and syntax used in the message handling unit. This consists of a RID, a General ID and a Version.

The RID is an alpha-numeric string of no more that 64 characters that is the registered User ID of the Originator.

The General ID is an alpha-numeric string of no more than 64 characters that is specified by the Originator and which must be unique to this user.

The Version is an alpha-numeric string of no more than 16 characters that is optionally added to identify an amended document. Two eBL identifiers that are the same apart from the version number correspond to two versions of the same eBL. The latest version corresponds to an amendment issued by the Originator as a result of a request issued by the Holder.

The combination of these attributes ensures that each eBL identifier is unique within the system.

The Title Registry does not accept draft documents, therefore the draft attribute is not permitted in a Title Registry instruction.

4.7.5. Automatic Notifications

When a Title Registry record is created or changed, the Title Registry responds to the sender and automatically notifies the party affected (the receiver or receivers). This means that when sending an instruction to the Title Registry, it is not necessary to name a receiver. If the sender would like to inform additional parties, he may do so. If the sender does name the party that the Title Registry will notify, the message handling unit will filter the result from the Title Registry to ensure that only a single message is sent to the receiver.

The cases in which notifications are produced are summarized in FIG. 33.

4.7.6. Enclosed eBL Check

It is not always necessary to enclose the eBL with a message containing a Title Registry instruction, either because there is no resulting notification or because the party affected already possesses the eBL. To maintain consistency, the Title Registry checks to ensure the eBL is enclosed when it is required. If the eBL is not enclosed when required, the Title Registry will issue a negative result and the sender will receive a BNAK.

The requirements for enclosing the eBL are summarized in FIG. 33.

4.7.7. Managing Amendments

The Title Registry provides a function for amendments through the request, grant and deny amendment instructions. The request amendment instruction is purposefully generic, providing facilities for all amendment requests. The request is issued by the current Holder and can only be acted upon by the Originator.

When the Title Registry receives a valid amendment request, it suspends all actions on the BBL until a grant or deny amendment instruction is issued by the Originator. To cater for different types of amendment requests (e.g., split, combine and switch), the Title Registry issues a request ID to the Originator when a valid request amendment instruction has been received. This provides the Originator the freedom to grant or deny the amendment as required by the business environment.

If the Originator wishes to grant an amendment request to combine BBLs, he responds with the request ID provided by the Title Registry and the new BBL, regardless of the number of BBLs sent by the Holder. The Title Registry uses the request ID to replace all previous BBLs with the new BBL. Likewise, if the Originator wishes to grant an amendment request to split BBLs, he responds with the request ID provided by the Title Registry and the new BBLs. The Title Registry uses the request ID to replace the previous BBL with the new BBLs.

An amended BBL must carry a new eBL identifier. When the new BBL is replacing an old BBL (1:1), the carrier can choose either to use a new eBL identifier or can use the same eBL identifier with a different version number. When the new BBL is replacing multiple old BBLs (n:1) or when multiple new BBLs are replacing an old BBL (1:n), the carrier must use a new eBL identifier.

4.7.8. Rule Book Conformance

The rights and obligations of users relative to BBLs are defined in the Rule Book. The Rule Book defines legal rights and obligations related to constructive possession and the contract of carriage.

In short, the Originator of the BBL (the carrier) holds the cargo in its physical possession as an independent party (an independent bailee in legal terms). The Originator agrees, via the Rule Book, that the right to give it instructions may pass in accordance with the terms of the Rule Book. When one of the pre-defined statuses of a BBL arises, the Title Registry, on behalf of the Originator, issues a notice to the user who has that particular status. This notice is an attornment notice and confers constructive possession. Constructive possession is initially with the Shipper and passes to another party in the following circumstances: (1) when a Bearer Holder is named; (2) when the named Holder is also the To Order party or Consignee; and (3) whenever a Pledgee Holder is named.

The contract of carriage is initially between the Originator and the Shipper. A user becomes a party to the contract of carriage when it is both the Holder and either the To Order party or Consignee. This can occur in the following instances: (1) The (Pledgee) Bearer Holder names another user the Holder and either the To Order party or the Consignee.
(2) The (Pledgee) Holder of a BBL with a different named To Order party names that To Order party the Holder.
(3) The Holder of a BBL with a different named Consignee names that Consignee the Holder.
(4) The Holder and To Order party of a BBL names another user the Holder and either the To Order party or the Consignee.
(5) The Bearer Holder names itself the To Order party or the Consignee.
(6) The Pledgee Holder of a BBL with a named To Order party enforces the pledge.

4.7.8.1. Attornment Notices

An attornment notice is generated by the Title Registry, on behalf of the Originator, when a user is designated to one of the statuses described above as conferring constructive possession. This occurs in the three cases described above with the following exceptions: (1) when a Bearer Holder names himself the To Order party or Consignee; (2) after an Enforce Pledge; and (3) after a Grant Amendment when a version number is used.

These are exceptions because the user who issues the instruction has constructive possession both before the instruction is issued and after the instruction takes effect.

The text of the attornment notice is as follows: "You have been designated as the Holder of the electronic Bill of Lading in accordance with the Rule Book. By virtue of your capacity as Holder of the electronic Bill of Lading in addition to your designation as a To Order Party, Consignee, Bearer or Pledgee, we the service provider acting on behalf of the Originator of this electronic Bill of Lading (the Carrier) confirm that the goods are now held to your order".

The definitive rules regarding when an attornment notice is delivered is contained in FIGS. 31 to 37.

4.7.8.2. Business Refusals

When a user is designated as a party to the contract of carriage, he has the opportunity to reject it's designation as a contracting party by issuing a "business refusal". By issuing a valid business refusal, a user designated to a status conferring contractual nexus to the Originator (carrier) rejects his nomination as a contracting party. As a consequence, the parties to the carriage contract remain as they were immediately prior to the rejected designation. A business refusal cannot be issued when a user becomes party to the contract of carriage when: (1) a Bearer Holder names himself a To Order party or Consignee; (2) a user enforces a Pledge; and (3) there is a Grant Amendment in response to a Request Amendment by the user. The business refusal cannot be issued in these cases because the user has clearly given his consent to be named a party to the contract of carriage. The business refusal message must be sent within 24 hours and the party cannot issue any other Title Registry instruction before issuing the business refusal. If a party attempts to send a business refusal after 24 hours or after issuing another instruction related to the same BBL, the Title Registry will reject the message and issue a negative acknowledgment (BNAK).

When the Title Registry receives a valid business refusal, it will unwind the BBL to its previous state (i.e., the state that existed before the user was designated) and will notify the former party of the refusal. The Title Registry will also remove the party issuing the business refusal from the endorsement chain (see below).

The definitive rules regarding when a business refusal can be issued is contained in FIGS. 31 to 37.

4.8. Title Registry Results

At the completion of processing, the Title Registry issues a result to the sender and receiver(s). The result is automatically generated to the receiver(s) as described above. If the result is negative, the result to the sender is an error code and description. If the result is positive, the result to the sender is a list of the notified user IDs and the complete receiver result information. A list of the error codes appears in FIG. 41.

If the sender result is positive, the receiver result includes the following information:
(1) the instruction that caused a change in the Title Registry record.
(2) an eBL identifier, i.e. the document ID of the eBL.
(3) Status information notifying the current state of the BBL, i.e. active, suspended or end state. If active, the BBL record exists and can be acted upon by authorized parties. If suspended, the BBL record exists but is pending an amendment so that no action can take place until the Originator returns a grant or deny amendment instruction. If in the end state, the BBL record exists only in the Title Registry log and is no longer active. The End status will have been entered as a result of a Switch to Paper or Surrender instruction.

(4) The current parties of the BBL.

(5) Endorsement chain information in the form of the parties to the contract of carriage (i.e., the current and past Holder/To Order parties and Holder/Consignees) together with the date and time of each endorsement.

(6) An attornment notice which is free text provided when as a result of the instruction there is: a Holder of a blank endorsed BBL; a Holder who is also the To Order party or the Consignee; or a Pledgee Holder.

(7) A Request ID, i.e. the identifier generated by the Title Registry when a Request Amendment instruction has been issued.

Sender results are delivered by the message handling unit in either a BNAK or BAck as required. Receiver results are delivered by the message handling unit in the FMsg.

4.9. Terms and Conditions

The service provider provides a facility for carriers to store bill of lading terms and conditions on the secure, interactive facility. All registered users have access to this information, negating the need to send the terms and conditions with each bill of lading.

The process for storing terms and conditions is as follows:

(1) The carrier sends a digitally signed message (SMsg) to the helpdesk. The SMSG includes the attached terms and conditions and the date from which the terms are applicable.

(2) The helpdesk supervisor loads the terms and conditions onto the system's interactive facility.

(3) The helpdesk supervisor sends a digitally signed message (SMSG) to the carrier confirming that the terms and conditions have been lodged.

(4) The carrier reviews the terms and conditions on the interactive site prior to the date of activation.

(5) The carrier sends a digitally signed message (SMSG) to the helpdesk to confirm acceptance of the terms and conditions that have been lodged prior to the applicable date.

(6) If a confirmation message is not received by the helpdesk, the applicable date will be extended until a confirmation message is received.

4.10. Title Registry Instructions

In FIG. 33, the following information is tabulated for each instruction:

1. Who issues—the party authorized to issue the instruction. All other parties will be rejected by the Title Registry.
2. Mandatory information—the information required by the Title Registry to execute the function. The Title Registry will reject the message if mandatory information is incomplete.
3. Optional information—additional information that the authorized party can send with the instruction.
4. Need to enclose eBL—because the Title Registry does not use the eBL document, the eBL only needs to be attached if the receiver requires it.
5. Business refusal—a business refusal can be issued when a party becomes both the Holder and the To Order party or Consignee.
6. Who is notified—the Title Registry will automatically notify the affected party. If the sender names the affected party as a receiver, the message handling unit will filter the Title Registry notification.
7. Attornment notice—the Title Registry generates a notice of attornment when as a result of an instruction there is a Holder of a blank endorsed BBL; the Holder is also the To Order party or the Consignee; or there is a Pledgee Holder.
8. Endorsement chain record—the Title Registry creates an entry in the endorsement chain when as a result of an instruction the Holder is also the To Order party or the Consignee.
9. Endorsement chain returned—the Title Registry will issue the endorsement chain when the BBL is transferred between parties after creation.

Each of the title registry instructions are now further discussed.

4.10.1 Create

The purpose of a Create instruction is to allow the creation of a record in the Title Registry for a new BBL.

There is an attornment notice only if the BBL is created with a Bearer Holder.

It is not possible to create a BBL in an end state (in which the Holder is also the To Order party or the Consignee) or to create a BBL with a Pledgee Holder.

4.10.2. Name Holder

The purpose of a Name Holder instructions is to transfer holdership in an existing BBL record.

An attornment notice is made if as a result of the instruction there is a new Bearer Holder or a new Holder who is also the To Order party or the Consignee. An endorsement chain record is made if as a result of the instruction there is a new Holder who is also the To Order party or the Consignee.

4.10.3. Name Pledgee Holder

The purpose of a Pledgee Holder instruction is to name a Pledgee Holder or to transfer a pledge holdership in an existing BBL record.

4.10.4. Name To Order

The purpose of a Name To Order instruction is to name a To Order party in an existing BBL record.

An endorsement chain record is made if as a result of the instruction the Holder is also the To Order party. An endorsement chain is returned only when a Bearer Holder names himself the To Order party and then returned only in the Sender result.

4.10.5. Name Consignee

The purpose of a Name Consignee instruction is to name a Consignee in an existing BBL record. When a Consignee is named, the BBL becomes non-transferable.

An endorsement chain record is made if as a result of the instruction the Holder is also the Consignee. An endorsement chain is returned only when a Bearer Holder or the Holder who is also the To Order party names himself the Consignee and then returned only in the Sender result.

4.10.6. Blank Endorse

The purpose of a Blank Endorse instruction is to blank endorses a transferable BBL that has a named To Order party.

4.10.7. Enforce Pledge

The purpose of an Enforce Pledge instruction is to make the Pledgee Holder the Holder and To Order party (if one is named) of a transferable BBL, in an existing BBL record.

An endorsement chain record is made if as a result of the instruction the Holder is also the To Order party. An endorsement chain is returned only in the Sender result.

4.10.8. Request Amendment

The purpose of a Request Amendment instruction is to request the Originator to amend the BBL that is related to an existing BBL record.

An endorsement chain is returned for each of the eBLs to be amended.

Amendments can be requested to "split" a BBL (creating 2 or more BBLs from 1 original) and to "combine" a BBL (creating 1 BBL from 2 or more originals), meaning that multiple BBLs can be sent to the Title Registry for this instruction.

4.10.9. Grant Amendment

The purpose of a Grant Amendment instruction is to grant the amendment by updating or creating BBL record(s) in the Title Registry.

Regarding attornment notices, for an eBL with a new version number, an attornment notice is sent if the amendment removes a To Order party or Consignee who was not the Holder. For an eBL with a new eBL identifier, an attornment notice is sent for each eBL amended except when the Holder is not the To Order party or Consignee.

Regarding endorsement chain records, for an eBL with a new version number, no endorsement chain record is made. For an eBL with a new eBL identifier, an endorsement chain record is made for each eBL amended when the Holder is also the To Order party or Consignee.

Regarding return of endorsement chains, this is performed for an eBL with a new version number. For an eBL with a new eBL identifier, the endorsement chain is returned for each eBL amended when the Holder is also the To Order party or Consignee.

Amendments can be granted to "split" a BBL (creating 2 or more BBLs from 1 original) and to "combine" a BBL (creating 1 BBL from 2 or more originals), meaning that multiple BBLs can be sent to the Title Registry for this instruction.

A BBL cannot be amended or created through the grant amendment instruction to an end state (where the Holder is also the To Order party or the Consignee) unless the request was made from an end state.

The Originator and the Holder or Pledgee Holder cannot change from the Request Amendment. The Title Registry will generate an error (BNAK) if the Originator and Holder or Pledgee Holder fields are provided with the Grant Amendment.

4.10.10. Deny Amendment

The purpose of a Deny Amendment instruction is to deny the amendment by returning the BBL record(s) in the Title Registry to their pre-request amendment state.

4.10.11. Switch to Paper

The purpose of a Switch to Paper instruction is to request the Originator to create an original paper bill of lading from an original BBL.

After a Switch to Paper instruction, the BBL record is no longer active in the Title Registry.

4.10.12. Surrender

The purpose of a Surrender instruction is to return the BBL to the Originator (to fulfill the obligations in the contract of carriage).

After a Surrender instruction, the BBL record is now no longer active in the Title Registry.

4.11 Title Registry Instruction PDUs

Title Registry instructions are included in SMSG sent to the message handling unit. The TR DTD uses the same basic elements as the message handling unit DTD. The definitions of general elements, such as RID and GeneralID, are exactly the same as for the message handling unit and contain the same limitations on the data types. Elements such as DocumentID and FreeText also conform to the standards specified for the message handling unit, but are re-produced below for information the first time they appear in the text.

4.11.1 SMSG

The SMSG is used to send messages to the message handling unit for forwarding to a value-added application and/or a receiver. The Title Registry instruction is included in the SMSG. The form is as follows:

```
<!ELEMENT SMSG (
    SntEnvelopeID,
    Sender,
    Receiver*,
    DeliveryAttr ?,
    Urgent ?,
    Reference*,
    ApplicationAttr ?,
    Document*,
    FreeText ?)>
```

For the Title Registry, the ApplicationAttr is as follows:

```
<!ELEMENT ApplicationAttr TRA>
<!ELEMENT TRA ANY>
```

4.11.2. 'Name' Instruction

The 'Name' instruction is a generic naming instruction for all functions naming a party to the contract (including the 'BlankEndorse' function). This allows two parties to be named in the two simultaneous naming functions executed as part of the same message. The form is as follows:

```
<!ELEMENT Instruction (
    CreateBBL|
    Name|
    EnforcePledge|
    RequestAmendment|
    GrantAmendment|
    DenyAmendment|
    SwitchToPaper|
    Surrender)>
```

4.11.3. CreateBBL

The CreateBBL instruction has the following form:

```
<!ELEMENT CreateBBL (
    DocumentID,
    BBLType,
    Originator,
    SurrenderParty?,
    Shipper,
    Holder,
    (BlankEndorse|ToOrder|Consignee))>
<!ELEMENT DocumentID (RID, GeneralID, Version?)>
<!ELEMENT BBLType EMPTY>
<!ATTLIST BBLType Type
(Transferable|NonTransferable|ILLEGAL) "ILLEGAL">
<!ELEMENT Originator (RID)>
<!ELEMENT SurrenderParty (RID)>
<!ELEMENT Shipper (RID)>
<!ELEMENT Holder (RID)>
<!ELEMENT BlankEndorse EMPTY>
<!ELEMENT ToOrder (RID)>
<!ELEMENT Consignee (RID)>
```

The mandatory field 'BBLType' is used to ensure the consistency of the BBL. If the BBLType is 'Transferable', the BBL can be BlankEndorse or a ToOrder party can be named. If the BBLType is NonTransferable % a Consignee party must be named.

4.11.4. Name

The naming function has the following form:

```
<!ELEMENT Name (
    Document ID,
    BBLType?,
    (Holder, (ToOrder|Consignee|BlankEndorse)?)|
    (PledgeeHolder, (ToOrder|BlankEndorse)?)|
    (ToOrder|Consignee|BlankEndorse)
<!ELEMENT PledgeeHolder (RID)>
```

The naming function is a generic function that is used to name all the roles on the BBL. The naming sub-functions are specified as parameters for the generic Name function.

The BBL must have one and only one of ToOrder, Consignee or BlankEndorse.

It is possible to specify a new holder and one more role in one message. This is called a simultaneous function.

The BBLType is mandatory when ToOrder, BlankEndorse or Consignee is named.

When a Consignee is named, the BBLType must be 'Non-Transferable'. When a ToOrder party is Named or the BBL is BlankEndorse, the BBLType must be 'Transferable'.

It is only possible to name a PledgeeHolder for BBLs that are either BlankEndorse or for which a ToOrder party is named.

4.11.5. EnforcePledge

The enforce pledge instruction has the following form:
<!ELEMENT EnforcePledge (DocumentID)>

A PledgeeHolder can enforce a pledge. This implies that the PledgeeHolder enters the role as Holder and ToOrder. The latter only if a ToOrder party was named before the pledge was enforced.

4.11.6 RequestAmendment

The request amendment instruction has the following form:
<!ELEMENT RequestAmendment (DocumentID+, FreeText)>
<!ELEMENT FreeText (#PCDATA)>
<!ATTLIST FreeText xml:space (default|preserve) "preserve">

The sender requests the Originator to amend the BBL. The amendment can either be a new version of the same document or one or more new documents can be created. In the latter case the old document is no longer active in the Title Registry.

The sender can ask for one of the following three amendments: (1) One document to be replaced by a new one (or a new version); (2) several documents to be replaced by one new document (a merge), where all documents in the Request Amendment must have the same originator; and (3) one document to be replaced by several new ones (a split).

It is possible to send information concerning the amendment to the Originator as unstructured (free) text. An identification of the request will be forwarded to the Originator as part of the notification (RequestID).

4.11.7. GrantAmendment

The grant amendment instruction has the following form:
<!ELEMENT GrantAmendment
  RequestID,
  GrantDocument+)>
<!ELEMENT RequestID (NumericID)>
<!ELEMENT GrantDocument (
  DocumentID,
  BBLType,
  SurrenderParty?,
  Shipper,
  (BlankEndorse|ToOrder|Consignee))>

The Grant Amendment is issued by the Originator when it accepts the Amendment Request and grants one or more new documents (or a new version of the old document). It is only allowed to specify more than one document in the GrantDocument instruction when the holder requested one document to be replaced by two or more new ones (a split).

The Request Amendment is identified in the first parameter (RequestID).

For each document granted, the roles and other attributes are specified in a descriptor (GrantDocument).

The Originator role and the Holder or PledgeeHolder roles are defined implicitly by the Request/Grant Amendment protocol: the sender of the request is the new Holder (and the old Holder), and the sender of the Grant Amendment is the Originator of all the old and the new documents.

4.11.8. DenyAmendment

The deny amendment instruction has the following form:
<!ELEMENT DenyAmendment (RequestID)>

The originator denies the Request Amendment. The document referenced in the Request Amendment instruction will no longer be suspended.

4.11.9. SwitchToPaper

The switch to paper instruction has the following form:
<!ELEMENT SwitchToPaper (DocumentID)>

After this function is executed, the Originator has the responsibility of generating a paper version of the BBL. The BBL is no longer active in the Title Registry (the status becomes 'Ended').

4.11.10. Surrender

The surrender instruction has the following form
<!ELEMENT Surrender (DocumentID)>

The BBL is returned to the Originator, who must now complete its requirements under the contract of carriage. The BBL is no longer active in the Title Registry (the status becomes 'Ended').

4.12 Title Registry Result PDUs

The Title Registry delivers information about the execution of a Title Registry instruction in a standard result PDU to the message handling unit. For two elements in the result (SenderFeedback and ReceiverFeedback), the Title Registry delivers specific information to the sender and to the parties to be notified.

The SenderFeedback is included in the BACK delivered to the sender by the message handling unit. The ReceiverFeedback is included in the FMSG delivered to the sender by the message handling unit. See [1] for full details on the BACK and FMSG. The specific elements in the BACK and FMSG that relate to the Title Registry are re-produced here for information.

The Title Registry also issues a standard result upon the reception of a valid SBRf (business refusal). The result is included in the FBRf delivered to the original sender by the message handling unit. The specific elements in the SBRF and FBRF that relate to the Title Registry are re-produced here for information.

4.12.1. SenderFeedback

The Title Registry delivers either positive or negative feedback to the sender of an instruction. Negative feedback results from an error condition. Positive feedback results from a validated Title Registry instruction. The feedback is delivered in the BNAK or BACK returned to the sender by the message handling unit.

4.12.1.1. Negative Feedback

The form of negative feedback is as follows:
<!ELEMENT Reason (ReasonSource, ReasonCode, ReasonDescription?)>
<!ELEMENT ReasonSource (#PCDATA)>
<!ELEMENT ReasonCode (#PCDATA)>
<!ELEMENT ReasonDescription (#PCDATA)>
<!ATTLIST ReasonDescription xml:space (default|preserve) "preserve">

The ReasonSource is used to denote the relevant value added application. For the Title Registry, the ReasonSource is always "TRA". The ReasonCode is a numeric value of the error intended to be used by client computers. The ReasonDescription is a descriptive text of the error. A list of error codes is included in FIG. 41.

The negative feedback is delivered to the sender in a BNAK by the message handling unit. The form of the BNAK is as follows:
<!ELEMENT BNAK
  SntEnvelopeID,
  Sender,
  Reason,
  Time, ApplicationResult ?,
OriginalSignature)>
For the Title Registry, the ApplicationResult is as follows:
<!ELEMENT ApplicationResult TRA>
<!ELEMENT TRA ANY>
4.12.1.2. Positive Feedback
The form of positive feedback is as follows:
<!ELEMENT SenderFeedback (NotifiedParties?, RequestID?, Instruction, BBLInfo*)>
<!ELEMENT NotifiedParties (RID)*>
<!ELEMENT RequestID (NumericID)>
<!ELEMENT BBLInfo (
　Document ID,
　FreeText?,
　BBLState,
　Originator,
　SurrenderParty?,
　Shipper,
　(Holder|PledgeeHolder),
　(ToOrder|Consignee)?
　EndorsementChain?)>
<!ELEMENT EndorsementChain (EndorsementEntry)+>
<!ELEMENT EndorsementEntry (Time, (ToOrder|Consignee))>

The NotifiedParties are the User IDs to whom the Title Registry automatically generates a reply based upon the instruction. The RequestID is a numeric identifier of a RequestAmendment. The identifier must be used in the subsequent Deny Amendment or Grant Amendment to identify the Request. The field is only present in the ReceiverFeedback generated by a RequestAmendment instruction. The Instruction is a copy of the Title Registry instruction from the SMSG. The information makes it possible to understand the context of the reply. The BBLInfo provides the current record of the BBL, including the relevant parties and the EndorsementChain. The FreeText is used for Attornment information only. It is generated when as a result of an instruction, a party has constructive possession. The BBLState contains the status of the BBL ('active', 'ended', 'suspended'). The EndorsementChain contains the entries of all contracting parties to the BBL (excluding the Shipper) and the time of endorsement.

The positive feedback is delivered to the sender in a BACK by the message handling unit. The form of the BACK is as follows:
<!ELEMENT BACK
　SntEnvelopeID,
　Sender,
　Reason,
　Time,
　ApplicationResult ?,
　OriginalSignature)>
For the Title Registry, the ApplicationResult is as follows:
<!ELEMENT ApplicationResult TRA>
<!ELEMENT TRA ANY>
4.12.2. ReceiverFeedback
The Title Registry delivers ReceiverFeedback to the message handling unit in the following form:
<!ELEMENT ReceiverFeedback (
　RequestID?,
　Instruction,
　BBLInfo*)>
The information contained is identical to the positive SenderFeedback.
4.12.2.1. ReceiverFeedback in the FMSG
The FMSG is sent to the named or notified receiver(s) upon validation (within the message handling unit and TR) of a SMSG. The Title Registry ReceiverFeedback is included in the FMSG. The form is as follows:
<!ELEMENT FMSG (
　FwdEnvelopeID
　SntEnvelopeID,
　Sender,
　Receiver,
　Urgent ?,
　OtherReceiver?,
　Time,
　ExpiryDate,
　Reference*,
　ApplicationInfo ?,
　Document*,
　FreeText ?)>
For the Title Registry, the ApplicationInfo is as follows:
<!ELEMENT ApplicationInfo TRA>
<!ELEMENT TRA ANY>
4.12.3. Business Refusals
The Title Registry employs the business refusal PDUs used by the message handling unit. A user sends a SBRF to refuse a Title Registry instruction, and the message handling unit forwards a FBRF after processing by the Title Registry to the associated user.
4.12.3.1 SBRF
The SBRF is used by the receiver of a FMSG with a Title Registry instruction to unwind a contractual state. The Title Registry will only accept a SBRF from a party that is both the Holder and To Order or Consignee, and then only when (1) the SBRF was issued within 24 hours of the related BACK; and (2) no other valid instruction was sent relating to the identified BBL.

The form of the SBRF is as follows:
<!ELEMENT SERF
　SntEnvelopeID,
　Sender,
　DeliveryAttr ?,
　Urgent ?,
　SMSGEnvelopeId,
　BusinessReason)>
<!ELEMENT BusinessReason (#PCDATA)>
<!ATTRLIST BusinessReason xml:space (default|preserve) 'preserve'>

After validation of a SBRF by the message handling unit and Title Registry, the message handling unit will issue a BACK to the sender and a FBRF to the receiver(s).
4.12.3.1. FBRF
The FBRF is created by the message handling unit upon reception of a SBRF and a valid response from the Title Registry. The FBRF is forwarded by the message handling unit to the sender of the SMSG that has been refused. The form of the FBRF is as follows:
<!ELEMENT FBRF
　FwdEnvelopeID,
　SntEnvelopeID,
　Sender,
　Receiver,
　Urgent ?,
　OtherReceiver ?,
　Time,
　ExpiryDate,
　SMSGEnvelopeId,
　BusinessReason,
　ApplicationInfo ?)>
After reception and signature validation of the FBRF, the receiver is required to return a UAck. The FBRF cannot be refused by a SBRF. If the FBRF signature is invalid and a UNAk is returned, the Title Registry will not negate the unwind performed in accordance with the SBRF.

4.13. Title Registry Functions and Parties

The table of FIG. 32 provides a summary of the functions available in the Title Registry and which party can exercise each function. To provide a complete description, we have defined all possible combinations of parties that can exist in a BBL at one time (referred to as "states" and covering the top part of the chart) and the functions available with each state (covered in the bottom part of the chart). The abbreviations used are O=Originator; SP=Surrender Party; S=Shipper; H=Holder; PH=Pledgee; TO=To Order; C=Consignee.

Referring to the superscripts in the table of FIG. 32:
1: The Surrender Party role is optional.
2: The Holder cannot name itself the Pledgee Holder.
3: The Pledgee Holder cannot name itself the To Order party if it maintains the pledge.
4: The Pledgee Holder can only name a Consignee if it also names the Holder through simultaneous instruction.
5: It is not possible to grant to an end state (H=TO or H=C) or with a Pledgee Holder unless the request was in an end state or was from a Pledgee Holder.

4.14. Title Registry Functions and Conditions

FIG. 33 provides a summary of the functions available in the Title Registry and the conditions that apply. Refer to FIG. 32 to determine the functions available to specific roles.
The abbreviations used in FIG. 33 are as follows:
ID—Document ID (eBL identifier).
T—BBL Type (transferable or non-transferable).
O—Originator.
SP—Surrender Party.
S—Shipper.
H—Holder.
PH—Pledgee Holder.
TO—To Order party.
C—Consignee.
B—Blank Endorse.
RAID—Request Amendment ID.

Referring to the superscripts in the table of FIG. 33:
1: The Issuer and Optional parties must conform to the rules defined in FIG. 32 and accompanying text.
2: If optional party is included.
3: This includes simultaneous Name Holder and Name To Order or Name Consignee instructions. The business refusal cannot be issued if the Holder does not change as a result of the instruction.
4: The Originator and the Holder or Pledgee Holder cannot be altered from the original BBL(s).
5: Returned only in the sender result
6: One for each eBL to be amended

4.15. State Management

The Title Registry actively manages the state of each BBL relative to four functional elements: (1) delivery of attornment notice; (2) allowance of business refusal; (3) creation of endorsement chain records; and (4) delivery of endorsement chain records.

FIGS. 31 to 37 provide the complete and definitive rules regarding each of these elements. These tables take precedent over any apparent contradictions with the text above.

FIGS. 31 to 37 describe movements from one state to another, and as the result of each movement, the action of the Title Registry relative to the four elements. The exception to this is in the Create chart as there is no previous state.

The abbreviations used in FIGS. 31 to 37 are as follows:
BH—Bearer Holder.
PH—Pledgee Bearer Holder.
TO—To Order party.
C—Consignee.
A—Delivery of attornment notice.
B—Allowance of business refusal.
R—Creation of endorsement chain record.
D—Delivery of endorsement chain (only applicable when an endorsement record exists).
Null—The Title Registry takes no action relative to the attornment notice, business refusal and endorsement record creation and delivery as a result of this state change.

A blank box or cell signifies that it is not possible to move from one state to the other. Unless specifically noted, the tables cover only receiver information and do not reflect sender information.

4.15.1. Create

As shown in FIG. 34, when a BBL is created, the only relevant element is the attornment notice, and then only if the BBL is created with a Bearer Holder.

4.15.2. Name Holder and Pledgee Holder

FIG. 35 relating to the Name Holder and Pledgee Holder includes Name Holder and Name Pledgee Holder instructions. FIG. 35 also makes a distinction between two cases that occur as a result of the instruction, namely cases when the Holder or Pledgee Holder does not change (signified by "0") and cases in which the Holder or Pledgee Holder is a new party (signified by "1").

4.15.3. Name To Order, Consignee and Blank Endorse

FIG. 36, the Name To Order, Consignee and Blank Endorse chart, includes Name To Order, Name Consignee and Blank Endorse instructions. FIG. 36 does not include the simultaneous instructions that are covered in a separate section. The superscript 1 in FIG. 36 indicates that the endorsement chain is delivered only with the Sender result.

4.15.4. Simultaneous Instructions

FIG. 37 is a table indicating the handling of allowed simultaneous instructions.

A first group of allowed simultaneous instructions are a combination of a Name Holder instruction with either (i) a Name To Order instruction, (ii) a Name Consignee instruction; or (iii) a Blank Endorse instruction. Another allowed combination is a Name Pledgee Holder instruction simultaneous with a Name To Order instruction.

FIG. 37 also makes a distinction between two cases that occur as a result of the instruction: first when the Holder or Pledgee Holder does not change (signified by "0"); and second when the Holder or Pledgee Holder is a new party (signified by "1").

4.15.5. Enforce Pledge

FIG. 38 indicates the handling of an Enforce Pledge instruction. When an Enforce Pledge instruction is issued, the only relevant element is the endorsement chain record which is created and delivered when the pledge is enforced on a BBL that has a named To Order party. The superscript 1 in FIG. 38 indicates that the endorsement chain is delivered only with the Sender result.

4.15.6. Grant Amendment with a new eBL version

FIG. 39 indicates the handling of a Grant Amendment instruction in the case that there is a new eBL version. The Originator can only issue a Grant Amendment with a new eBL version when it is replacing one BBL with another BBL. In this case, the endorsement chain is carried forward from the previous BBL. In this case, the only elements affected relate to an amendment that is granted to a Bearer Holder in which case an attornment notice is sent if the To Order party or Consignee is removed.

4.15.7. Grant Amendment with a New eBL Identifier

FIG. 40 indicates the handling of a Grant Amendment instruction in the case that there is a new eBL identifier. The Originator uses a new eBL identifier to replace one BBL, to combine BBLs and to split BBLs. In these cases, attornment notices are generated in all instances in which there is a Bearer Holder, a Pledgee Holder or when the Holder is also the To Order party or Consignee. In the latter cases, an endorsement chain record is created and delivered. The superscript 1 in FIG. 40 indicates that, when multiple eBLs are returned with the Grant Amendment, multiple attornment notices will be delivered, and multiple endorsement chains records will be created and delivered.

4.16. Error Messages

The result of the execution of a title registry instruction can be positive a negative. When the result is positive, the instruction has been executed successfully. If the result is negative, the instruction has not been executed, and a result message is returned to the sender. No message is forwarded to any system user in this case. Each negative error is described further with a reason source, reason code and reason description.

FIG. 41 lists and describes the errors a sender may receive as a result of validation errors or other errors in the incoming message. Internal system errors in the title registry or message handling unit are not included in the list. In all cases, the ReasonSource is TRA.

5. The Rulebook

As discussed further above, each User agrees, as a condition of becoming a User of the System, to be bound by the provisions of a set of rules which are codified in a book of rules, referred to as the Rulebook. The Rulebook, and the users' contractual agreement to it, underpins and enables the system to function as a support system for transactions in property in that it defines the legal significance of the contents of the database records and the legal effect of messages, for example. For completeness, the Rulebook is now reproduced.

1. DEFINITIONS AND INTERPRETATION 1.1. Definitions

Applicant User: A User who instructs a bank to issue a Documentary Credit.

Authority: Any central, national, state, provincial or local government; any agency of such government; or any body or person empowered to make regulations or issue directions or requirements legally enforceable against the User in relation to the: administration of any seaport, airport, road or railway; import, export or transport of goods; transfer of any cash or securities; imposition of any tax or duty; and enforcement of law.

Accept, Acceptance: In relation to a Certificate, to manifest approval of a Certificate, whether expressly or by implication such as by creating a Digital Signature Verifiable by reference to that Certificate.

Accredited User System: A User System passing the tests specified in Chapter 10 of the Operating Procedures for accreditation of User Systems.

Annual Charge The lump sum fee payable annually by a User as set out in the Charges Schedule to the Operational Service Contract.

Attachment, Attached Document: See Document.

BBL Text: A Document which: (a) is sent into the Message Handling Unit and recorded in the Title Registry as the documentary component of the Electronic Bill of Lading, and (b) acknowledges the receipt of goods by a Carrier for carriage by sea.

Bearer Holder: A User who is or becomes designated a Holder of a Blank-endorsed Electronic Bill of Lading Beneficiary User: A User who is designated under a Documentary Credit as the party to whom, or to whose order, payment is to be made or whose bills of exchange are to be accepted and paid.

Blank-endorse: To render, by the process described in the Operating Procedures, an Electronic Bill of Lading capable of transfer simply by designation of a new Holder.

Central System or System: The business processes and methods, the digital information system provided by the service provider XYZ Ltd for communicating Messages and Documents and facilitating business transactions, and the Rules governing both.

Calendar Year: A period of time beginning 1st January and ending 31st December, both dates inclusive Carrier: A User which contracts with another User to carry goods by any means of transport, regardless of whether the Carrier is the owner or operator of the means of transport used.

Certificate: A unit of information which, at a minimum: (a) lists its Issuer by name; (b) lists a Public Key; (c) lists by name or otherwise indicates a User which holds the Private Key corresponding to the listed Public Key; (d) is Digitally Signed by its Issuer, and (e) has the meaning consistent with this definition ascribed to it in an associated documentary form.

Certification Account The relationship between XYZ Ltd and a User, in which XYZ Ltd acts as Issuer of Certificates to the User, and the User acts as Subscriber of those Certificates.

Certifier: A person [authorized by XYZ Ltd] to Issue Certificates to Users. The Certifier which issued a particular Certificate is also termed its "Issuer".

Charges: Any and all sums due to XYZ Ltd under the Operational Service Contract.

Chartered Bill of Lading: An acknowledgment by a Carrier of the receipt of goods for carriage on board its ship in respect of which there is a charterparty, other than a bareboat or demise charter, concurrently in force in respect of the use of the ship either for the same voyage (voyage charter) or for a period of time (time charter) within which the said carriage is to take place.

Consignee Holder: A User simultaneously Designated as Consignee and Holder of an Electronic Bill of Lading.

Communication Link: The digital networking connection to the Central System to be established by the User.

Consignee: A User Designated as such, being thereby identified as the party to whom delivery of the goods must be made by the Carrier and also indicating the intention to make the Electronic Bill of Lading non-transferable Credit Limit: the maximum credit limit of a User as set out in the Charges Schedule to the Operational Service Contract.

Deposit: The amount payable by a User as a deposit as set out in the Charges Schedule to the Operational Service Contract.

Designate: To name or appoint a User to a role in the Title Registry in relation to an Electronic Bill of Lading. "Designation" means the act of Designating or the state of having been Designated.

Digital Signature: A mathematical result calculated from a unit of digital information and a Private Key, such that one having the unit of information and the corresponding Public Key can, through Verification, accurately determine (1) whether that mathematical result was created using that Private Key, and (2) whether the unit of information has been altered since that mathematical result was calculated.

Disciplinary Committee: A committee selected from amongst the directors of the XYZ Association Ltd as a tribunal to hear and determine questions relating to the infringement of the Rules or Operating Rules by any User and to determine what appropriate disciplinary action should be taken.

Document: A contract, bill, or other unit of substantive, often textual, information sent as a subdivided part of a Message. Synonyms: Attachment, Attached Document.

Documentary Credit Any documentary credit, including standby letters of credit, as defined by The Uniform Customs and Practice for Documentary Credits of the International Chamber of Commerce currently in force.

Document Identifier or "Document ID": The unique identifier of a Document sent into and tracked by the System.

Documentary Form of a Certificate: A textual interpretation of a Certificate authorized by its Issuer.

Eligible, Eligibility: Fulfills, or the fulfillment of, the requirements, for the time being in force, of qualification for admission to the System and is so declared by a Registrar.

Electronic Bill of Lading (eBL): A BBL Text together with its related Title Registry Record.

Enroll, Enrolled: To become a User of the System in accordance with the Operational Service Contract.

Hash result: The product of a hash function, which is an algorithm converting one set of digital bits to another, smaller set. That result is the "hash result". The hash function produces the same hash result each time it is executed with the same input. Further, for a hash function to be sound, it must be computationally infeasible (1) to reverse the hashing process and derive the input back from the hash result, and (2) to have two Messages produce the same hash result using the same hash algorithm. (Also known as a mathematical "Message digest", "cryptographic checksum", or "seal" (in technical documents, without relation to the legal effect of a seal))

Head Charter: A charterparty contract, other than a charter by demise or bareboat charter, between a Carrier, as owner or disponent owner of a ship and another User as charterer, for the use of the Carrier's ship for the purpose of carrying cargo either for a specific voyage or series of voyages or for a period of time.

Head Charterer: A User who has entered into a Head Charter with a Carrier.

Holder-to-order: A User who is or becomes simultaneously Designated both Holder and To order Party of an Electronic Bill of Lading.

Holder: A User who is or becomes Designated as such who is not at the same time the To Order Party nor a Bearer Holder Issue a Certificate: To list oneself as Issuer in a Certificate and Digitally Sign that Certificate. A person in the business of Issuing Certificates is also termed a "Certifier".

Issuer: With reference to a Certificate, the Certifier which Issued the Certificate.

Key Pair In a scheme of asymmetric or public-key cryptography, a Private Key and its mathematically related Public Key, which together have the property that the Public Key can Verify a Digital Signature that the Private Key creates.

Message: Any communication, document, notice or other information sent through the message handling unit and in a format described hereinabove.

Message Handling Unit: The messaging system maintained as part of the Central System by the Service Provider, as described hereinabove.

Notice of Revocation: In relation to a Certificate, a statement by the Issuer of a Certificate or a person authorized by the Issuer that the Certificate has been Revoked.

Operating Procedures: The document by that title. (The Operating Procedures are substantially as hereinbefore described in the detailed description of the present patent specification).

Operational Rules Those parts of the Operating Procedures which contain mandatory provisions with which Users are bound to comply.

Operational Service Contract: The standard form contract between each User and XYZ Ltd, as amended from time to time.

Pledgee Holder: A User who is or becomes Designated as both Pledgee and Holder simultaneously.

Private Key: The key of a Key Pair used to create a Digital Signature.

Public Key: The key of a Key Pair used to Verify a Digital Signature.

Registrar: A person authorized by XYZ Ltd to act as a Registrar and perform the functions set out in the Operational Service Contract.

Relying Party The person Verifying a Digital Signature, relying on the representations in a Certificate, or both.

Revoke: In relation to a Certificate, to include the Certificate in a class of Certificates, for which the Issuer of the Certificates gives notice that they (each or together) are Revoked, in response to an appropriate inquiry.

Rules, Rule Book, or Rulebook: The Rulebook, as amended from time to time, governing the relationship between Users and their use of the System.

Sea Waybill: A Document, other than a BBL Text or a Ship's Delivery Order, which is such a receipt for goods as contains or evidences a contract for the carriage of goods by sea and identifies a User to whom delivery of the goods is to be made by the Carrier in accordance with that contract.

Services: The services supplied by XYZ Ltd through the System and specified in the Operational Service Contract.

Shipper: User which is the original contracting party with whom a Carrier enters into the contract for the carriage of goods by sea.

Ship's Delivery Order: A Document, other than a BBL Text or a Sea Waybill, which contains an undertaking to deliver identified goods to an identified User, given under or for the purposes of a contract of carriage by sea of those goods or of goods which include those goods Signed: Properly digitally signed, which is to say, bearing a Digital Signature which can be Verified using the Public Key listed in a Certificate Issued by XYZ Ltd and which was a Valid Certificate when the Digital Signature was created.

Subscriber: A person who is identified in a Certificate as holding a private key that corresponds to the Public Key listed in that Certificate. A Subscriber is often termed a "subject" in technical standards.

Surrender: The presentation of an Electronic Bill of Lading to the Carrier or another User appointed by the Carrier, in accordance with the Operational Rules, in order to obtain delivery of the goods at the end of the carriage by sea.

Surrender Party: A User who is or becomes Designated as such and thereby identified as the person to whom the Electronic Bill of Lading must be presented to obtain delivery of the goods at the end of the carriage by sea.

Title Registry The System's central electronic repository of information used in trade transactions, particularly those related to shipping and Electronic Bills of Lading. The Title Registry is an application operated by XYZ Ltd providing the means to: (a) execute the functions relating to holdership and transfer of Electronic Bills of Lading; (b) maintain a record of the status of current Electronic Bills of Lading; and (c) maintain an audit trail of dealings with such Electronic Bills of Lading.

Title Registry Instruction, Instruction: The portion of a Type Header which directs the Title Registry to enter or change certain specified information in the Title Registry Record for a specified Electronic Bill of Lading.

Title Registry Record: The structured information in relation to transactions involving the Electronic Bill of Lading after its creation kept in the Title Registry and linked to the BBL Text.

Transport Document Any Document originated by a Carrier which is either a Sea Waybill or a Ship's Delivery Order.

To Order Party: A User Designated as such who is not also designated as the Holder of the Electronic Bill of Lading.

Type Header or Header: The part of a Message that indicates its type and function within the System and conveys data into the System's logs, User Database, Title Registry, and other records, and, in some cases, prompts one or more actions by the System.

Unique, Uniquely: When used of User or Document Identifier or other content of a database field, the value of an ITU X.500 directory attribute, or similar item of data, means that the content or value is the only one within a specified range and no equal or identical content or value exists within that range User: A person who has Enrolled as a user of the System User Certificate: A Certificate listing a Public Key used to Verify the Digital Signature on a Message Digitally Signed by a User.

User Database The records concerning Users kept in the System.

User Division Identifier: The optional portion of a User Identifier which indicates department, division, subdivision, or other part of the identified User's organization.

User Identifier: A name Uniquely identifying a User within the System.

User Identifier Extension: A notation appended by a User Representative to a User Identifier for the convenience of the User and without significance to other Users.

User Manual The User Manual issued from time by XYZ Ltd generally to all Users.

User Support Resources: The online information and functions provided by XYZ Ltd via a WorldWide Web interface.

User System: The means by which a User connects with and utilizes the Central System. It includes the Communication Link, software and hardware for composing, sending, and receiving Messages, reading or processing Documents, as well as computer security facilities and other components, all as required by the User System Specifications.

User System Specifications: The technical requirements for the User System (including the Communications Link).

Valid Certificate: A Certificate which is valid according to the terms specified in its documentary form. If no such terms are specified or available to a User relying on that Certificate, the Certificate is valid if has been signed by its Issuer and has not expired on its face or been Revoked as set out in the Operating Procedures.

Verify, Verification: In relation to a given Digitally Signed Message and Public Key, to determine accurately that: (a) the Digital Signature on the Message was created by the Private Key corresponding to that Public Key, and (b) that the Message has not been altered since its Digital Signature was created.

XAL Service Contract: The contract between XYZ Association Ltd and each User, as amended from time to time.

XYZ Association Ltd or "XAL": A corporate body created to represent the Users of System, and to perform the various regulatory and disciplinary functions assigned to it by the XAL Service Contract.

XYZ Ltd or XYZ: The owners, operators or service providers of the System for the time being, or their successors in title.

2. GENERAL PROVISIONS 2.1. Scope and Application 2.1.1. Parties

Effect as Agreement Between Users. The Rules constitute an agreement between Users, and between each User and the XYZ Association Ltd (XAL) acting on its own behalf, and on behalf of all other Eligible Users from time to time, and, where necessary, on behalf of XYZ Ltd.

Obligations Between Users. XAL and XYZ Ltd do not undertake or accept any responsibility for the performance of any obligation or duty owed by one User to any other User under these Rules or otherwise.

Effect of Service Contracts. No liability on the part of XAL or XYZ Ltd to any User shall arise except under and in accordance with the terms of, in the case of XAL, the XAL Service Contract, and in the case of XYZ Ltd, the Operational Service Contract.

2.1.2. Adherence

Each User agrees, as a condition of becoming a User of the System, to be bound by the provisions of the Rules.

2.1.3. Eligibility

Required. All Users must be Eligible in accordance with the criteria set out in the Operational Service Contract as amended from time to time, and must remain so throughout the period that they are Users.

Registrar's Requirements. Each User affirms that it has fully complied with the requirements of the relevant Registrar and undertakes that all the information supplied by it to such Registrar is true and complete in all material respects.

Changes in Information. Each User shall promptly notify the Registrar if any information previously provided becomes inaccurate or misleading.

2.2. Messages 2.2.1. Operations

Authentication. Each User agrees that all Messages sent by it or on its behalf via the Central System shall: (a) be Signed by it; (b) identify the sender; and (c) identify the recipient.

Operational Rules. Each User shall follow and comply with the Operational Rules.

Presumption of Sending. A User shall be presumed to have sent a Message as soon as the User has Signed and sent the Message in accordance with the Operational Rules.

Presumption of Receipt. A User shall be presumed to have received a Message as soon as the Central System has correctly forwarded the Message to such User in accordance with the Operational Rules.

Equipment and Applications. Each User shall operate a User System which the User shall take all reasonable care to maintain in good order.

Misdelivery. If a Message which is clearly addressed to one User is misdelivered to another User, that User shall: (a) return the message to its sender via the Central System as soon as the error is discovered; (b) refrain from storing or retaining any copy of the Message; and (c) treat the information contained in the Message as confidential and not use or disclose it for any purpose.

2.2.2. Validity and Enforceability

Writing Requirements. Any applicable requirement of law, contract, custom or practice that any transaction, document or communication shall be made or evidenced in writing, signed or sealed shall be satisfied by a Signed Message.

Signature Requirements. The contents of a Message Signed by a User are binding upon that User to the same extent, and shall have the same effect at law, as if the Message had existed in a manually signed form Undertaking not to Challenge Validity. No User shall contest the validity of any transaction, statement or communication made by means of a Signed Message on the grounds that it was made in the form of the electronic Message instead of by paper and/or signed or sealed.

2.2.3. Messages as Evidence

Admissibility. Each User agrees that a Signed Message or a portion drawn from a Signed Message will be admissible before any court or tribunal as evidence of the facts recorded.

Primary Evidence. In the event that a written record of any Message is required, a copy produced by a User, which XYZ Ltd has authenticated under the provisions of clause 2.6.1(3) of the Operational Service Contract, shall be accepted by that User and any other User as primary evidence of the contents of the Message.

Authenticated Copies to Prevail. Each User agrees that if there is a discrepancy between the record of any User and the copy authenticated by XYZ Ltd, such authenticated copy shall prevail.

2.2.4. Responsibility for Messages

Private Key Security. Each User is responsible for all Messages Signed by means of its Private Key, regardless of any failure to maintain the security of its own Private Key.

Site Security. Each User is responsible for implementing all necessary security procedures and measures at its site to ensure that data transmissions to and from the Central System are protected against unauthorized access, alteration, delay, loss or destruction.

Message Contents. The User receiving a Signed Message may consider it and any Documents within it as binding as their terms provide, the same as if the Message and Documents had been manually signed on paper.

2.2.5. Notice

Each User undertakes, to give immediate notice to XYZ Ltd and to comply with the relevant Operational Rules, in the event that its Private Key has been lost or compromised or it has reasonable grounds for believing that such Private Key has or may be misused, or used by an unauthorized person.

2.3. Illegality

Compulsory Requirements. Each User undertakes to comply with any compulsorily applicable legal requirements as to the permitted form in which data may be transmitted electronically, and as to the content of such data.

Illegal Trading and Money-Laundering. Users shall not use the Central System for the transmission of Messages in the course of or to facilitate: any illegal trading, trading of goods which are contraband, any illegal transfers of money, or any trade or transfer of goods or money which must be reported to an Authority.

Compliance with Regulations. Each User is responsible for ensuring that it complies with any law applicable to any transaction in which it participates via the Central System and for the observance of all applicable regulations including, but not limited to, those relating to: the exportation or importation of goods; any exchange control regulations; the movement, handling or storage of hazardous goods or substances; pollution; data protection; or encryption.

2.4. Consequences of Resignation or Cancellation

Messages after Departure from the Central System. Upon a User's resignation from, or the cancellation of a User's right of access to, the Central System in accordance with the provisions of the Operational Service Contract or the XAL Service Contract it shall be the User's sole responsibility to ensure that: all its existing Messages sent from the Central System before the effective date of termination are collected and read; all other Users from whom it expects to receive Messages are advised of its departure from the Central System; and it takes all reasonable steps to give other Users the necessary information to enable future communications to be received by it.

Switch to Paper by Resigning User. Any User who at the time of its resignation is a Holder, Holder-to-order, Bearer Holder or Pledgee Holder of an Electronic Bill of Lading must, at the same time as it gives notice of its resignation, initiate the switch to paper procedure in accordance with Rule 3.7 of this Rulebook.

Switch to Paper by Terminated User. If at the time of the cancellation of a User's right of access in accordance with the provisions of the Operational Service Contract or the XAL Service Contract that User is a Holder, Holder-to-order, Bearer Holder, or a Pledgee Holder of an Electronic Bill of Lading, it shall follow such instructions as XYZ Ltd or XAL may give, including, but not limited to, an instruction to initiate the Switch to Paper procedure under Rule 3.7 of this Rulebook. Neither XYZ Ltd nor XAL shall, however, be under any obligation to issue such instructions.

2.5. Miscellaneous

Partial Invalidity. If any provision in these Rules is held to be invalid, illegal or unenforceable by any competent court, tribunal or regulatory body, such invalidity, illegality or unenforceability shall attach only to that provision, and: (a) the validity legality or enforceability of the remaining provisions shall not be affected and these Rules shall apply as if such invalid, illegal or unenforceable provisions had not been included; and (b) the validity, legality or enforceability in any other jurisdiction of the offending or any other provision shall not be affected.

Applicable Law. These Rules are governed by and shall be interpreted in accordance with the Laws of England.

English Jurisdiction. Where the sole matter at issue between the parties is a claim for non-compliance with or breach of these Rules, all proceedings in respect of such claim shall be subject to the exclusive jurisdiction of the Courts of England.

Non-exclusive Jurisdiction. Any other dispute arising out of these Rules shall be subject to the non-exclusive jurisdiction of the Courts of England. Nothing in this Rule limits the right of a User to bring proceedings in connection with these Rules, other than those which fall within paragraph English Jurisdiction of Rule 2.5, in any other court or tribunal of competent jurisdiction.

3. TITLE REGISTRY 3.1. Creation of an Electronic Bill of Lading

Contents of BBL Text and Identification. Each Carrier agrees that any Message sent by him as an Electronic Bill of Lading other than a Message intended to operate as a Chartered Bill of Lading shall, within the BBL Text: include an acknowledgment by the Carrier of the receipt of goods for carriage by sea by that Carrier; and contain or evidence the terms of the contract of carriage. The Message shall be transmitted to the Title Registry.

Chartered Bills of Lading. A Carrier may create an Electronic Bill of Lading intended to operate as a Chartered Bill of Lading which does not contain or evidence the terms of the contract of carriage between the Carrier and the Head Charterer, if the Head Charterer is Designated as Shipper and Holder, but the BBL Text shall include an acknowledgment by the Carrier of the receipt of goods for carriage by sea by that Carrier.

Statements Relating to Goods Received. Any statement a Carrier makes as to the leading marks, number, quantity, weight, or apparent order and condition of the goods in the BBL Text will be binding on the Carrier to the same extent and in the same circumstances as if the statement had been contained in a paper bill of lading.

Original Parties. When a Carrier creates an Electronic Bill of Lading it must: (a) Designate a Shipper and (b) Designate a Holder of the Bill of Lading; and (c) either: (i) Designate a To Order Party, (ii) Designate a Consignee, or (iii) Blank Endorse the Electronic Bill of Lading, thereby Designating the Holder as a Bearer Holder. In the absence of any instructions as to Designate a Holder of the Bill of Lading, the Carrier shall Designate the Shipper as the Bearer Holder.

3.2. Incorporation by Reference

Standard Terms and Conditions. In order to incorporate its standard trading terms and conditions, otherwise than by setting the said terms and conditions out in full in the BBL Text, a Carrier shall follow the procedure specified in the Operational Rules.

Effect of Incorporation. Each User agrees that such incorporation shall be effective to make such terms and conditions binding upon the parties to the contract of carriage.

Incorporation of Charterparty Terms. Each User agrees that words contained in the BBL Text incorporating the provisions of any charterparty shall have the same effect as if such wording had appeared as part of the written terms of a paper bill of lading issued by the Carrier.

International Conventions. A contract of carriage in respect of which the Carrier has created an Electronic Bill of Lading shall be subject to any international convention, or national law giving effect to such international convention, which would have been compulsorily applicable if a paper bill of lading in the same terms had been issued in respect of that contract. Such international convention or national law shall be deemed incorporated into the Electronic Bill of Lading. In the event of a conflict between the provisions of any international convention or national law so incorporated and the other provisions of the contract of carriage as contained in the BBL Text, the provisions of the international convention shall prevail.

3.3. Rights and Obligations Under Electronic Bill of Lading

Transferability. A Electronic Bill of Lading may be transferable or nontransferable.

Making Transferable. Where the Carrier intends to create a transferable Electronic Bill of Lading it shall Designate a To Order Party or Blank Endorse the Bill.

Effect of Designating To Order Party. If the Carrier Designates a To Order Party, it is thereby deemed to have agreed that: (a) such To Order Party who is or becomes the Holder-to-order of the Electronic Bill of Lading can designate a new To Order Party, a Pledgee Holder, a Bearer Holder or a Consignee; and (b) any subsequent Holder-to-order Pledgee Holder or Bearer Holder can do likewise.

Effect of Blank Endorsement. If the Carrier gives a Title Registry Instruction that the Electronic Bill of Lading shall be Blank Endorsed it is thereby deemed to have agreed that: (a) the Holder is a Bearer Holder and can Designate a new Bearer Holder, a To Order Party, a Pledgee Holder or a Consignee; and (b) any subsequent Holder-to-order, Pledgee Holder or Bearer Holder can do likewise.

Holder To Order or Bearer Holder Not Shipper. By creating an Electronic Bill of Lading in which it Designates a Bearer Holder or Holder-to-order who is not the Shipper, the Carrier thereby acknowledges that it holds the goods described in the Electronic Bill of Lading to the order of that Bearer Holder or Holder-to-order.

Making Nontransferable. If a Carrier Designates a Consignee, the Electronic Bill of Lading shall be non-transferable.

Carrier's Responsibility for Compliance with Contract of Carriage. The Carrier shall ensure that the Designations it makes in the Title Registry Instruction accurately reflect: (a) the express or implied instructions of the Shipper and; (b) the terms and effect of the contract of carriage as contained in or evidenced by the BBL Text; or (c) in the case of a Chartered Bill of Lading in which the Head Charterer is Designated Shipper, the terms set out in the BBL Text as if the same were the terms of the contract of carriage.

3.4. Transfer of Possession 3.4.1. Procedure for Transfer of Possession

By Designation. The transfer of constructive possession of the goods, after the creation of a transferable Electronic Bill of Lading, shall be effected by the Designation of: (a) a new Holder-to-order, (b) a new Pledgee Holder, (c) a new Bearer Holder, or (d) a Consignee Holder.

Effect of Designations Where Designee is Also Holder. The Carrier shall upon Designation of such Holder-to-order, Pledgee Holder, Bearer Holder or Consignee Holder acknowledge that from that time on it holds the goods described in the Electronic Bill of Lading to the order of the new Holder-to-order, Pledgee holder, Bearer Holder or Consignee Holder, as the case may be.

To Order Party Becomes Holder. Where a new To Order party is Designated no transfer of constructive possession of goods will take place until such time as the To Order party also becomes Designated as Holder and so becomes a Holder-to-order.

Consignee Becomes Holder. Where a new Consignee is Designated, no transfer of constructive possession will take place until such time as the Consignee also becomes designated Holder.

Refusal by Transferee. If any Designated Holder-to-order or Consignee Holder refuses to accept the novation of the contract of carriage in accordance with Rule 3.5.2, constructive possession of the goods will automatically revert to the immediately preceding Holder-to-order, Bearer Holder, Pledgee Holder or, if none, to the Shipper [and the Carrier shall acknowledge that it continues to hold the goods to the order of that Holder-to-order, Bearer Holder Pledgee Holder or Shipper as the case may be.

Rejection by Pledgee. Where a Designated Pledgee Holder rejects the transfer by relinquishing its pledge and returning Holdership to the immediately preceding Holder, the constructive possession of the goods will automatically revert to the immediately preceding Holder-to-order, Bearer Holder, Pledgee Holder or, if none, to the Shipper [and the Carrier shall acknowledge that it continues to hold the goods to the order of that Holder-to-order, Bearer Holder Pledgee Holder or Shipper as the case may be.

3.4.2. XYZ Ltd to Act as Carrier's Agent

Each Carrier hereby irrevocably appoints XYZ Ltd as its agent for the purposes of acknowledging that it holds the goods to the order of any Designated or immediately preceding Holder-to-order, Pledgee Holder, Bearer Holder or Consignee Holder or Shipper under Rule 3.4.1.

XYZ Ltd undertakes to send via the Central System such an acknowledgment in a Message sent on the Carrier's behalf immediately upon receipt of the relevant Title Registry Instruction.

3.5. Novation of the Contract of Carriage

3.5.1. Occurrence and Effect

The Designation of a new Holder-to-order or a new Consignee Holder after the creation of the BBL, other than one who is also the Head Charterer, shall mean that the Carrier, the Shipper, the immediately preceding Holder-to-order, if any, and the new Holder-to-order or Consignee Holder all agree that:

New Parties to Contract of Carriage. Upon the acceptance by the new Holder-to-order or Consignee Holder of its Designation as such, or, at the expiry of the 24 hour period allowed for the refusal of the transfer under Rule 3.5.2, whichever is the earlier, a contract of carriage shall arise between the Carrier and the new Holder-to-order or Consignee Holder either on the terms of the contract of carriage as contained in or evidenced by the BBL Text: or when the Shipper is a Head Charterer, on the terms set out or incorporated in the BBL Text, as if this had contained or evidenced the original contract of carriage; and Accession to Rights and Obligations. The new Holder-to-order or Consignee Holder shall be entitled to all the rights and accepts all the obligations of the contract of carriage as contained in or evidenced by, or deemed to be so contained in or evidenced by, the Electronic Bill of Lading; and Prior Designee's Rights and Obligations Extinguished. Unless it is a Head Charterer, the immediately preceding Holder-to-order's or if none, the Shipper's rights, and, the immediately preceding Holder-to-order's, but not the Shipper's, obligations under its contract of carriage with the Carrier shall immediately cease and be extinguished.

3.5.2. New Holder's Right to Refuse Designation

Refusal by Notice. The new Holder-to-order or Consignee Holder may, within 24 hours of having received notification thereof, reject his Designation as new Holder-to-order or Consignee Holder, in which case all rights and obligations under the contract of carriage between the previous Holder-to-order and the Carrier remain vested in the previous Holder-to-order, or if none, the Shipper, as if no attempt to novate the contract had been made.

Acceptance. If within the 24 hour period and before rejection of his Designation, the Designated Holder-to-order or Consignee Holder represents that it accepts the novation or attempts to exercise any rights to the goods, by taking delivery or commencing proceedings against the Carrier for loss of or damage to the goods or otherwise, it shall be deemed to have accepted its Designation at the time it was made for the purposes of Rule 3.5. Any subsequent notice of refusal given pursuant to paragraph Refusal by Notice of this Rule 3.9 shall be void.

3.5.3. Pledgee Holders

Enforcement of Pledge. When a Pledgee Holder wishes to enforce its pledge it shall Designate itself as Holder-to-order, with the consequence that the contract of carriage is novated in accordance with the provisions of Rule 3.5, as if the constructive possession of the goods had been transferred to such Pledgee Holder as a Holder-to-order.

No Novation. There shall be no novation of the contract of carriage upon Designation of a Pledgee Holder as such unless and until it enforces the pledge.

3.5.4. Bearer Holders

No Novation. There shall be no novation of the contract of carriage upon Designation of a Bearer Holder.

Exercise of Rights. A Bearer Holder who wishes either to claim delivery of the goods or commence proceedings against the Carrier for failure to deliver the goods shall first Designate itself as Holder-to-order, whereupon it shall become a party to the contract of carriage in accordance with the provisions of Rule 3.5, as if the constructive possession of the goods had been transferred to such Bearer Holder as a Holder-to-order.

3.6. Delivery of the Goods

Persons Entitled to Delivery. Under a contract of carriage in respect of which an Electronic Bill of Lading has been created, delivery of the goods shall only be made by the Carrier to a Holder-to-order or Consignee Holder which duly Surrenders the Electronic Bill of Lading.

Surrender of the Electronic Bill of Lading. The Electronic Bill of Lading shall be Surrendered either to the User identified as the Surrender Party or, if none, to the Carrier in accordance with the Operational Rules.

Termination of Electronic Bill of Lading. Once the Title Registry Record has recorded that the Electronic Bill of Lading has been Surrendered, the Electronic Bill of Lading shall cease to be effective as an Electronic Bill of Lading and no further dealings with it through the Title Registry shall be possible.

3.7. Switch to Paper

Persons Entitled to Switch to Paper. At any time before the goods to which the Electronic Bill of Lading relates have been delivered by the Carrier, a current Holder, Holder-to-order, Pledgee Holder or Bearer Holder shall be entitled to demand that the Carrier issue a paper bill of lading in accordance with the Operational Rules.

Form of Paper Bill of Lading. The Carrier shall, immediately upon receipt of such a demand, issue a paper bill of lading which sets out: (a) all the data contained in the original BBL Text; (b) a statement to the effect that it originated as an Electronic Bill of Lading; and (c) the date upon which it was issued in paper form.

Discrepancies. In the event of any discrepancy between the paper bill of lading so issued and the electronic record of the Electronic Bill of Lading, the electronic record shall prevail.

Delivery of Paper Bill of Lading. The Carrier shall deliver that paper bill of lading in accordance with the instructions of the person currently entitled to hold it, being: (a) the current Pledgee Holder; or if none (b) the current Holder-to-order or Bearer Holder; or if none (c) the current Holder.

Endorsement Chain. Such paper bill shall be accompanied by a record certified by XYZ Ltd of the chain of Users which have been parties to contracts of carriage with the Carrier, from the date of the creation of the Electronic Bill of Lading until the date on which its switch to paper demand was sent by the Central System in accordance with the Operational Rules.

Suspension of Electronic Bill of Lading. From the moment the instruction is given to the Carrier to issue a paper bill of lading, there shall be no further Title Registry Instructions in relation to the Electronic Bill of Lading. The Electronic Bill of Lading shall cease to be effective as from the moment of the issue of the paper bill of lading by the Carrier.

3.8. Powers of Parties to an Electronic Bill of Lading

Table of Powers. The parties to an Electronic Bill of Lading, as defined below, shall be entitled to execute functions in relation to that Electronic Bill of Lading in accordance with the following table:

| Functions | Carrier | Shipper and Holder | Holder-to-order | Pledgee Holder | Bearer Holder | Holder | Consignee and Holder |
|---|---|---|---|---|---|---|---|
| Create Bill | Yes | No | No | No | No | No | No |
| Designate Holder | Yes | Yes | Yes | Yes | Yes | Yes | Yes |
| Designate To Order | Yes | No | Yes | Yes | Yes | No | No |
| Blank Endorse | Yes | No | Yes | No | No | No | No |
| Designate Bearer Holder | Yes | No | Yes | Yes | Yes | No | No |
| Designate Consignee | Yes | No | Yes | Yes | Yes | No | No |
| Designate Pledgee Holder | No | Yes | Yes | Yes | Yes | Yes | No |
| Enforce pledge | No | No | No | Yes | No | No | No |
| Release pledge | No | No | No | Yes | No | No | No |
| Surrender Bill | No | No | Yes | No | No | No | Yes |
| Request Amendment | No | Yes | Yes | Yes | Yes | Yes | Yes |
| Grant Amendment | Yes | No | No | No | No | No | No |
| Deny Amendment | Yes | No | No | No | No | No | No |
| Switch to Paper | No | Yes | Yes | Yes | Yes | No | Yes |

Timing of Carrier's Rights. The Carrier may perform the functions indicated in the table, other than grant or deny amendments, only at the time of the creation of the Electronic Bill of Lading and only in accordance with the provisions of Rule 3.1 of this Rulebook.

Shipper Holder Designating To Order. A Shipper which is also Holder of a Blank Endorsed Electronic Bill of Lading can Designate a To Order Party.

Shipper, Consignee, or To Order Party Not Holder. Unless a Shipper, Consignee, or To Order Party is also simultaneously the Holder, it is not empowered to give any Title Registry Instructions.

One Holder Only. There shall not be more than one holder (whether Bearer Holder, Holder-to-order, Pledgee Holder, Consignee Holder or Holder) of an Electronic Bill of Lading at any one time.

Pledgee Automatically Holder. The Designation of a Pledgee shall cause the removal of the previous Holder and the automatic Designation of the Pledgee as Holder. Any To Order party also then Designated remains so Designated until the pledge is either relinquished or enforced.

Pledgee Not Bearer Holder. Where an Electronic Bill of Lading is Blank Endorsed, the Designation of a Pledgee shall make that person a Pledgee Holder not a Bearer Holder.

Pledgee Remains Holder While Bill Pledged. A Pledgee Holder's power to Designate a new Holder, or To Order party is only exercisable when it: (a) relinquishes its pledge at which time it shall Designate a new Holder and may Designate a To Order party, or a Consignee or Blank Endorse; or (b) enforces its pledge, at which time it shall Designate itself as Holder-to-order.

Underlying Contractual Obligations. Nothing in these Rules shall be construed as permitting any User to Designate any person in breach of their obligations or duties arising under or in relation to any underlying contract governing the transaction.

Shipper's Right to Request Amendment. Nothing in this Rule shall limit the right of a Shipper, who is the Holder of an Electronic Bill of Lading, to insist upon an amendment of the Electronic Bill of Lading.

Instructions to Carrier under Electronic Bill of Lading. Where an Electronic Bill of Lading is currently in force or the relevant shipping documents exist in electronic form, the Carrier may require that all instructions to the Carrier shall only be given by Messages through the Central System.

3.9. Transport Shipping Documents

Creation of Transport Documents. Where, instead of creating an Electronic Bill of Lading, a Carrier by a Message sent via the Central System creates a Transport Document, such Message will take effect, for the purposes of the operation of any international convention or national law, as if it were a Transport Document which had been issued by the Carrier in paper form.

Contract of Carriage in Transport Document. Any User identified in a Transport Document will obtain the same rights and liabilities under the contract of carriage, by reason of having been so identified, as it would have done under a paper version of such a Transport Document.

Paper Equivalence. Where a User is named, by a party entitled to do so under a contract of carriage made with a Carrier, as the person to whom delivery of the goods is to be made, that User shall acquire the same rights and liabilities as it would have done if the relevant Transport Document had been issued in paper form.

Duration. In no circumstances shall any rights or liabilities created by the operation of this Rule be any greater or continue for any longer period of time, than would have been the case if the relevant Transport Document had been created in paper form.

Paper copies of Transport Documents. Once a Carrier has created a Transport Document any subsequent paper copy of such document shall clearly state that it is a copy only. In the event of any discrepancy between the paper copy and the electronic record, the electronic record shall prevail.

Termination of Rights and Liabilities. In the event that the right to the delivery of the goods under a contract of carriage to which this Rule applies, is transferred to a party who is not a User, all rights and liabilities created by the operation of this Rule shall immediately be terminated.

3.10. Ownership and Contracts of Sale

Transfer of Ownership. If as a result of either the intention of the parties to the transaction or the effect of any applicable law, the transfer of constructive possession of the goods and/or the novation of the contract of carriage as provided for in these Rules have the effect of transferring the ownership or any other proprietary interest in the goods (in addition to constructive possession thereof), then nothing in these Rules shall prevent such transfer of ownership or other proprietary interest from taking place.

Rules Do not Affect Ownership. Nothing in these Rules shall otherwise be construed as affecting the ownership of goods which are the subject of any contract of carriage contained in or evidenced by an Electronic Bill of Lading or other Transport Document.

Validity of Electronic Tender of Documents. Each User agrees that where a contract of sale between Users requires that shipping documents are tendered to the buyer of those goods, or to another party nominated by the buyer, a tender of documents by means of the Central System shall not be rejected on the grounds that the documents tendered are in the form of electronic messages or images provided that they contain all the data which is required by the contract of sale.

Sale Concluded by Electronic Interchange. Where a contract of sale between Users is concluded, (in whole or in part) by means of a Message or by a series of Messages, each User agrees that such Message or Messages shall constitute and/or evidence the contract concluded between them.

Switch to Paper for Contracts of Sale. Upon a request from any User entitled to demand the original contract of sale, a contracting User will print and sign in writing the Message or Messages in accordance with any and all formalities required by any applicable law to give effect to the contract.

Date of Contract of Sale. A sale contract switched to paper by the procedure set out in paragraph Switch to Paper for Contracts of Sale shall take effect as if the sale contract had been made and signed in writing on the date of the relevant Message or Messages.

3.11. Documentary Credits

Validity of Electronic Presentation of Documents. These Rules will apply and the presentation of any Documents by electronic transmission through the Central System will be accepted as if they were the equivalent paper documents, where a User issues, advises or confirms a Documentary Credit on the instructions of an Applicant User under which a Beneficiary User is required to present stipulated documents in order to operate the Documentary Credit, provided that: (a) the Documentary Credit expressly indicates that presentation under the Central System is acceptable; and (b) the data contained in such transmissions is presented in Documents whose description matches that of the documents required to be presented by the terms of the credit; and (c) where the Documentary Credit requires that a particular document is issued, authenticated or signed by a particular person, the data transmission is Signed by that person or by a User who is authorized to act and take responsibility on his behalf.

Electronic Documents to be "Originals". Any requirement under the terms of a Documentary Credit, to which these Rules apply, that an "original" document be presented shall be satisfied by the presentation of a Document bearing the Signature of the person said to have issued or created the document or that of a User who is authorized to act and to take responsibility on his behalf.

Copies. Where the terms of a Documentary Credit, to which these Rules apply, require that a number of copies of a document be presented by a Beneficiary User to another User "the recipient User": (a) such a requirement shall be satisfied by a single transmission of the equivalent Document to such recipient User; and (b) the recipient User shall be entitled or empowered to make the number of onward transmissions, or, as the case may be, to create the number of copies, of that document as would have been necessary to complete the transaction in a paper environment, provided always that no Electronic Bill of Lading shall have more than one holder (whether Holder-to-order, Bearer Holder Pledgee Holder, Consignee Holder or Holder) at any one time.

Banks as Holders of Electronic Bills of Lading. Where a User acting as an issuing or confirming bank is designated as a Pledgee Holder, or Bearer Holder of an Electronic Bill of Lading for the purposes of the performance of a Documentary Credit, the User shall only acquire such property in and responsibility for the goods as the parties to the Documentary Credit transaction intend.

3.12 U.S. Law Clauses

These Clauses are to form part of these Rules and where applicable will do so as part of the provisions of Rule 3.2.

Ad valorem Declarations. If the carriage covered by an Electronic Bill of Lading includes carriage to or from a port or place in the United States of America, the Carrier shall provide the Shipper of the Electronic Bill of Lading the opportunity to declare a value of the goods to be carried by him and will include any such declaration in the Electronic Bill of Lading. Any declaration or absence thereof will be binding on the first Holder and any successive Holder to the same extent as if the opportunity to declare a value had been contained in a paper bill of lading.

International Conventions. Where the carriage covered by the Electronic Bill of Lading evidences Carriage to or from a port or place in the United States, the United States Carriage of Goods by Sea Act 1936 shall be deemed to be incorporated and form part of the contract of carriage contained in or evidenced by the Electronic Bill of Lading.

6. SUMMARY

It will be appreciated that although particular embodiments of the invention have been described, many modifications/additions and/or substitutions may be made within the spirit and scope of the present invention.

The invention claimed is:

1. A method for supporting transactions of property between ones of a defined group of users, each with a user identifier, comprising:

providing a registry comprising a database of electronic records stored in a memory of a computer system in which each record represents a bill of lading supporting one transaction of property between the defined group of users and wherein each record comprises a plurality of role fields, wherein at least one role field reflects the rights and obligations of users named in the role field relative to property underlying the transaction;

indicating, in at least one role field of the record, a user identifier of a user that has an exclusive ability to modify the record;

receiving, at the computer system, an electronic message from a transmitting user, wherein the message comprises a user identifier of the transmitting user and a registry instruction to change the user identified in at least one role field to reflect a change of the user that has the exclusive ability to modify the record;

automatically validating the transmitting user identified in the electronic message, with the computer system, by comparing the user identifier in the received electronic message to the user indicated in the record as having exclusive ability to modify the record;

automatically validating the registry instruction in the electronic message, with the computer system, by determining if the registry instruction conforms to a set of rules, the set of rules being predefined to reflect rules relating to the transfer of property, to which all users are bound to adhere by a common contractual agreement;

automatically modifying the record to change the identity of the user that has the exclusive ability to modify the record, with the computer system, if the transmitting user is a valid user and the registry instruction is a valid registry instruction;

preventing modification of the record if the user is not a valid user; and preventing modification of the record if the registry instruction is not a valid registry instruction.

2. The method of claim 1, wherein the user indicated in the record as having exclusive ability to modify the record is indicated in a holder field, and further comprising indicating, in additional role fields, the user identifier of the user identified in the holder field, wherein indication of the user identified in the holder field in other role fields indicates that the user identified in the holder field has multiple roles, and wherein some of the rights and obligations of the user identified in the holder field relative to the property underlying the transaction are derived from the user identified in the holder field having multiple roles.

3. The method of claim 1, wherein the user indicated in the record as having exclusive ability to modify the record is indicated in a holder field, and wherein one of the role fields is a pledgee holder field, and further comprising preventing modifications of the record that would cause a single user to be named in both a holder field and the pledgee holder field simultaneously.

4. The method of claim 1, wherein the user indicated in the record as having exclusive ability to modify the record is indicated in a holder field, and wherein at least one of the role fields is a to-order party field and at least one of the role fields is a consignee field, further comprising preventing modifications to the registry that would cause a user specified in the holder field to be the same as a user specified for the consignee field or the to-order party field.

5. The method of claim 1, wherein the user indicated in the record as having exclusive ability to modify the record is indicated in a holder field, wherein at least one of the role fields is a consignee field, and further comprising preventing modification of the record to change the identity of the user in the holder field if a user is identified in the consignee field.

6. The method of claim 1, wherein at least one of the role fields is a pledgee holder field and at least one of the role fields is a to-order field, further comprising naming a user specified in the pledgee holder field as the user specified in the to-order party field, and deleting the user specified in the pledgee holder field and naming that user instead in a holder field.

7. The method of claim 1, wherein the user indicated in the record as having exclusive ability to modify the record is indicated in a holder field, wherein at least one of the role fields is a pledgee holder field, and further comprising preventing changes to a name in the holder field of a record unless the transmitting user corresponds to a user currently named in the holder field or in the pledgee holder field of the record.

8. The method of claim 1, wherein the user indicated in the record as having exclusive ability to modify the record is indicated in a holder field or a pledgee holder field, and further comprising preventing changes to a name in the pledgee holder field of a record unless the transmitting user corresponds to a user currently named in the holder field or in the pledgee holder field of the record.

9. The method of claim 1, wherein the user indicated in the record as having exclusive ability to modify the record is indicated in a holder field, and further comprising sending a message to a new holder if the modification to a record changes the holder field.

10. The method of claim 1, wherein at least one of the role fields is a pledgee holder field, further comprising sending a message to a new pledgee holder if a modification to a record changes a pledgee holder field.

11. The method of claim 1, wherein a history file is associated with at least one record.

12. The method of claim 11, further comprising writing data relating to registry instruction requests to the history file of at least one record.

13. The method of claim 11, further comprising preventing access to the history file by users.

14. The method of claim 1, wherein the role fields comprise a holder field, a consignee field, and a to-order field, and wherein the an endorsement chain file is associated with at least one record, wherein the endorsement chain file comprises a time ordered list of users who have been parties to the record, and wherein a party comprises a user who is named simultaneously in a holder field and a consignee field of a record, or a user who is named simultaneously in the holder field and a to-order party field of the record.

15. The method of claim 14, further comprising updating the endorsement chain file each time the record changes state creating a new party.

16. The method of claim 14, further comprising sending a copy of the endorsement chain file to a user who is a new contracting party when the record changes state creating a new contracting party.

17. The method of claim 1, further comprising revoking a previously executed registry instruction that resulted in a change of a user having exclusive ability to modify the record by changing the record back to a previous state in response to a refusal instruction.

18. The method of claim 17, wherein the determined conditions for changing the record back to the previous state comprise a user identifier of a user transmitting the refusal instruction corresponding to the user having exclusive ability to modify the record.

19. The method of claim 17, wherein the determined conditions for changing the record back to the previous state comprise the refusal instruction being received within a defined period of time from the previous registry instruction.

20. The method of claim 17, wherein the determined conditions for changing the record back to the previous state comprise the refusal instruction being received within about 24 hours of the previous registry instruction.

21. The method of claim 17, wherein the determined conditions for changing the record back to the previous state comprise a user identifier of a user transmitting the refusal instruction corresponding to a user named in either a to-order party field or a consignee field.

22. The method of claim 17, wherein the message handling unit is further configured to send a message to a user having exclusive ability to modify the record after the registry maintenance unit revokes a previous executed registry instruction.

23. A method for supporting transactions of property between ones of a defined group of users, each with a user identifier, comprising:

providing a registry comprising a database of electronic records stored in a memory of a computer system in which each record represents a bill of lading supporting one transaction of property between the defined group of users and wherein each record comprises a plurality of role fields, wherein at least one role field reflects the rights and obligations of users named in the role field relative to property underlying the transaction;

indicating, in one or more of the role fields of at least one record, a user that has an exclusive ability to modify the record;

receiving an electronic message from a user at the computer system, wherein the message comprises a user identifier of the user and a registry instruction, wherein the registry instruction includes an instruction to modify the record;

automatically validating the user identified in the electronic message, with the computer system, by comparing the user identifier in the received electronic message to the user indicated in the record as having exclusive ability to modify the record, automatically validating the registry instruction in the electronic message, with the computer system, by determining if the registry instruction conforms to a set of rules, the set of rules being predefined to reflect rules relating to the transfer of property, to which all users are bound to adhere by a common contractual agreement;

automatically modifying the record, with the computer system, if the user is a valid user and the registry instruction is a valid registry instruction;

preventing automatic modification of the record, with the computer system, if the user is not a valid user; and preventing automatic modification of the record if the registry instruction is not a valid registry instruction.

24. The method of claim 23, wherein the user indicated in the record as having exclusive ability to modify the record is indicated in a holder field, and further comprising indicating, in additional role fields, the user identifier of the user identified in the holder field, wherein indication of the user identified in the holder field in other role fields indicates that the user identified in the holder field has multiple roles, and wherein some of the rights and obligations of the user identified in the holder field relative to the property underlying the transaction are derived from the user identified in the holder field having multiple roles.

25. The method of claim 23, wherein the user indicated in the record as having exclusive ability to modify the record is indicated in a holder field, and wherein one of the role fields is a pledgee holder field, and further comprising preventing modifications of the record that would cause a single user to be named in both a holder field and the pledgee holder field simultaneously.

26. The method of claim 23, wherein the user indicated in the record as having exclusive ability to modify the record is indicated in a holder field, and wherein at least one of the role fields is a to-order party field and at least one of the role fields is a consignee field, further comprising preventing modifications to the registry that would cause a user specified in the holder field to be the same as a user specified for the consignee field or the to-order party field.

27. The method of claim 23, wherein the user indicated in the record as having exclusive ability to modify the record is indicated in a holder field, wherein at least one of the role fields is a consignee field, and further comprising preventing modification of the record to change the identity of the user in the holder field if a user is identified in the consignee field.

28. The method of claim 23, wherein at least one of the role fields is a pledgee holder field and at least one of the role fields is a to-order field, further comprising naming a user specified in the pledgee holder field as the user specified in the to-order party field, and deleting the user specified in the pledgee holder field and naming that user instead in a holder field.

29. The method of claim 23, wherein the user indicated in the record as having exclusive ability to modify the record is indicated in a holder field, wherein at least one of the role fields is a pledgee holder field, and further comprising preventing changes to a name in the holder field of a record unless the transmitting user corresponds to a user currently named in the holder field or in the pledgee holder field of the record.

30. The method of claim 23, wherein the user indicated in the record as having exclusive ability to modify the record is indicated in a holder field or a pledgee holder field, and further comprising preventing changes to a name in the pledgee holder field of a record unless the transmitting user corresponds to a user currently named in the holder field or in the pledgee holder field of the record.

31. The method of claim 23, wherein the user indicated in the record as having exclusive ability to modify the record is indicated in a holder field, and further comprising sending a message to a new holder if the modification to a record changes the holder field.

32. The method of claim 23, wherein at least one of the role fields is a pledgee holder field, further comprising sending a message to a new pledgee holder if a modification to a record changes a pledgee holder field.

33. The method of claim 23, wherein a history file is associated with at least one record.

34. The method of claim 33, further comprising writing data relating to registry instruction requests to the history file of at least one record.

35. The method of claim 33, further comprising preventing access to the history file by users.

36. The method of claim 23, wherein the role fields comprise a holder field, a consignee field, and a to-order field, and wherein the an endorsement chain file is associated with at least one record, wherein the endorsement chain file comprises a time ordered list of users who have been contracting parties to the record, and wherein a contracting party comprises a user who is named simultaneously in a holder field and a consignee field of a record, or a user who is named simultaneously in the holder field and a to-order party field of the record.

37. The method of claim 36, further comprising updating the endorsement chain file each time the record changes state creating a new contracting party.

38. The method of claim 36, further comprising sending a copy of the endorsement chain file to a user who is a new contracting party when the record changes state creating a new contracting party.

39. The method of claim 23, further comprising revoking a previously executed registry instruction that resulted in a change of a user having exclusive ability to modify the record by changing the record back to a previous state in response to a refusal instruction.

40. The method of claim 39, wherein the determined conditions for changing the record back to the previous state comprise a user identifier of a user transmitting the refusal instruction corresponding to the user having exclusive ability to modify the record.

41. The method of claim 39, wherein the determined conditions for changing the record back to the previous state comprise the refusal instruction being received within a defined period of time from the previous registry instruction.

42. The method of claim 39, wherein the determined conditions for changing the record back to the previous state comprise the refusal instruction being received within about 24 hours of the previous registry instruction.

43. The method of claim 39, wherein the determined conditions for changing the record back to the previous state comprise a user identifier of a user transmitting the refusal instruction corresponding to a user named in either a to-order party field or a consignee field.

44. The method of claim 39, wherein the message handling unit is further configured to send a message to a user having exclusive ability to modify the record after the registry maintenance unit revokes a previous executed registry instruction.

45. The method of claim 23, wherein at least one of the role fields is a to-order party field and at least one of the role fields is a consignee field, and further comprising preventing modifications to the record that would cause both the to-order party role field and the consignee role field to be occupied simultaneously.

46. The method of claim 23, wherein at least one of the role fields is a to-order party field and at least one of the role fields is a consignee field, wherein the registry instruction further comprises an instruction to create a new record, the method further comprising preventing creation of a new record unless instructions for creating the new record comprise one and only one of:
  (i) a user identifier for the consignee field,
  (ii) a user identifier for the to-order party field, or
  (iii) an indication that no user is to be named in either of the consignee field or the to-order party field.

47. The method of claim 23, wherein at least one of the role fields is a pledgee holder field and at least one of the role fields is a consignee field, further comprising preventing modifications to the record that would cause both the pledgee holder field and the consignee role field to be occupied simultaneously.

48. The method of claim 23, wherein at least one of the role fields is a pledgee holder field and at least one of the role fields is a to-order field, further comprising preventing modifications to the registry that would cause a user specified in the pledgee holder field to be the same as a user named in the to-order party field.

49. The method of claim 23, wherein at least one of the role fields is a shipper party field and at least one of the role fields is an originator field, wherein the registry instruction further comprises an instruction to create a new record, and further comprising preventing creation of a new record unless a user is named in the originator field, a user is named in the shipper field and a user is identified in the holder field.

50. The method of claim 23, wherein at least one of the role fields is an originator field, wherein the registry instruction further comprises an instruction to create a new record, further comprising preventing creation of a new record unless the user named in the originator field corresponds with the user identifier of the transmitting user.

51. The method of claim 23, wherein at least one of the role fields is a pledgee holder field, wherein the registry instruction further comprises an instruction to create a new record, and further comprising preventing creation of a new record with a user identified in the pledgee holder field.

52. The method of claim 23, wherein the registry instruction comprises an instruction to switch-to-paper, further comprising indicating, in the record, a switch from electronic support of a transaction to a paper-based transaction support of the transaction in response to the registry instruction.

53. The method of claim 52, further comprising sending a notification of switching from electronic support of a transaction to a paper-based transaction support of the transaction to a user named in an originator field.

54. The method of claim 52, further comprising sending a notification of switching from electronic support of a transaction to a paper-based transaction support of the transaction to a user named in an originator field and to a user named in a surrender party field.

55. The method of claim 23, wherein at least one of the role fields is an originator field, further comprising preventing modification of a user named in the originator field after a record is created.

56. The method of claim 23, wherein at least one of the role fields is a to-order party field, further comprising removing a user name from the to-order party field in response to a blank endorse registry instruction.

57. The method of claim 56, wherein removing a user name from the to-order party field in response to a blank endorse registry instruction is automatically performed if the user name in the to-order party field corresponds a user name of a user transmitting the blank endorse registry instruction.

58. The method of claim 23, wherein at least one of the role fields is a surrender party field, further comprising de-activating a record in response to a surrender registry instruction for the record.

59. The method of claim 58, further comprising sending a message to a user named in an originator field of the record in response to execution of the surrender registry instruction.

60. The method of claim 58, further comprising sending a message to a user named in the surrender party field in response to execution of the surrender registry instruction.

61. The method of claim 23, wherein at least one of the role fields is a surrender party field, wherein the wherein the registry maintenance unit is configured to de-activate a record in response to a surrender registry instruction for the record if a user name of a user transmitting the surrender registry instruction corresponds to a user having exclusive ability to modify the record.

62. The method of claim 23, wherein at least one of the role fields is a surrender party field, further comprising de-activating a record in response to a surrender registry instruction for the record if a user name of a user transmitting the surrender registry instruction corresponds to a user having exclusive ability to modify the record and the user name of the transmitting user corresponds to a user name in either a to-order party field or a consignee field.

63. The method of claim 23, further comprising storing a request to amend a record and assigning an amendment identifier to the stored request.

64. The method of claim 63, further comprising sending a message to a user named in an originator field of the record in response to the amendment request.

65. The method of claim 63, further comprising sending a message comprising the amendment identifier and a description of the requested amendment to a user named in an originator field of the record in response to the amendment request.

66. The method of claim 23, further comprising modifying a record based on the request to amend the record in response to receiving a grant amendment registry instruction from a user named in an originator field of the record.

67. The method of claim 23, further comprising amending a record based on the request to amend the record in response to receiving a grant amendment registry instruction from a user named in an originator field of the record if the grant amendment registry instruction includes the amendment identifier of the amendment request.

68. The method of claim 23, wherein the record comprises an amendment pending field, and further comprising sending the amendment pending field to amendment pending in response to receiving the request to amend the record.

69. The method of claim 23, wherein the record comprises an amendment pending field, and wherein the registry maintenance unit is configured to set the amendment pending field to no amendment pending in response to receiving a grant amendment registry instruction or a deny amendment registry instruction.

70. The method of claim 23, wherein at least one of the role fields comprises an amendment pending field, further comprising preventing modification of the record while an amendment is pending.

71. The method of claim 23, further comprising sending a message to a user requesting an amendment to the record in response to receiving a deny amendment registry instruction.

72. The method of claim 23, further comprising modifying at least one record by merging a plurality of records to form a single new record in response one or more registry instructions.

73. The method of claim 23, further comprising modifying at least one record by splitting the record into a plurality of new records in response to one or more registry instructions.

74. A system for supporting transactions of property between ones of a defined group of users, each with a user identifier, comprising:
   a CPU; and
   a memory coupled to the CPU, wherein the memory comprises program instructions executable to implement:
   providing a registry comprising a database of electronic records in which each record represents a bill of lading supporting one transaction of property between the defined group of users and wherein each record comprises a plurality of role fields, wherein at least one role field reflects the rights and obligations of users named in the role field relative to property underlying the transaction;
   indicating, in one or more of the role fields of at least one record, a user that has an exclusive ability to modify the record;
   receiving an electronic message from a user, wherein the message comprises a user identifier of the user and a registry instruction, wherein the registry instruction includes an instruction to modify the record;
   automatically validating the user identified in the electronic message by comparing the user identifier in the received electronic message to the user indicated in the record as having exclusive ability to modify the record,
   automatically validating the registry instruction in the electronic message by determining if the registry instruction conforms to a set of rules, the set of rules being predefined to reflect rules relating to the transfer of property, to which all users are bound to adhere by a common contractual agreement;
   automatically modifying the record if the user is a valid user and the registry instruction is a valid registry instruction;
   preventing modification of the record if the user is not a valid user; and
   preventing modification of the record if the registry instruction is not a valid registry instruction.

\* \* \* \* \*